(12) United States Patent
Tanaka

(10) Patent No.: US 11,977,793 B2
(45) Date of Patent: May 7, 2024

(54) APPARATUS, METHOD FOR CONTROLLING APPARATUS, STORAGE MEDIUM, AND PRINTING APPARATUS, WITH INCREASE IN NUMBER OF DOTS FROM FIRST DOT PATTERN TO THIRD DOT PATTERN BEING LARGER OR SMALLER THAN INCREASE IN NUMBER OF DOTS FROM SECOND DOT PATTERN TO FOURTH DOT PATTERN

(71) Applicant: CANON KABUSHIKI KAISHA, Tokyo (JP)

(72) Inventor: Hirokazu Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/155,173

(22) Filed: Jan. 17, 2023

(65) Prior Publication Data

US 2023/0244422 A1 Aug. 3, 2023

(30) Foreign Application Priority Data

Jan. 28, 2022 (JP) ................. 2022-012106

(51) Int. Cl.
*G06F 3/12* (2006.01)
(52) U.S. Cl.
CPC .......... *G06F 3/1208* (2013.01); *G06F 3/1242* (2013.01)
(58) Field of Classification Search
None
See application file for complete search history.

(56) References Cited

U.S. PATENT DOCUMENTS

| 9,195,917 B2 | 11/2015 | Nakagawa et al. |
| 2012/0062636 A1* | 3/2012 | Yamamoto ......... G06K 15/1881 347/15 |
| 2014/0139885 A1* | 5/2014 | Nakagawa ........... G06K 15/107 358/3.14 |

FOREIGN PATENT DOCUMENTS

JP 2014-113819 A 6/2014

OTHER PUBLICATIONS

JP 2014-113819 A, [0003], US 2014/0139885 A1 U.S. Pat. No. 9,195,917 B2.

* cited by examiner

*Primary Examiner* — Andrew H Lam
(74) *Attorney, Agent, or Firm* — Venable LLP

(57) ABSTRACT

The present disclosure aims to provide a high quality image without conspicuous graininess and density unevenness. An embodiment of the present invention is an apparatus for printing a plurality of dot patterns on a printing medium, the dot patterns being formed by substantially same color and substantially same dot diameter, the apparatus including: a first creation unit configured to create, based on a first tone value, a first dot pattern and a second dot pattern printed and superimposed on the first dot pattern; and a second creation unit configured to create, based on a second tone value larger than the first tone value, a third dot pattern having an equal or larger number of dots compared to the first dot pattern and a fourth dot pattern printed and superimposed on the third dot pattern and having an equal or larger number of dots compared to the second dot pattern.

20 Claims, 44 Drawing Sheets

FIG.17A FOR FORWARD SCANS 1701

| 0 | 2048 | 1024 | 3072 | 512 | 2560 | 1536 | 3584 | 256 | 2304 | 1280 | 3328 | 768 | 2816 | 1792 | 3840 |
|---|---|---|---|---|---|---|---|---|---|---|---|---|---|---|---|
| 3232 | 672 | 2720 | 1696 | 3744 | 416 | 2464 | 1440 | 3488 | 928 | 2976 | 1952 | 4000 | 96 | 2144 | 1120 |
| 1616 | 3664 | 336 | 2384 | 1360 | 3408 | 848 | 2896 | 1872 | 3920 | 208 | 2256 | 1232 | 3280 | 720 | 2768 |
| 2544 | 1520 | 3568 | 1008 | 3056 | 2032 | 4080 | 48 | 2096 | 1072 | 3120 | 560 | 2608 | 1584 | 3632 | 304 |
| 776 | 2824 | 1800 | 3848 | 136 | 2184 | 1160 | 3208 | 648 | 2696 | 1672 | 3720 | 392 | 2440 | 1416 | 3464 |
| 4008 | 104 | 2152 | 1128 | 3176 | 616 | 2664 | 1640 | 3688 | 360 | 2408 | 1384 | 3432 | 872 | 2920 | 1896 |
| 1240 | 3288 | 728 | 2776 | 1752 | 3800 | 472 | 2520 | 1496 | 3544 | 984 | 3032 | 2008 | 4056 | 24 | 2072 |
| 2616 | 1592 | 3640 | 312 | 2360 | 1336 | 3384 | 824 | 2872 | 1848 | 3896 | 184 | 2232 | 1208 | 3256 | 696 |
| 388 | 2436 | 1412 | 3460 | 900 | 2948 | 1924 | 3972 | 68 | 2116 | 1092 | 3140 | 580 | 2628 | 1604 | 3652 |
| 3428 | 868 | 2916 | 1892 | 3940 | 228 | 2276 | 1252 | 3300 | 740 | 2788 | 1764 | 3812 | 484 | 2532 | 1508 |
| 2004 | 4052 | 20 | 2068 | 1044 | 3092 | 532 | 2580 | 1556 | 3604 | 276 | 2324 | 1300 | 3348 | 788 | 2836 |
| 2228 | 1204 | 3252 | 692 | 2740 | 1716 | 3764 | 436 | 2484 | 1460 | 3508 | 948 | 2996 | 1972 | 4020 | 116 |
| 588 | 2636 | 1612 | 3660 | 332 | 2380 | 1356 | 3404 | 844 | 2892 | 1868 | 3916 | 204 | 2252 | 1228 | 3276 |
| 3820 | 492 | 2540 | 1516 | 3564 | 1004 | 3052 | 2028 | 4076 | 44 | 2092 | 1068 | 3116 | 556 | 2604 | 1580 |
| 1308 | 3356 | 796 | 2844 | 1820 | 3868 | 156 | 2204 | 1180 | 3228 | 668 | 2716 | 1692 | 3740 | 412 | 2460 |
| 3004 | 1980 | 4028 | 124 | 2172 | 1148 | 3196 | 636 | 2684 | 1660 | 3708 | 380 | 2428 | 1404 | 3452 | 892 |

FIG.17B FOR BACKWARD SCANS 1702

| 0 | 4032 | 1984 | 3008 | 960 | 3520 | 1472 | 2496 | 448 | 3776 | 1728 | 2752 | 704 | 3264 | 1216 | 2240 |
|---|---|---|---|---|---|---|---|---|---|---|---|---|---|---|---|
| 3232 | 1184 | 2208 | 160 | 3872 | 1824 | 2848 | 800 | 3360 | 1312 | 2336 | 288 | 3616 | 1568 | 2592 | 544 |
| 1616 | 2640 | 592 | 3152 | 1104 | 2128 | 80 | 3984 | 1936 | 2960 | 912 | 3472 | 1424 | 2448 | 400 | 3728 |
| 2544 | 496 | 3824 | 1776 | 2800 | 752 | 3312 | 1264 | 2288 | 240 | 3952 | 1904 | 2928 | 880 | 3440 | 1392 |
| 776 | 3336 | 1288 | 2312 | 264 | 3592 | 1544 | 2568 | 520 | 3080 | 1032 | 2056 | 8 | 4040 | 1992 | 3016 |
| 4008 | 1960 | 2984 | 936 | 3496 | 1448 | 2472 | 424 | 3752 | 1704 | 2728 | 680 | 3240 | 1192 | 2216 | 168 |
| 1240 | 2264 | 216 | 3928 | 1880 | 2904 | 856 | 3416 | 1368 | 2392 | 344 | 3672 | 1624 | 2648 | 600 | 3160 |
| 2616 | 568 | 3128 | 1080 | 2104 | 56 | 4088 | 2040 | 3064 | 1016 | 3576 | 1528 | 2552 | 504 | 3832 | 1784 |
| 388 | 3716 | 1668 | 2692 | 644 | 3204 | 1156 | 2180 | 132 | 3844 | 1796 | 2820 | 772 | 3332 | 1284 | 2308 |
| 3428 | 1380 | 2404 | 356 | 3684 | 1636 | 2660 | 612 | 3172 | 1124 | 2148 | 100 | 4004 | 1956 | 2980 | 932 |
| 2004 | 3028 | 980 | 3540 | 1492 | 2516 | 468 | 3796 | 1748 | 2772 | 724 | 3284 | 1236 | 2260 | 212 | 3924 |
| 2228 | 180 | 3892 | 1844 | 2868 | 820 | 3380 | 1332 | 2356 | 308 | 3636 | 1588 | 2612 | 564 | 3124 | 1076 |
| 588 | 3148 | 1100 | 2124 | 76 | 3980 | 1932 | 2956 | 908 | 3468 | 1420 | 2444 | 396 | 3724 | 1676 | 2700 |
| 3820 | 1772 | 2796 | 748 | 3308 | 1260 | 2284 | 236 | 3948 | 1900 | 2924 | 876 | 3436 | 1388 | 2412 | 364 |
| 1308 | 2332 | 284 | 3612 | 1564 | 2588 | 540 | 3100 | 1052 | 2076 | 28 | 4060 | 2012 | 3036 | 988 | 3548 |
| 3004 | 956 | 3516 | 1468 | 2492 | 444 | 3772 | 1724 | 2748 | 700 | 3260 | 1212 | 2236 | 188 | 3900 | 1852 |

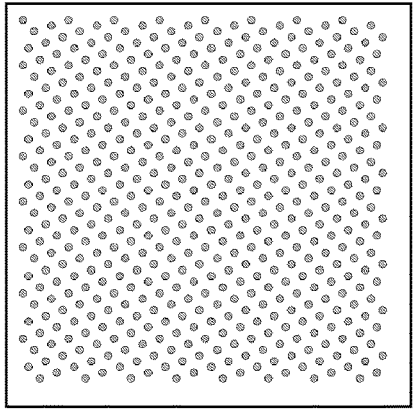
(a)
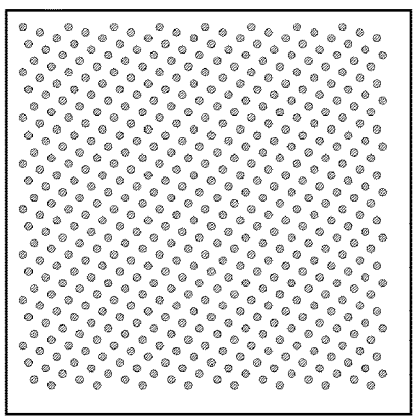
(b)
FIG.23
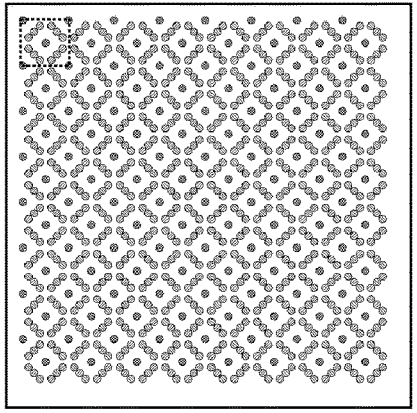
(c)
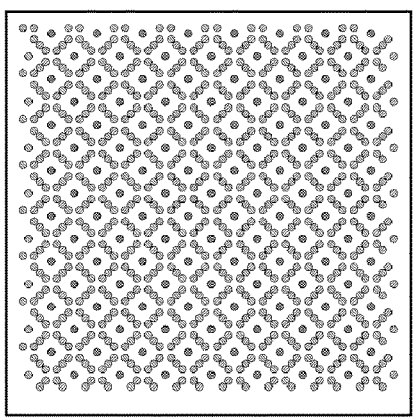
(d)

FOR FORWARD SCANS 2701

| 2359 | 480 | 3006 | 3442 | 2564 | 3937 | 592 | 1176 | 3784 | 2140 | 890 | 3270 | 2238 | 1132 | 2672 | 4092 |
|---|---|---|---|---|---|---|---|---|---|---|---|---|---|---|---|
| 1747 | 3984 | 1140 | 2011 | 807 | 1741 | 2398 | 3280 | 736 | 2883 | 1575 | 2554 | 38 | 3741 | 1807 | 275 |
| 3224 | 737 | 2732 | 22 | 3579 | 3085 | 241 | 1411 | 2010 | 293 | 4003 | 758 | 3384 | 1382 | 2920 | 921 |
| 2438 | 1546 | 3754 | 2256 | 1655 | 959 | 2746 | 3752 | 2508 | 3436 | 1228 | 2170 | 2827 | 842 | 2092 | 3684 |
| 3623 | 298 | 1026 | 2941 | 542 | 4094 | 1931 | 1101 | 464 | 1773 | 3114 | 180 | 1669 | 3921 | 374 | 3081 |
| 3137 | 2631 | 1863 | 3394 | 1273 | 2542 | 131 | 3532 | 2924 | 908 | 2385 | 3670 | 734 | 2601 | 1286 | 2393 |
| 1293 | 665 | 3925 | 183 | 2062 | 3116 | 1420 | 2286 | 1569 | 3927 | 535 | 1986 | 3253 | 1831 | 3625 | 966 |
| 3483 | 2205 | 1513 | 2763 | 1082 | 3835 | 690 | 3254 | 287 | 2621 | 1367 | 2898 | 1094 | 406 | 2839 | 639 |
| 843 | 2946 | 436 | 3648 | 624 | 2571 | 1908 | 1184 | 3643 | 1821 | 3419 | 17 | 4053 | 2427 | 1439 | 3832 |
| 1477 | 1959 | 3266 | 2267 | 1613 | 3493 | 72 | 2836 | 2159 | 719 | 1030 | 2268 | 1708 | 3328 | 174 | 2113 |
| 30 | 4023 | 1234 | 230 | 2914 | 863 | 2082 | 4011 | 368 | 3060 | 3792 | 2810 | 1268 | 800 | 2930 | 1653 |
| 2753 | 903 | 2551 | 1882 | 3859 | 1399 | 3256 | 1093 | 2503 | 1372 | 1951 | 235 | 3524 | 2086 | 3907 | 589 |
| 1733 | 3385 | 383 | 3141 | 679 | 2457 | 263 | 1930 | 3653 | 614 | 3287 | 1003 | 2534 | 347 | 1177 | 2300 |
| 2945 | 1290 | 3682 | 1558 | 2150 | 3572 | 2934 | 915 | 2689 | 1574 | 2194 | 3969 | 1509 | 3118 | 3589 | 1581 |
| 141 | 2387 | 994 | 2894 | 64 | 1241 | 1782 | 3882 | 495 | 3101 | 51 | 2801 | 562 | 2056 | 878 | 2868 |
| 2009 | 3788 | 528 | 1813 | 4088 | 3079 | 370 | 2228 | 1318 | 3591 | 1870 | 964 | 3751 | 2607 | 259 | 4080 |

FIG.27A

FOR BACKWARD SCANS 2702

| 3421 | 1909 | 234 | 3597 | 609 | 4095 | 315 | 907 | 3609 | 3107 | 1136 | 3820 | 1599 | 3401 | 904 | 3197 |
|---|---|---|---|---|---|---|---|---|---|---|---|---|---|---|---|
| 1034 | 2703 | 1423 | 2255 | 2783 | 1736 | 3400 | 2245 | 1676 | 595 | 2374 | 228 | 2858 | 505 | 2547 | 1720 |
| 159 | 3786 | 809 | 3234 | 1336 | 98 | 2976 | 1123 | 2670 | 3970 | 1307 | 3315 | 1926 | 1262 | 4018 | 189 |
| 2031 | 2871 | 1811 | 422 | 3892 | 2106 | 806 | 3745 | 258 | 1945 | 2994 | 751 | 3666 | 2328 | 830 | 3393 |
| 600 | 1224 | 3404 | 2395 | 1156 | 3452 | 2496 | 1597 | 3205 | 1081 | 2421 | 1626 | 420 | 3156 | 1876 | 2685 |
| 1745 | 4039 | 54 | 2937 | 655 | 1934 | 342 | 2837 | 707 | 3590 | 134 | 3909 | 2759 | 1343 | 87 | 3838 |
| 2486 | 992 | 2131 | 1548 | 3698 | 3146 | 1215 | 4028 | 2083 | 1400 | 2620 | 1797 | 918 | 3550 | 2257 | 1508 |
| 246 | 2881 | 3321 | 791 | 2327 | 190 | 1703 | 2446 | 377 | 3031 | 840 | 3283 | 2380 | 345 | 3011 | 681 |
| 3789 | 1793 | 367 | 3897 | 1119 | 2826 | 3730 | 1004 | 3396 | 1567 | 3790 | 534 | 1444 | 4079 | 1953 | 1213 |
| 2448 | 1204 | 2692 | 1917 | 3221 | 2087 | 473 | 2658 | 1847 | 11 | 2493 | 1933 | 2955 | 955 | 3381 | 164 |
| 3209 | 492 | 3444 | 836 | 83 | 1592 | 3507 | 771 | 3941 | 2997 | 1090 | 3702 | 255 | 2218 | 2633 | 1486 |
| 2076 | 3736 | 1426 | 2472 | 4064 | 2931 | 1219 | 2454 | 1366 | 2019 | 423 | 3210 | 1726 | 811 | 3817 | 476 |
| 602 | 1127 | 2973 | 1764 | 996 | 2278 | 273 | 3147 | 590 | 3567 | 2295 | 1246 | 2698 | 3447 | 1304 | 3206 |
| 3929 | 2412 | 195 | 3279 | 465 | 3560 | 1833 | 3871 | 1674 | 2798 | 727 | 4008 | 73 | 1883 | 669 | 2185 |
| 1585 | 850 | 3665 | 1949 | 2744 | 1287 | 698 | 2499 | 169 | 1190 | 3109 | 1461 | 2344 | 2905 | 3877 | 1576 |
| 3463 | 2721 | 1257 | 618 | 3905 | 2171 | 3037 | 3469 | 2147 | 3695 | 1890 | 433 | 3317 | 975 | 290 | 2466 |

FIG.27B

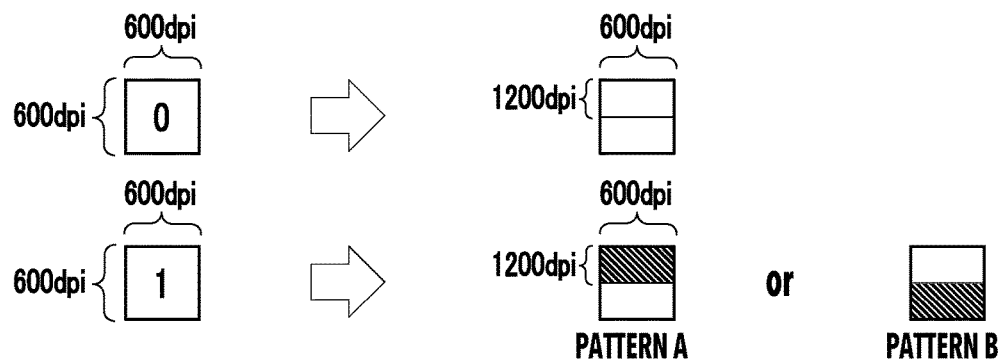
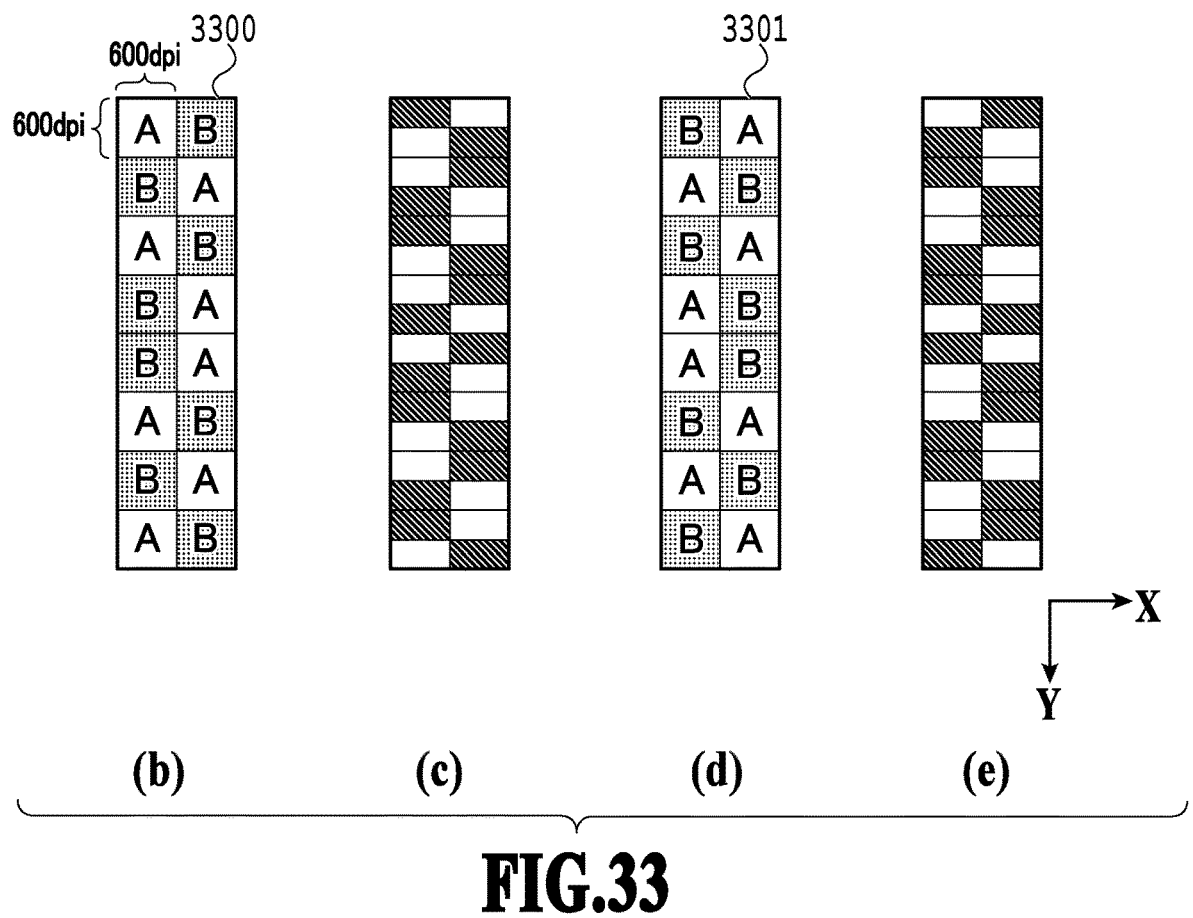
FIG.33

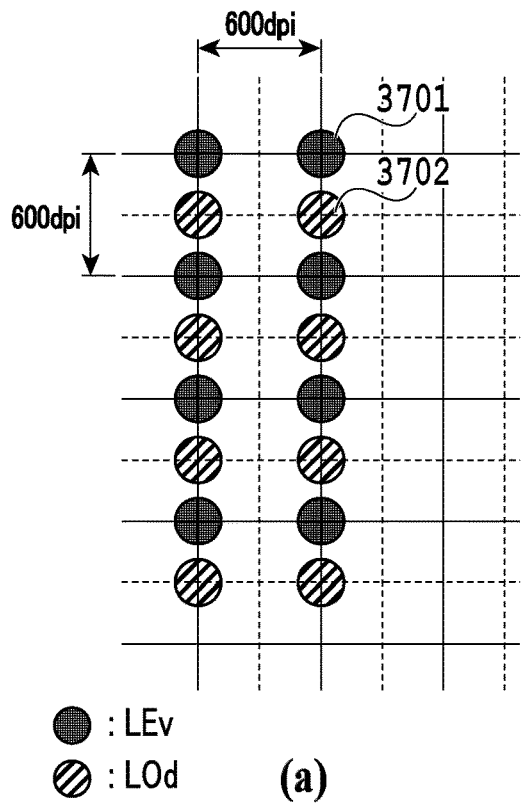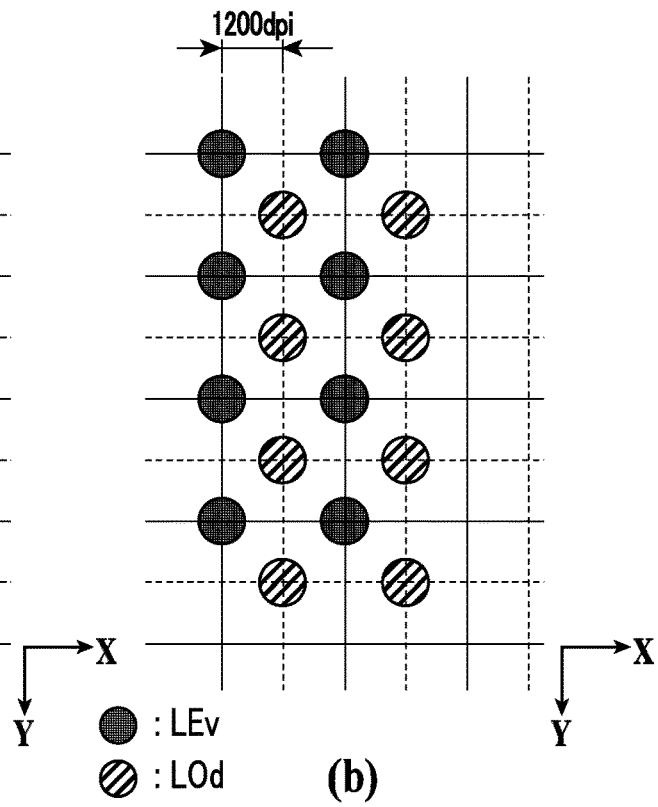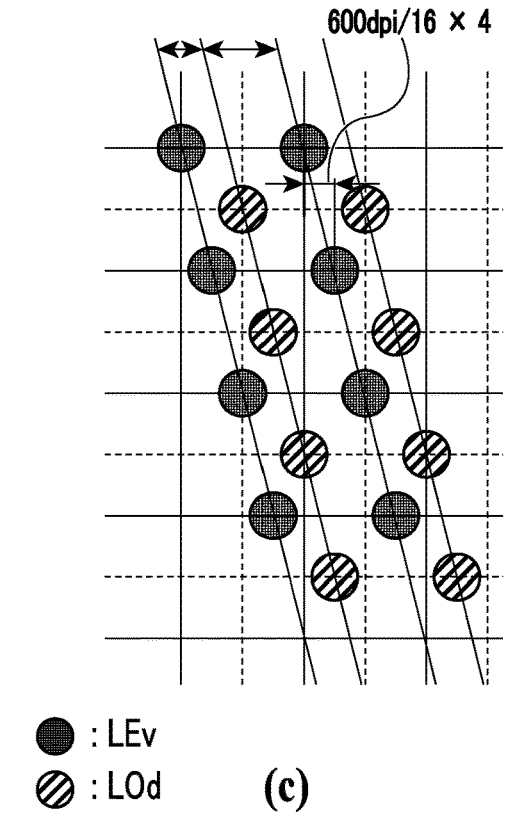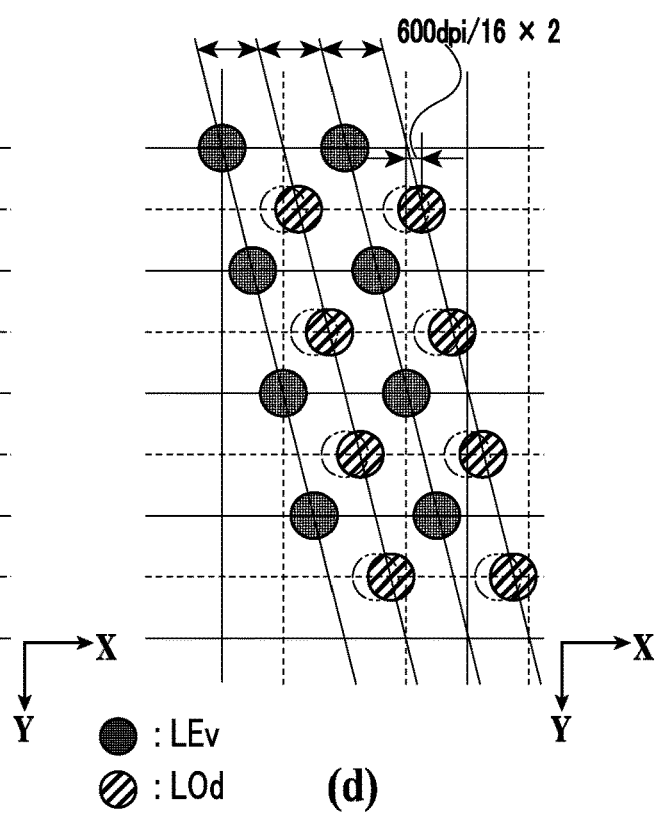
FIG.37

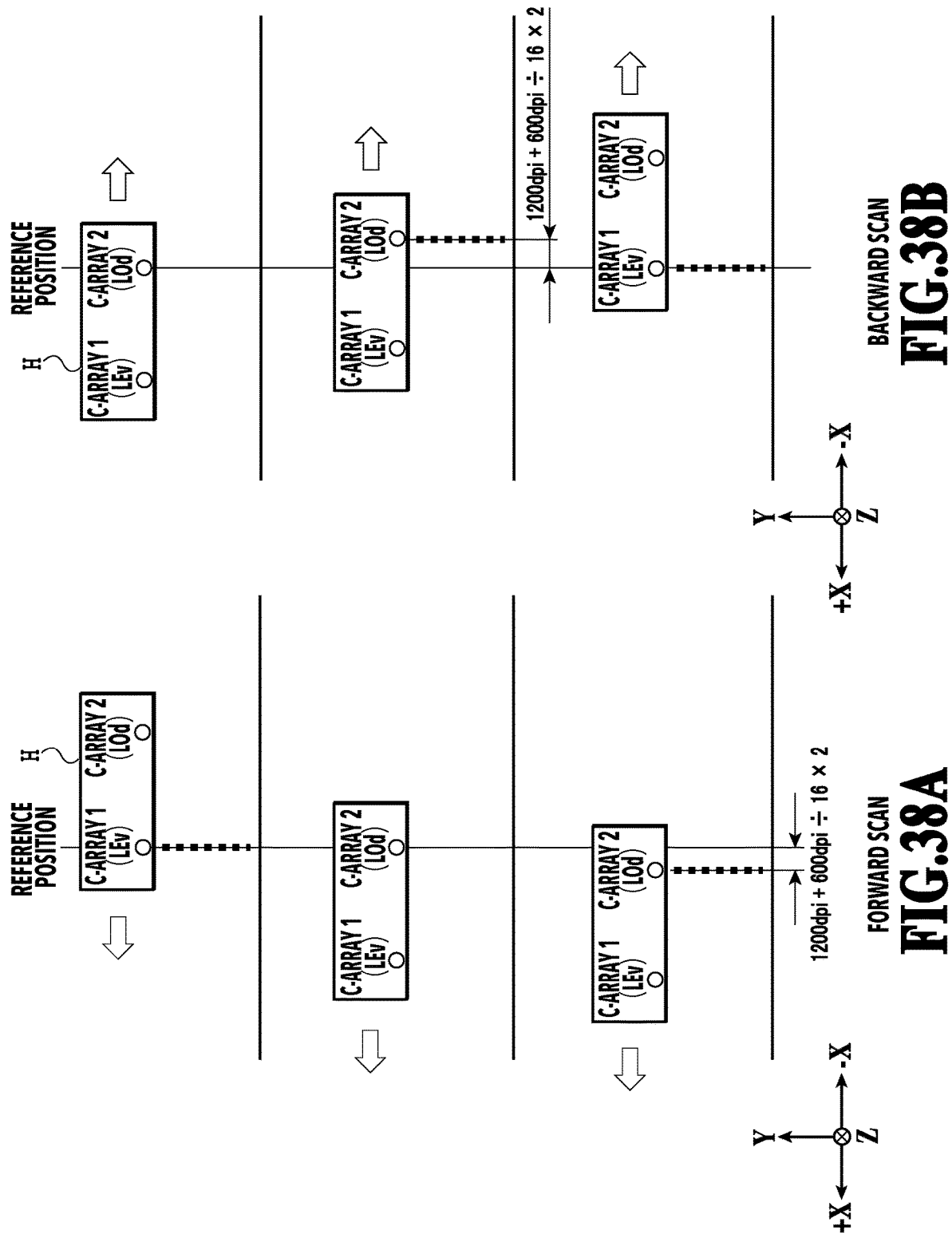

FIG.39A — FOR FORWARD SCANS 3901

| 0 | 672 | 512 | 416 | 256 | 928 | 768 | 96 | 128 | 608 | 640 | 352 | 384 | 864 | 896 | 224 |
|---|---|---|---|---|---|---|---|---|---|---|---|---|---|---|---|
| 496 | 336 | 1008 | 848 | 48 | 208 | 560 | 720 | 304 | 464 | 816 | 976 | 176 | 16 | 688 | 528 |
| 776 | 104 | 136 | 616 | 648 | 360 | 392 | 872 | 904 | 232 | 72 | 744 | 584 | 488 | 328 | 1000 |
| 568 | 728 | 312 | 472 | 824 | 984 | 184 | 24 | 696 | 536 | 440 | 280 | 952 | 792 | 120 | 152 |
| 356 | 388 | 868 | 900 | 228 | 68 | 740 | 580 | 484 | 324 | 996 | 836 | 36 | 196 | 548 | 708 |
| 980 | 180 | 20 | 692 | 532 | 436 | 276 | 948 | 788 | 116 | 148 | 628 | 660 | 372 | 404 | 884 |
| 748 | 588 | 492 | 332 | 1004 | 844 | 44 | 204 | 556 | 716 | 300 | 460 | 812 | 972 | 172 | 12 |
| 284 | 956 | 796 | 124 | 156 | 636 | 668 | 380 | 412 | 892 | 924 | 252 | 92 | 764 | 604 | 508 |
| 834 | 34 | 194 | 546 | 706 | 290 | 450 | 802 | 962 | 162 | 2 | 674 | 514 | 418 | 258 | 930 |
| 626 | 658 | 370 | 402 | 882 | 914 | 242 | 82 | 754 | 594 | 498 | 338 | 1010 | 850 | 50 | 210 |
| 458 | 810 | 970 | 170 | 10 | 682 | 522 | 426 | 266 | 938 | 778 | 106 | 138 | 618 | 650 | 362 |
| 250 | 90 | 762 | 602 | 506 | 346 | 1018 | 858 | 58 | 218 | 570 | 730 | 314 | 474 | 826 | 986 |
| 678 | 518 | 422 | 262 | 934 | 774 | 102 | 134 | 614 | 646 | 358 | 390 | 870 | 902 | 230 | 70 |
| 342 | 1014 | 854 | 54 | 214 | 566 | 726 | 310 | 470 | 822 | 982 | 182 | 22 | 694 | 534 | 438 |
| 110 | 142 | 622 | 654 | 366 | 398 | 878 | 910 | 238 | 78 | 750 | 590 | 494 | 334 | 1006 | 846 |
| 734 | 318 | 478 | 830 | 990 | 190 | 30 | 702 | 542 | 446 | 286 | 958 | 798 | 126 | 158 | 638 |

FIG.39B — FOR BACKWARD SCANS 3902

| 160 | 960 | 800 | 448 | 288 | 704 | 544 | 192 | 32 | 832 | 992 | 320 | 480 | 576 | 736 | 64 |
|---|---|---|---|---|---|---|---|---|---|---|---|---|---|---|---|
| 592 | 752 | 80 | 240 | 912 | 880 | 400 | 368 | 656 | 624 | 144 | 112 | 784 | 944 | 272 | 432 |
| 936 | 264 | 424 | 520 | 680 | 8 | 168 | 968 | 808 | 456 | 296 | 712 | 552 | 200 | 40 | 840 |
| 216 | 56 | 856 | 1016 | 344 | 504 | 600 | 760 | 88 | 248 | 920 | 888 | 408 | 376 | 664 | 632 |
| 644 | 612 | 132 | 100 | 772 | 932 | 260 | 420 | 516 | 676 | 4 | 164 | 964 | 804 | 452 | 292 |
| 820 | 468 | 308 | 724 | 564 | 212 | 52 | 852 | 1012 | 340 | 500 | 596 | 756 | 84 | 244 | 916 |
| 76 | 236 | 908 | 876 | 396 | 364 | 652 | 620 | 140 | 108 | 780 | 940 | 268 | 428 | 524 | 684 |
| 444 | 540 | 700 | 28 | 188 | 988 | 828 | 476 | 316 | 732 | 572 | 220 | 60 | 860 | 1020 | 348 |
| 994 | 322 | 482 | 578 | 738 | 66 | 226 | 898 | 866 | 386 | 354 | 642 | 610 | 130 | 98 | 770 |
| 146 | 114 | 786 | 946 | 274 | 434 | 530 | 690 | 18 | 178 | 978 | 818 | 466 | 306 | 722 | 562 |
| 298 | 714 | 554 | 202 | 42 | 842 | 1002 | 330 | 490 | 586 | 746 | 74 | 234 | 906 | 874 | 394 |
| 922 | 890 | 410 | 378 | 666 | 634 | 154 | 122 | 794 | 954 | 282 | 442 | 538 | 698 | 26 | 186 |
| 6 | 166 | 966 | 806 | 454 | 294 | 710 | 550 | 198 | 38 | 838 | 998 | 326 | 486 | 582 | 742 |
| 502 | 598 | 758 | 86 | 246 | 918 | 886 | 406 | 374 | 662 | 630 | 150 | 118 | 790 | 950 | 278 |
| 782 | 942 | 270 | 430 | 526 | 686 | 14 | 174 | 974 | 814 | 462 | 302 | 718 | 558 | 206 | 46 |
| 574 | 222 | 62 | 862 | 1022 | 350 | 510 | 606 | 766 | 94 | 254 | 926 | 894 | 414 | 382 | 670 |

APPARATUS, METHOD FOR CONTROLLING APPARATUS, STORAGE MEDIUM, AND PRINTING APPARATUS, WITH INCREASE IN NUMBER OF DOTS FROM FIRST DOT PATTERN TO THIRD DOT PATTERN BEING LARGER OR SMALLER THAN INCREASE IN NUMBER OF DOTS FROM SECOND DOT PATTERN TO FOURTH DOT PATTERN

BACKGROUND

Field

The present disclosure relates to a technique for output tone correction.

Description of the Related Art

In a printing apparatus that prints an image by moving a print head and a print medium relative to each other, displacement of print positions in association with this relative movement may make graininess and density unevenness of the image conspicuous. For example, in a case where multi-pass printing is performed by a serial-type inkjet printing apparatus, if the print positions are displaced in a given print scan, then relative displacement of a group of dots printed by a different print scan may affect the dispersiveness of the dots and be sensed as graininess or uneven density.

Japanese Patent Laid-Open No. 2014-113819 (hereinafter referred to as Patent Literature 1) discloses a method for creating a threshold matrix for each of a first print scan and a second print scan so as to stabilize the dot coverage on a print medium even in a case where print positions are displaced between the first print scan and the second print scan.

SUMMARY

However, while the configuration in Patent Literature 1 can mitigate changes in density unevenness and graininess, there is a problem to be addressed in regard to graininess present in an original image.

Thus, in view of the above problem, the present disclosure has an object to provide a high quality image without conspicuous graininess and density unevenness even in a case where displacement of print positions occurs in association with the relative movement between a print head and a print medium.

An embodiment of the present invention is an apparatus for printing a plurality of dot patterns on a printing medium, the dot patterns being formed by substantially same color and substantially same dot diameter, the apparatus including: a first creation unit configured to create, based on a first tone value, a first dot pattern and a second dot pattern printed and superimposed on the first dot pattern; and a second creation unit configured to create, based on a second tone value larger than the first tone value, a third dot pattern having an equal or larger number of dots compared to the first dot pattern and a fourth dot pattern printed and superimposed on the third dot pattern and having an equal or larger number of dots compared to the second dot pattern, the second creation unit creating the third dot pattern and the fourth dot pattern so that an increase in the number of dots from the first dot pattern to the third dot pattern is larger or smaller than an increase in the number of dots from the second dot pattern to the fourth dot pattern.

Further features of the present invention will become apparent from the following description of exemplary embodiments with reference to the attached drawings.

BRIEF DESCRIPTION OF THE DRAWINGS

FIGS. 17A and 17B are diagrams showing threshold matrices;

FIG. 23 is diagram showing dot patterns according to quantization processing results;

FIGS. 27A and 27B are diagrams showing threshold matrices;

FIG. 33 is diagram showing a dot arrangement pattern and reference index patterns;

FIG. 37 is diagram illustrating driving control;

FIGS. 38A and 38B are diagrams illustrating shifting of driving timing in forward and backward scans;

FIGS. 39A and 39B are diagrams showing threshold matrices used in the second embodiment;

DESCRIPTION OF THE EMBODIMENTS

<Characteristics of a Robust Pattern>

First, a robust pattern commonly usable in embodiments of the present disclosure is described. Herein, a robust pattern is a dot pattern formed by two dot patterns printed and superimposed on each other on a predetermined pixel region and has characteristics such that relative displacement between the two dot patterns does not greatly change the dot coverage and graininess in the pixel region. Note that a coverage is the percentage of the area covered by dots in relation to a print medium.

Figure 1:
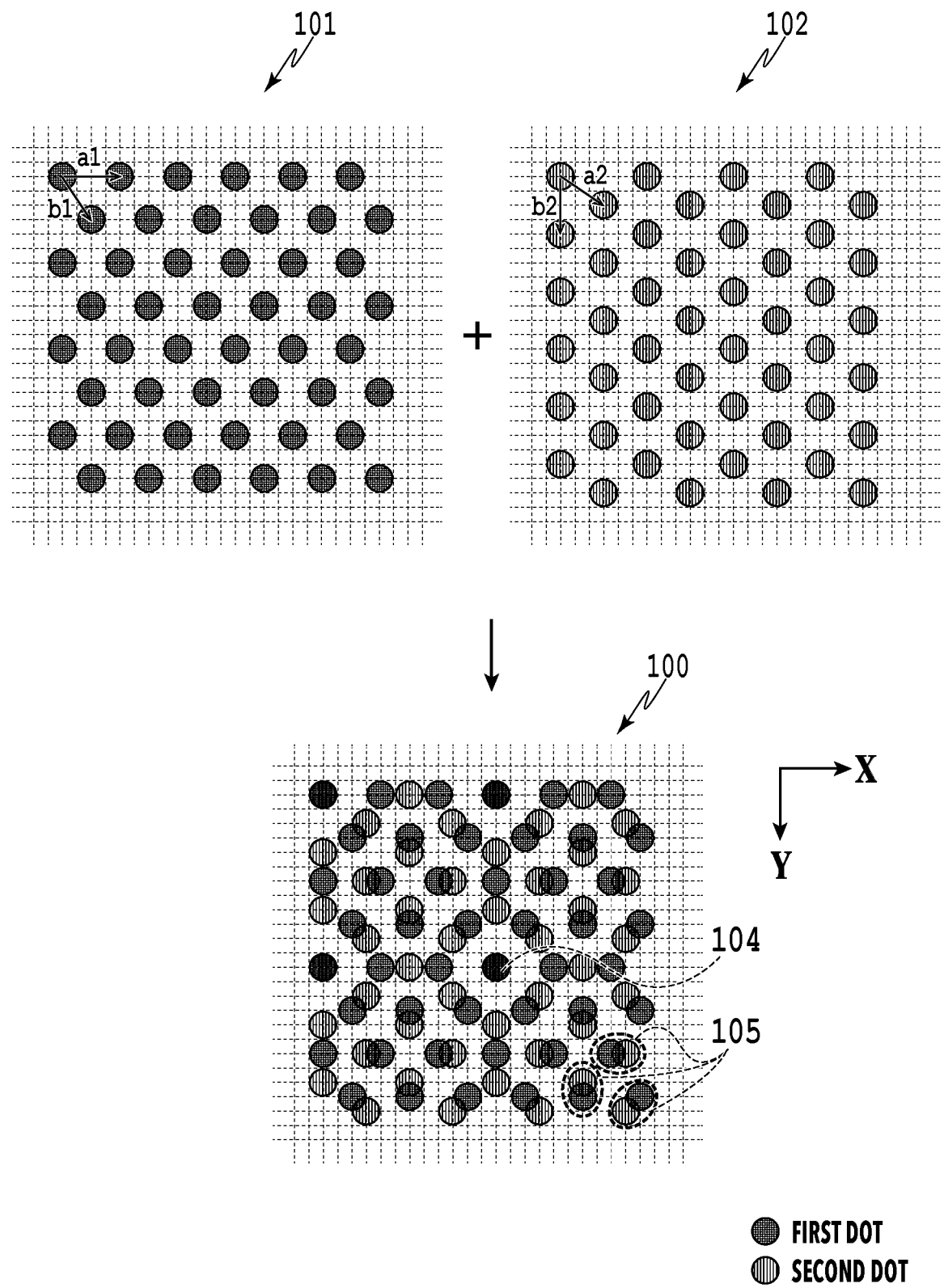
FIG. 1 is a diagram showing an example of a robust pattern.

FIG. 1 is a diagram showing an example of a robust pattern. Shown here is a state where dots with a diameter of 42 μm are selectively arranged with respect to pixel positions arranged on the XY plane at 1200 dpi. FIG. 1 shows how a robust pattern 100 is formed by superimposition of a first dot pattern 101 formed by a group of first dots and a second dot pattern 102 formed by a group of second dots. Although a segment cut from the pattern is shown here, each pattern is laid repeatedly in the X-direction and in the Y-direction. Also, although dots of the first dot pattern and dots of the second dot pattern are exactly the same in color and dot diameter here, they only have to be substantially the same.

<Displacement on a Pixel Basis>

Figure 2:
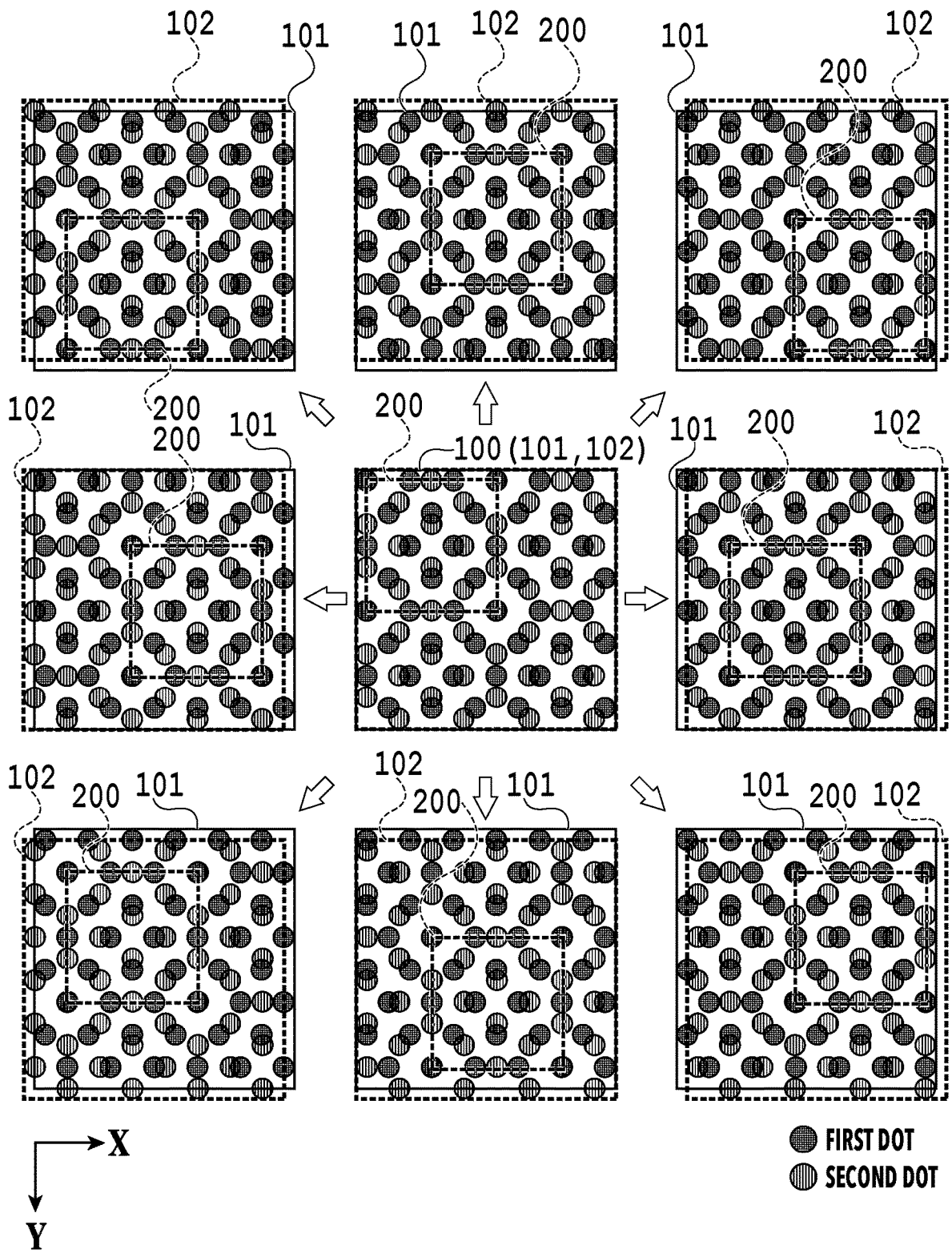
FIG. 2 is a diagram showing states where the first and second dot patterns are displaced.

FIG. 2 is a diagram showing states where the second dot pattern 102 is displaced from the first dot pattern 101 on a pixel basis. The center one shows a state where there is no displacement and is equal to the robust pattern 100 in FIG. 1. The surrounding patterns are patterns in which the second dot pattern 102 is displaced from the first dot pattern 101 by one pixel (21 μm) in eight directions on the XY plane.

It can be seen that each dot pattern has the same repeated pattern 200. It can also be seen that these nine patterns have the repeated pattern 200 appearing at different positions but are substantially the same dot pattern, lined with the same repeated pattern 200 vertically and laterally. Then, even in a case where the second dot pattern 102 is displaced by one pixel further in the same direction in each of the surrounding eight patterns, a pattern lined with the repeated pattern 200 vertically and laterally is obtained, as is similar to the above.

In this way, the robust pattern 100 has characteristics such that even in a case where the first dot pattern 101 and the second dot pattern 102 are displaced relative to each other, a similar dot pattern can be obtained irrespective of the amount or direction of the displacement. Hereinafter, the characteristics such that even in a case where the first dot pattern 101 and the second dot pattern 102 are displaced relatively in the X and Y directions, a pattern having the same repeated pattern 200 located at a different phase is obtained is called "translational symmetry." Also, the smallest displacement that the "translational symmetry" recurs is called a "transitional symmetry recurrence cycle." In the robust pattern described with FIGS. 1 to 3B, one pixel (21 μm) at 1200 dpi is the "transitional symmetry recurrence cycle."

Figure 3A:
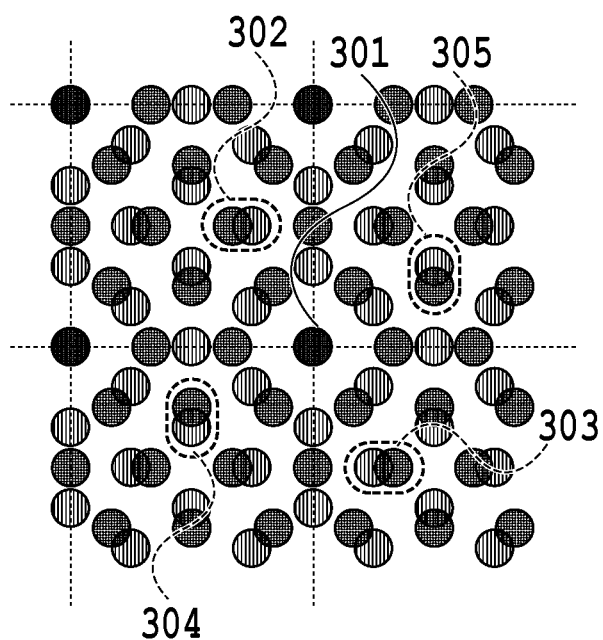
FIGS. 3A and 3B are diagrams illustrating displacement and recurrence of a transitional symmetric dot pattern.
Figure 3B:
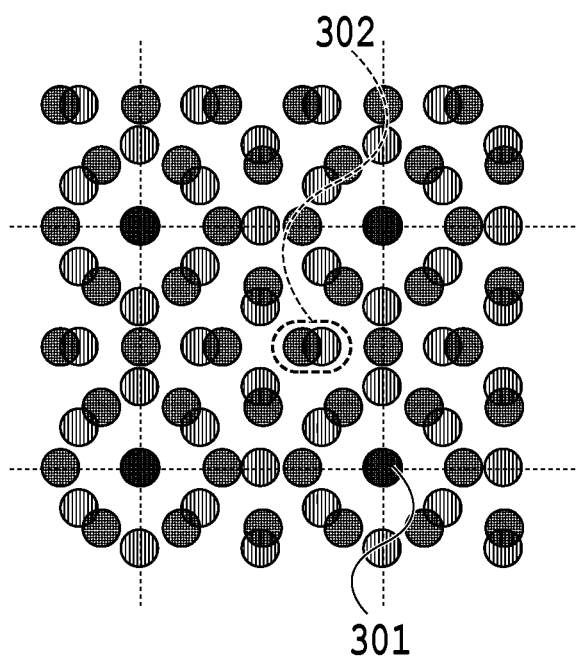

FIGS. 3A and 3B are diagrams illustrating the mechanism of how the transitional symmetry is obtained in a robust pattern.

FIG. 3A shows a state where there is no displacement between the first dot pattern 101 and the second dot pattern 102. The dot pattern shown in FIG. 3A includes sets of superimposed dots 301 each formed by superimposition of a first dot forming the first dot pattern 101 and a second dot forming the second dot pattern 102. The dot pattern also includes sets of proximate dots 302 to 305 each formed by a first dot and a second dot partially superimposed on each other and single dots that are not superimposed on other dots. In FIGS. 3A and 3B, reference lines passing through the centers of the superimposed dots 301 are indicated by broken lines.

Focusing on a given set of superimposed dots 301, the arrangement of its surrounding first and second dots is point-symmetric about the given set of superimposed dots 301. For instance, in FIG. 3A, the proximate dots 303 formed by a second dot on the left and a first dot on the right are located at a position point-symmetric to the proximate dots 302 formed by a first dot on the left and a second dot on the right with respect to the superimposed dots 301. Also, the proximate dots 305 formed by a second dot at the top and a first dot at the bottom are located at a position point-symmetric to the proximate dots 304 formed by a first dot at the top and a second dot at the bottom about the superimposed dots 301.

FIG. 3B shows a state where the second dot pattern 102 is displaced from the first dot pattern 101 by one pixel (21 μm) in the +X-direction. In FIG. 3B, the superimposed dots 301 shown in FIG. 3A change into the proximate dots 302 formed by a first dot on the left and a second dot on the right. Also, the proximate dots 303 formed by a second dot on the left and a first dot on the right shown in FIG. 3A change into the superimposed dots 301 in FIG. 3B.

In a comparison between FIGS. 3A and 3B, the positions of the superimposed dots 301 change between FIG. 3A and FIG. 3B, but the number and cycle of the superimposed dots 301, i.e., the number and cycle of the reference lines, do not change. Further, the layout of the first dots and the second dots in the repeated pattern 200 surrounded by the reference lines does not change either. Thus, even in a case where there is a displacement between the first dot pattern 101 and the second dot pattern 102 on a pixel basis, i.e., in units of a transitional symmetry recurrence cycle, the dot coverage does not increase or decrease within the repeated pattern 200.

<Displacement of Less than a Transitional Symmetric Recurrence Cycle>

Figure 4A:
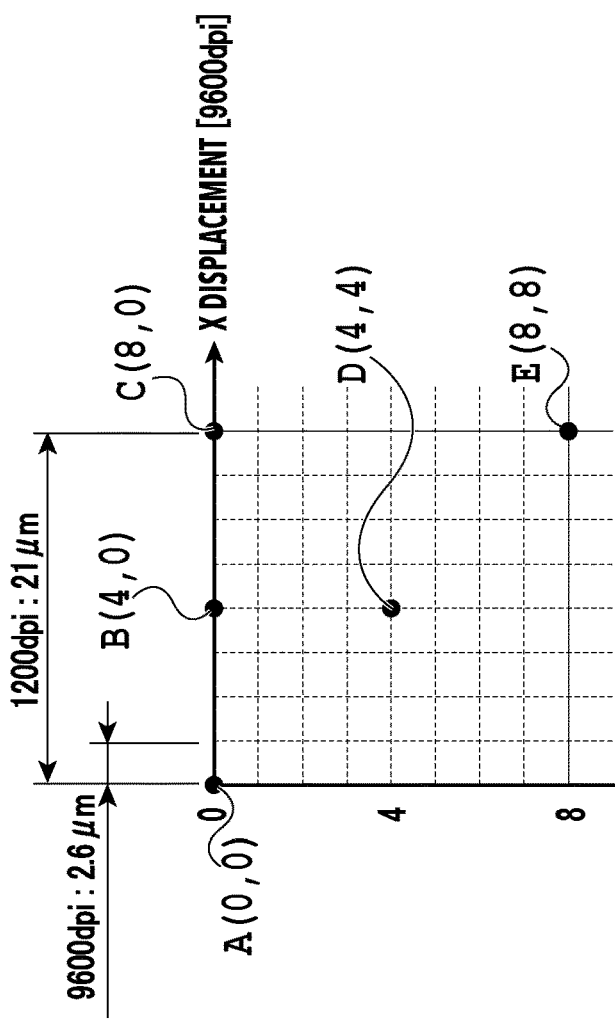
FIGS. 4A and 4B are diagrams showing a displacement within a transitional symmetric dot pattern recurrence cycle.
Figure 4B:
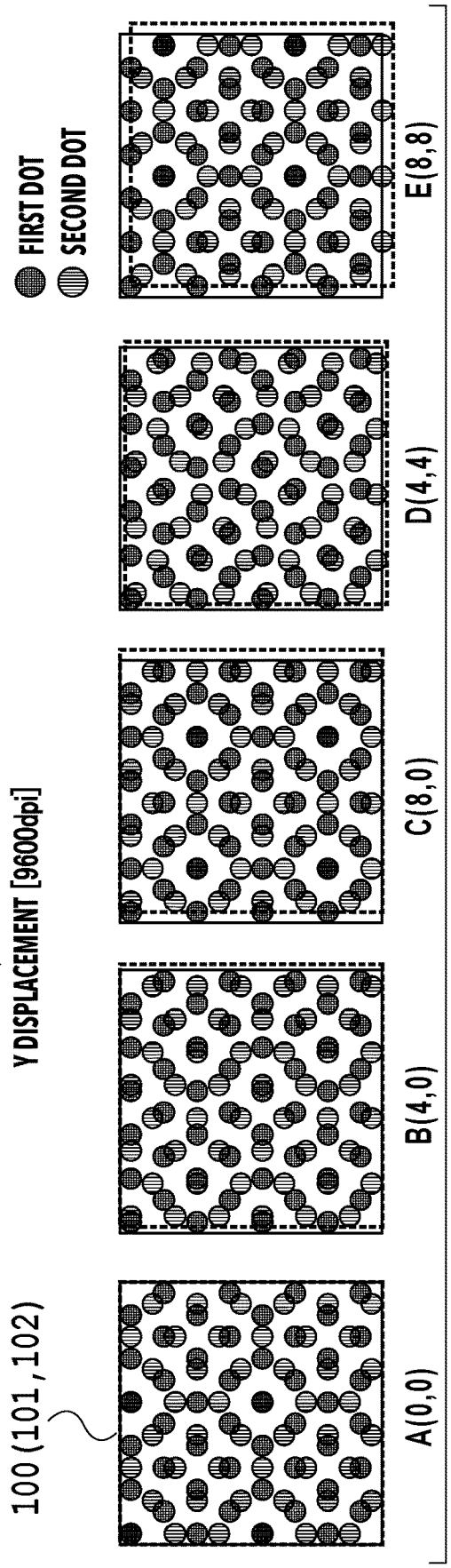

FIGS. 4A and 4B are diagrams illustrating the influence by a displacement less than one pixel (21 μm) between the first dot pattern 101 and the second dot pattern 102. FIG. 4A is a diagram showing the unit of a displacement of less than one pixel, for descriptive purposes. One pixel at 1200 dpi is further divided into 8×8 sections at 9600 dpi. In a case of 9600 dpi, the interval of each grid is approximately 2.6 μm.

FIG. 4B shows a state where the upper left point of the second dot pattern 102 is displaced to various positions with the upper left point of the first dot pattern 101 fixed at an origin A (0, 0). The positions to which the upper left point of the second dot pattern 102 is displaced are the following five points here: a point A (0, 0), a point B (4, 0), a point C (8, 0), a point D (4, 4), and a point E (8, 8). The pattern at the point A (0,0) corresponds to the robust pattern 100 shown in the center of FIG. 2. The pattern at the point C (8, 0) corresponds to the pattern in the right center of FIG. 2, and the pattern at the point E (8, 8) corresponds to the pattern in the lower right of FIG. 2.

Figure 5A:
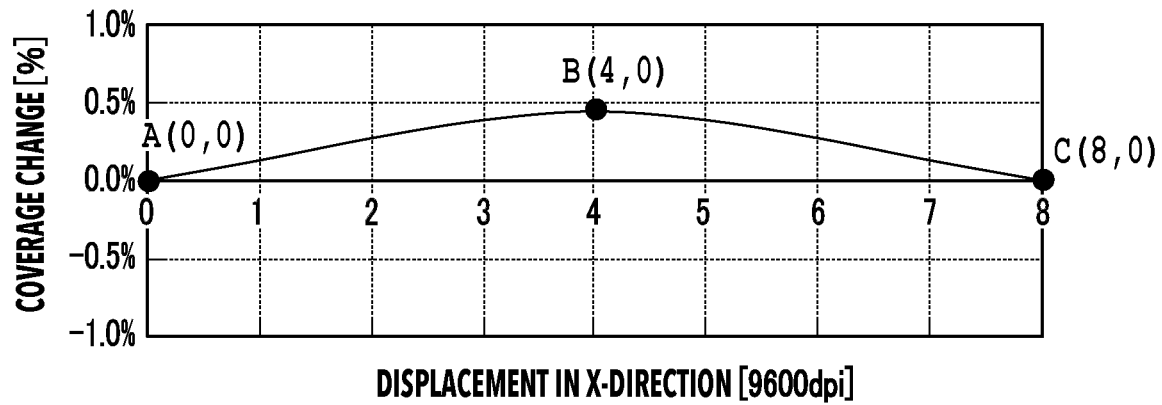
FIGS. 5A and 5B are diagrams illustrating changes in coverage.
Figure 5B:
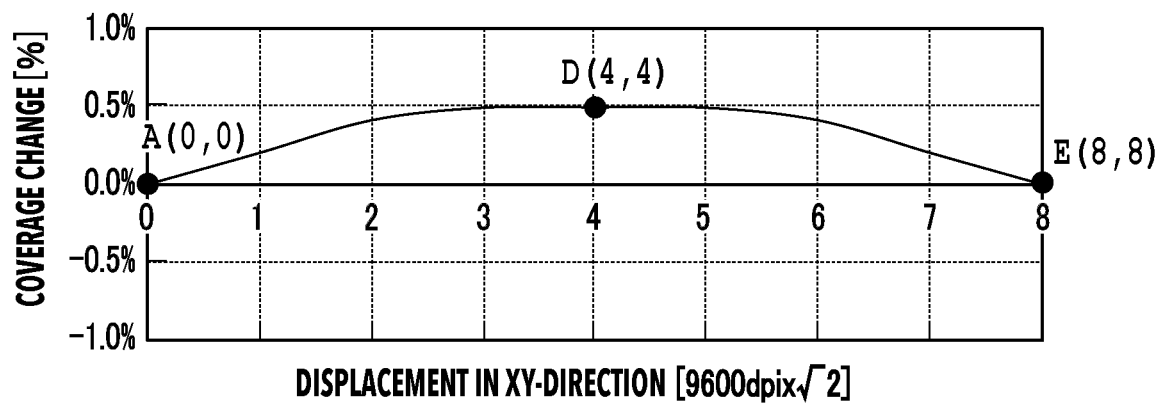

FIGS. 5A and 5B are diagrams showing how the dot coverage is changed by a displacement of less than a transitional symmetry recurrence cycle. FIG. 5A shows how the dot coverage changes in a case where the second dot pattern 102 changes between the point A (0, 0) and the point C (8, 0) in FIG. 4A, i.e., the second dot pattern 102 is displaced in the +X-direction (rightward). Meanwhile, FIG. 5B shows how the dot coverage changes in a case where the second dot pattern changes between the point A (0, 0) and the point E (8, 8), i.e., the second dot pattern is displaced in the +XY-direction (a downward right direction). Here, a dot coverage is the percentage of the area of a paper surface covered by 42-μm-diameter dots, and a dot coverage change is a value indicating how much the dot coverage is changed by a displacement.

In FIG. 5A, the pattern at the point A (0, 0) and the pattern at the point C (8, 0) have a relation such that they are displaced from each other by one transitional symmetry recurrence cycle and therefore have transitional symmetry relative to each other, with the same dot coverage (40.1%). Thus, the dot coverage change is 0% for both patterns. By contrast, the pattern at the point B (4, 0), which is a pattern between the point A (0, 0) and the point C (8, 0), has no transitional symmetry relative to the point A (0, 0) or to the point C (8, 0) and has a higher dot coverage, which is 40.5%. Thus, the dot coverage change is +0.4% (=40.5-40.1).

In FIG. 5B, the pattern at the point A (0, 0) and the pattern at the point E (8, 8) have a relation such that they are displaced by one transitional symmetry recurrence cycle and have transitional symmetry relative to each other, with the same dot coverage (40.1%). Thus, the dot coverage change is 0% for both patterns. By contrast, the pattern at the point D (4, 4), which is a pattern between the point A (0, 0) and the point E (8, 8), has no transitional symmetry relative to the point A (0, 0) or to the point E (8, 8) and has a higher dot coverage, which is 40.6%. Thus, the dot coverage change is +0.5% (=40.6-40.1). However, a change of this extent is sufficiently small compared to the coverage of the paper surface and is unlikely to be sensed visually.

Thus, in the robust pattern described above, a density change caused by a displacement of less than a transitional symmetry recurrence cycle is not visibly sensed, and a displacement in units of a transitional symmetry recurrence cycle does not cause a density change itself. For this reason, the above-described robust pattern is a pattern which makes density unevenness unlikely to occur irrespectively of the direction or the amount of displacement.

<Proximate Dots>

Figure 6:
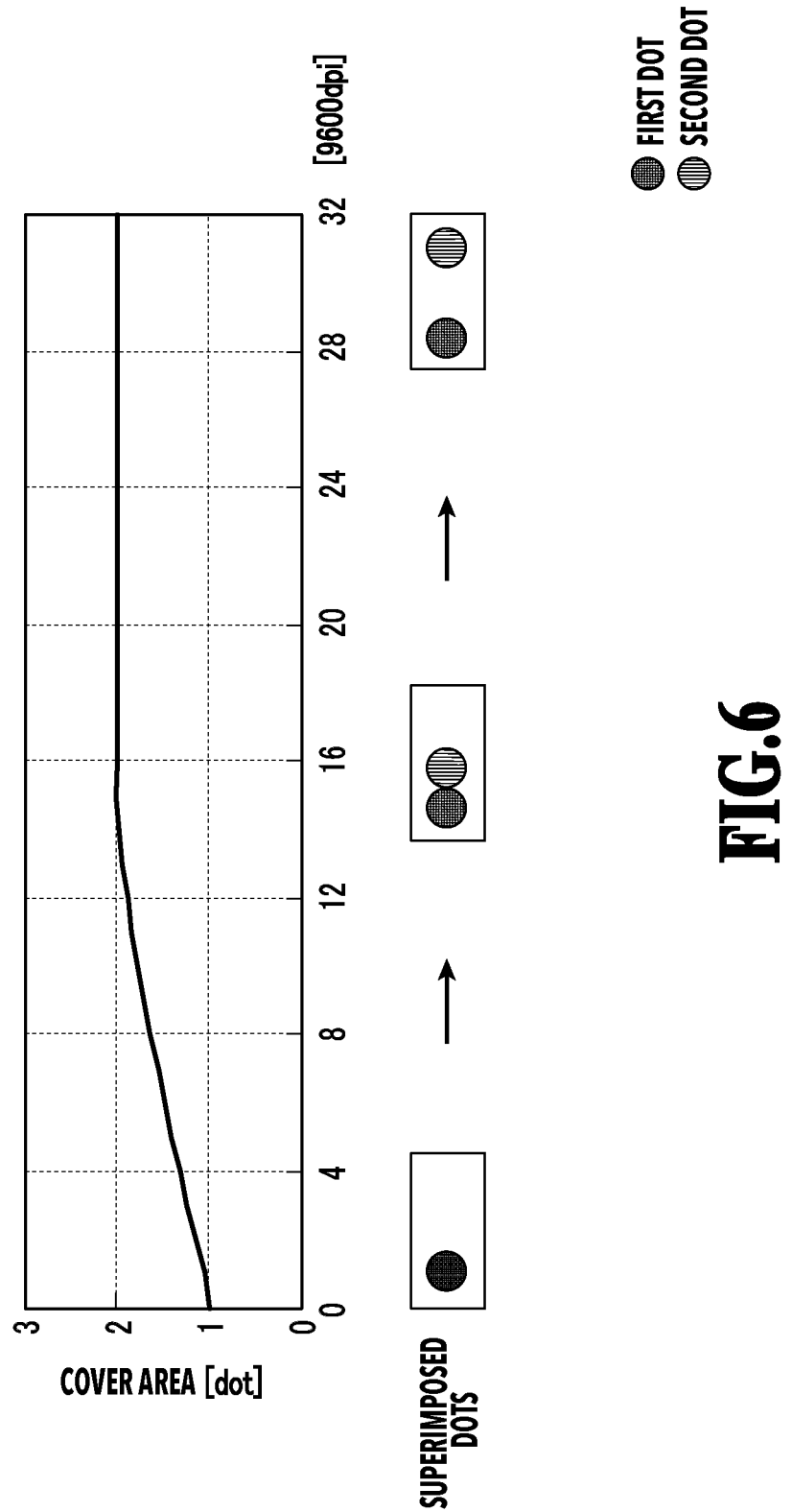
FIG. 6 is a diagram showing a change in cover area caused by separation of superimposed dots.

FIG. 6 is a diagram showing, in a micro manner, a change in cover area caused by separation of superimposed dots. The horizontal axis represents the amount of displacement of a second dot relative to a first dot, and its unit is a pixel at 9600 dpi. One pixel corresponds to approximately 2.6 μm. The vertical axis represents the cover area in relation to a sheet, and its unit is a dot. Specifically, "1" corresponds to a cover area by one dot having a diameter of 42 μm.

In a case where a first dot and a second dot are completely superimposed, the cover area is 1. The more the second dot is displaced from the first dot, the larger the cover area becomes, and with 16 pixels or so, the two dots are completely separated from each other, bringing the cover area to 2. After that, the cover area stays at 2 irrespective of the amount of displacement. However, in a case where there is a displacement between the first and second dot patterns, superimposed dots get separated at some locations, and separated dots change into superimposed dots at some locations, as shown in FIG. 6.

Figure 7A:
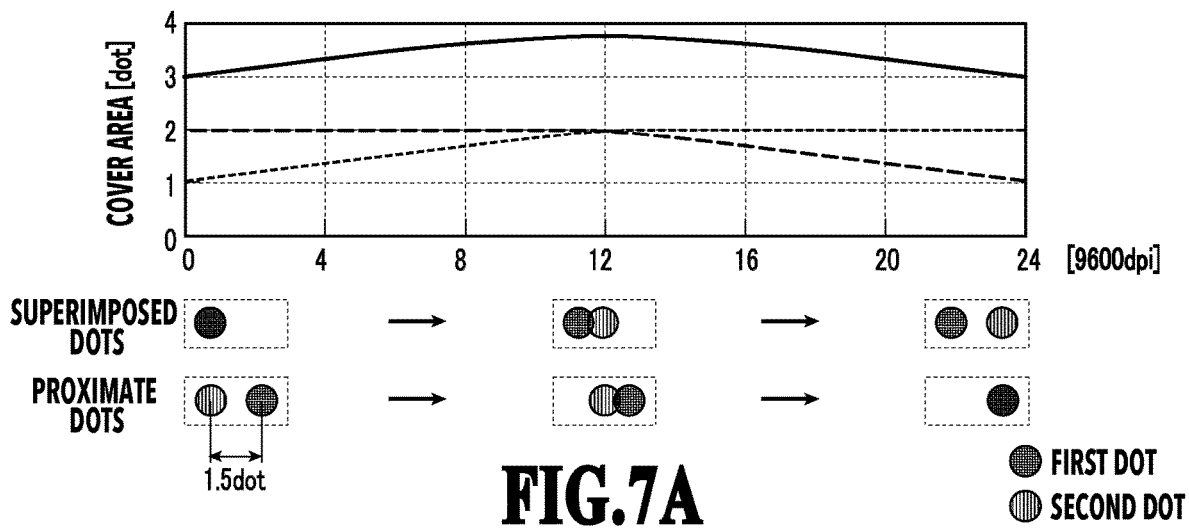
FIGS. 7A to 7C are diagrams showing, in juxtaposition, separation of superimposed dots and superimposition of proximate dots.
Figure 7B:
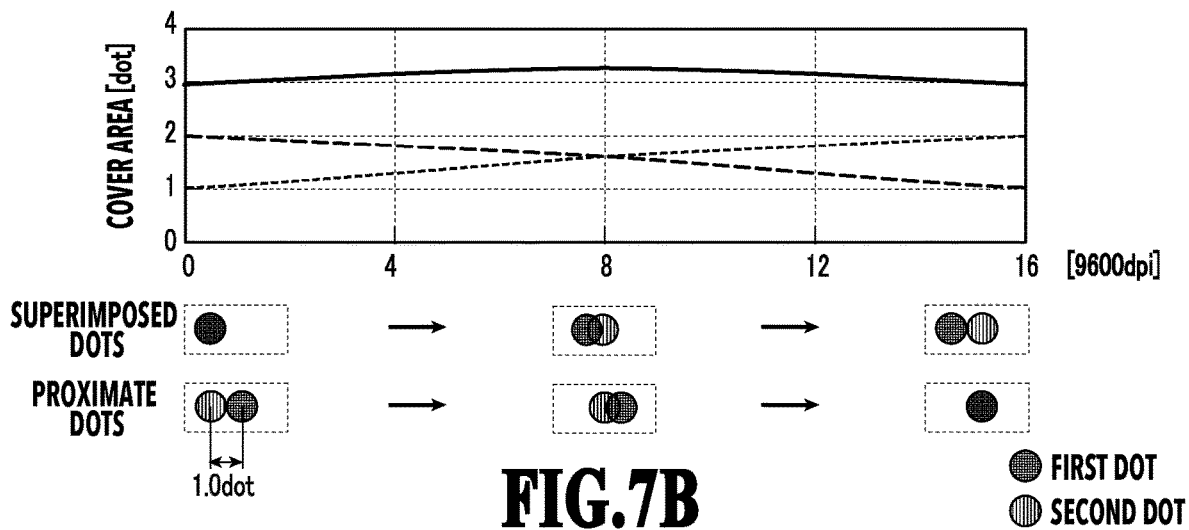
Figure 7C:
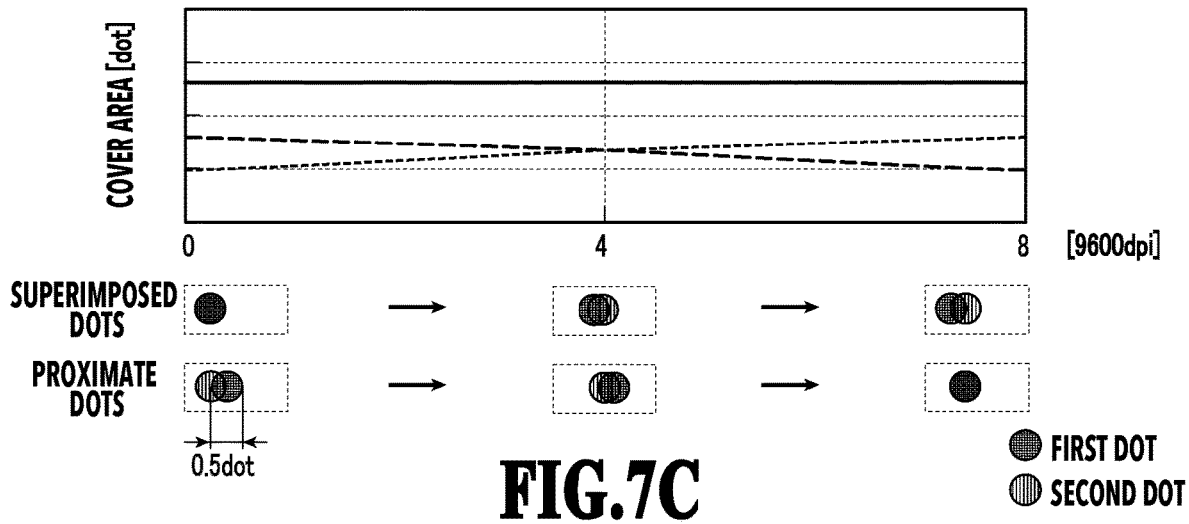

FIGS. 7A to 7C are diagrams showing, in juxtaposition, how superimposed dots become separated and how proximate dots turn into superimposed dots as the first dot pattern 101 and the second dot pattern 102 are displaced relative to each other. FIG. 7A shows how proximate dots away from each other by a distance of 1.5 dots 63 μm) become superimposed, FIG. 7B shows how proximate dots away from each other by a distance of 1.0 dots 42 μm) become superimposed, and FIG. 7C shows how proximate dots away from each other by a distance of 0.5 dots 21 μm) become superimposed. In each of FIGS. 7A to 7C, the cover area of superimposed dots becoming separated is denoted by a dotted line, the cover area of proximate dots becoming superimposed is denoted by a broken line, and the sum of these two cover areas (the total cover area) is denoted by a solid line. Also, in each of FIGS. 7A to 7C, the horizontal axis represents a range over which proximate dots become completely superimposed dots.

In FIG. 7A, the initial and final values of the total cover area are three dots, and the total cover area reaches the maximum value of 3.8 dots at 12 pixels which is a median value. In FIG. 7B, the initial and final values of the total cover area are three dots, and the total cover area reaches the maximum value of 3.3 dots at 8 pixels which is a median value. In FIG. 7C, the total cover area stays stably at 2.6 dots from the initial value to the final value.

Specifically, in a comparison between FIGS. 7A to 7C, in order to mitigate a density change caused by a displacement of less than a transitional symmetry recurrence cycle, it is preferable that the distance between two dots forming proximate dots that are prepared in advance be as small as possible, and it is more preferable that this distance be not greater than 0.5 dots. However, a visually sensible density is not necessarily proportional to the dot coverage rate. In other words, the distance between proximate dots to be prepared in a robust pattern is preferably adjusted appropriately according to print resolution, dot diameter, dot density, and the like.

<Conditions for the Robust Pattern>

The following describes conditions for a pattern as a robust pattern having the characteristics described above.

The first condition is that the first dot pattern and the second dot pattern are formed of grid patterns different from each other.

Here, the definition of a grid pattern is described. Herein, a grid pattern is such that from the position of a given dot, the position of another dot is specifiable using integral multiples of two basis vectors. For instance, the first dot pattern 101 in FIG. 1 can be said to be a grid pattern having a1 and b1 as basis vectors. Also, the second dot pattern 102 can be said to be a grid pattern having a2 and b2 as basis vectors. Then, two grid patterns defined by the same basis vectors can be regarded as the same grid pattern, and two grid patterns defined by different basis vectors can be regarded as different grid patterns. Thus, the first dot pattern 101 having a1 and b1 as basis vectors and the second dot pattern 102 having a2 and b2 as basis vectors are different grid patterns.

In a case where the first dot pattern and the second dot pattern are the same grid pattern, under a situation where a given dot is a superimposed dot, almost all the dots become superimposed dots. In this case, with a displacement of less than an inter-grid distance defined by basis vectors, a transition-symmetric dot pattern does not recur, so that there is a concern that a displacement of less than basis vectors may worsen density unevenness or graininess.

The second condition is that in a case where superimposed dots are generated with given dots, superimposed dots and proximate dots are mixed. On top of that, a first dot and a second dot forming proximate dots need to be located at a distance from each other, the distance being smaller than the inter-grid distance defined by basis vectors.

Figure 8:
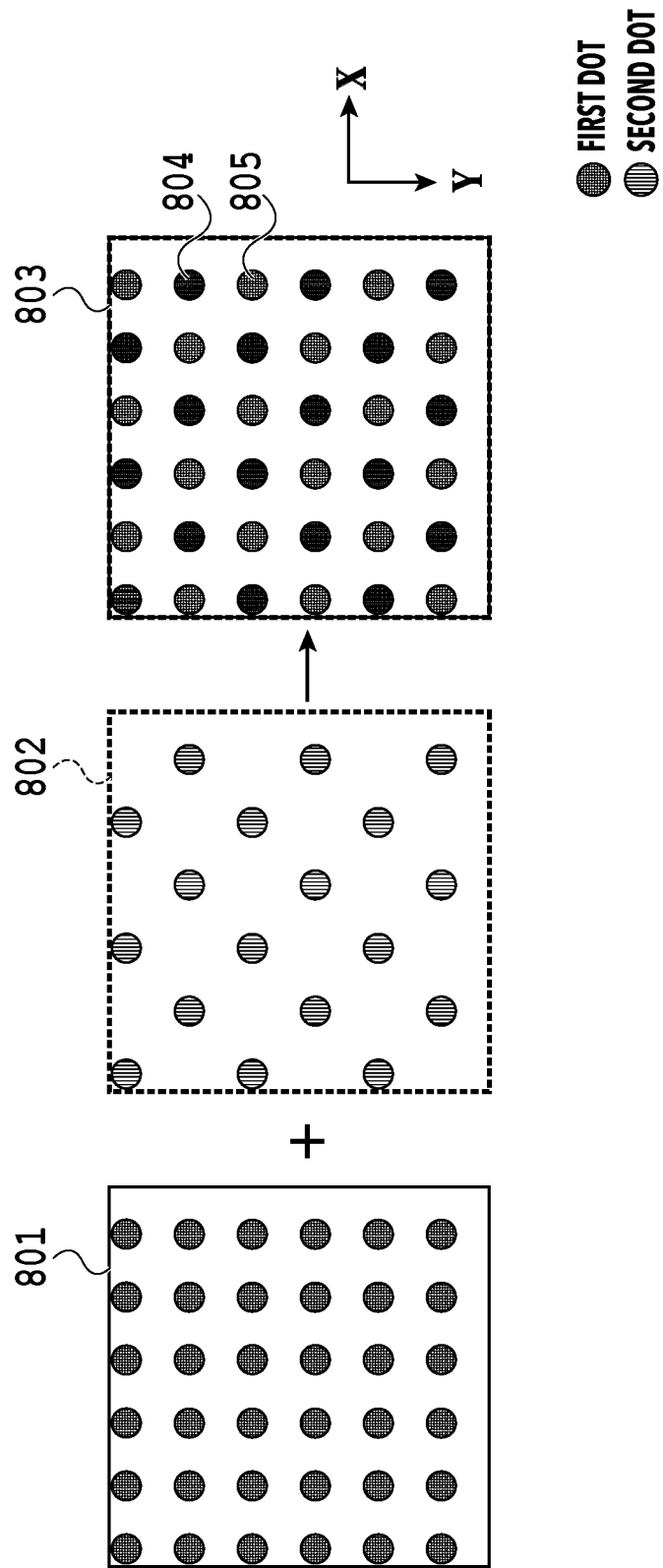
FIG. 8 is a diagram illustrating a counterexample of a second condition for achieving a robust pattern.

FIG. 8 shows an example of patterns that satisfy the first condition but fail to satisfy the second condition. Although a first dot pattern 801 and a second dot pattern 802 are different grid patterns, a combined dot pattern 803 formed by superimposition of these patterns has no proximate dots. Every dot is either a superimposed dot 804 or a single dot 805. In this case, transitional symmetry cannot be attained between the first dot pattern 801 and the second dot pattern 802 under a displacement of less than the inter-grid distance, and the cover area stabilizing effect described with FIGS. 7A to 7C cannot be attained.

Figure 9:
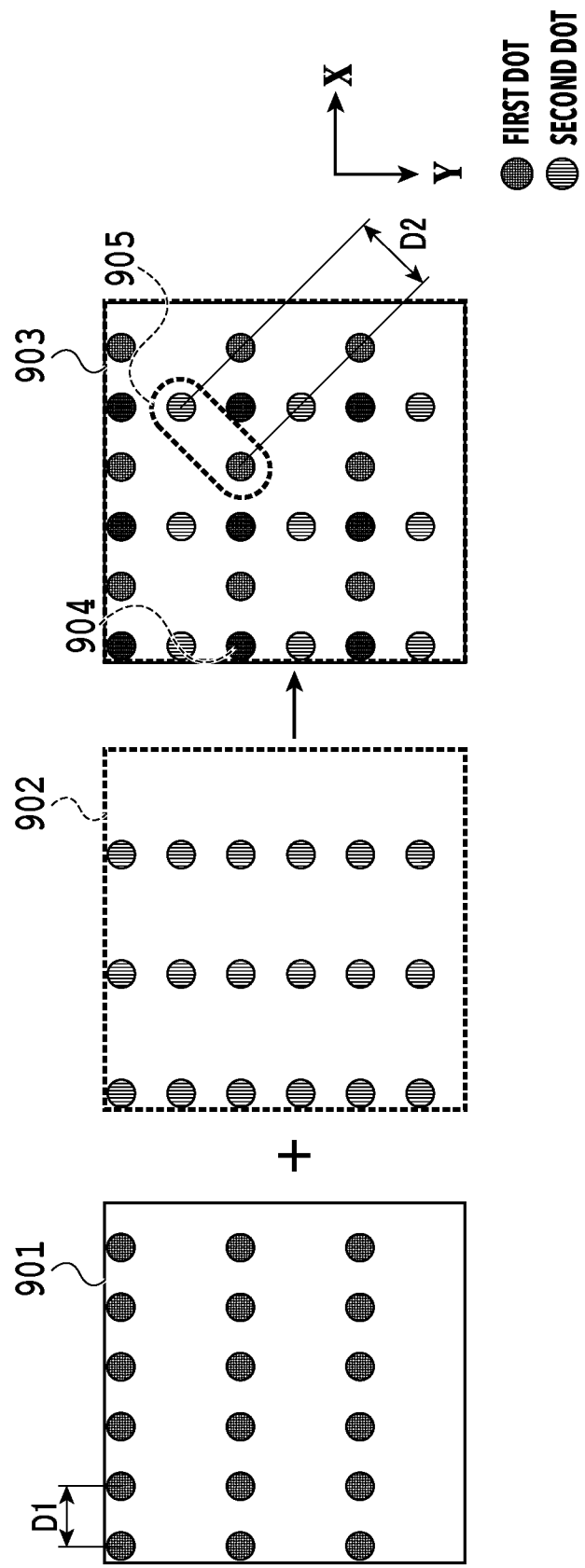
FIG. 9 is a diagram illustrating a counterexample of the second condition for achieving a robust pattern.

Also, FIG. 9 shows another example of patterns that satisfy the first condition but fail to satisfy the second condition. In this example, a first dot pattern 901 and a second dot pattern 902 are different grid patterns, and a combined dot pattern 903 formed by superimposition of these patterns has superimposed dots 904 and proximate dots 905. However, a distance D2 between two dots forming the proximate dots 905 is larger than an inter-grid distance D1 defined by a basis vector of the first dot pattern 901. In this case, even in a case where superimposed dots 904 are separated due to a relative displacement of equal to or less than the inter-grid distance between the first dot pattern 901 and the second dot pattern 902, proximate dots 905 cannot overlap sufficiently. As a result, this pattern too fails to offer the cover area stabilizing effect described with FIGS. 7A to 7C.

The third condition is that the plurality of sets of proximate dots include ones with different proximity directions. Here, the proximity direction represents the slope of a straight line connecting the centers of a first dot and a second dot forming the proximate dots.

Figure 10:
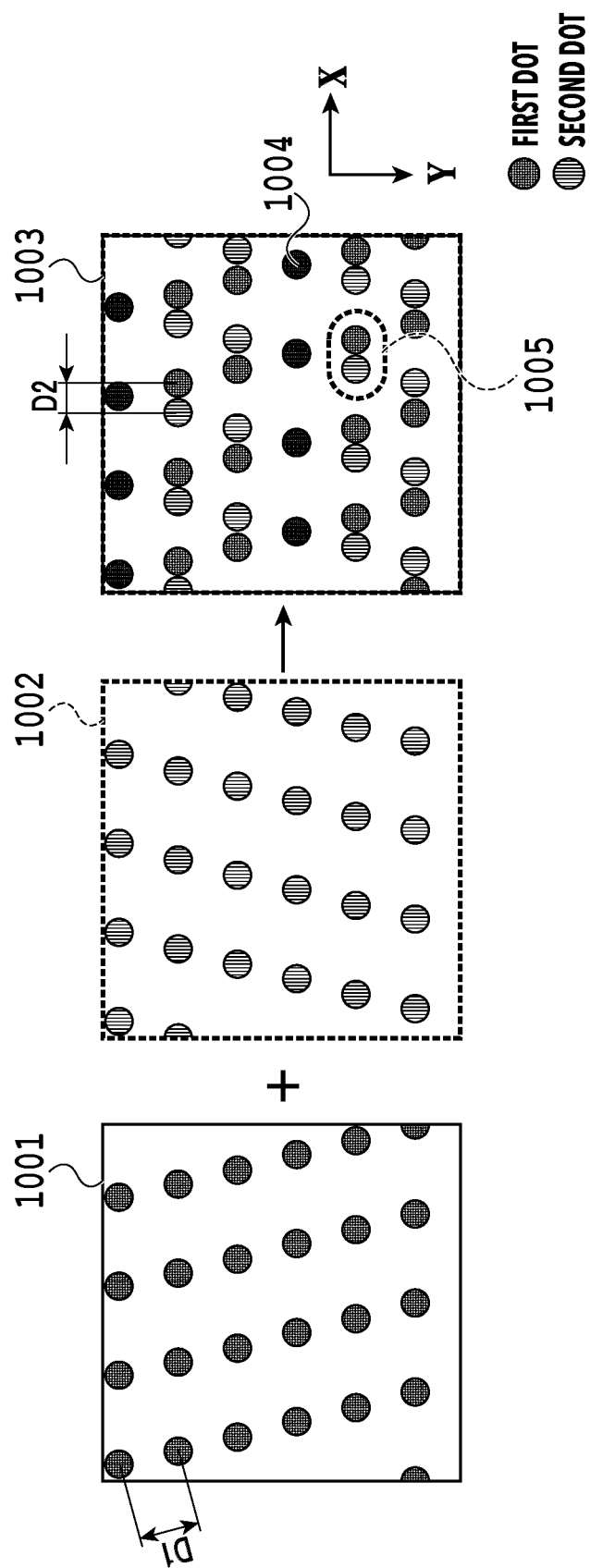
FIG. 10 is a diagram illustrating a counterexample of a third condition for achieving a robust pattern.

FIG. 10 shows an example of patterns that satisfy the first and second conditions but fail to satisfy the third condition. In this example, a first dot pattern 1001 and a second dot pattern 1002 are different grid patterns, and a combined dot pattern 1003 formed by superimposition of these patterns has superimposed dots 1004 and proximate dots 1005. Also, a first dot and a second dot forming each set of proximate dots 1005 are located away from each other by a distance D2 which is smaller than the inter-grid distance D1 of the first dot pattern 1001 or the second dot pattern 1002.

However, in the combined dot pattern 1003, every set of proximate dots 1005 is formed by a first dot and a second dot proximate to each other in the X-direction, and none of them is formed by proximity in directions other than the X-direction. In this case, the effect described with FIGS. 7A to 7C can be obtained in a case where the first dot pattern 1001 and the second dot pattern 1002 are displaced in the direction of proximity, i.e., the X-direction. However, in a case where the first dot pattern 1001 and the second dot pattern 1002 are displaced in the Y-direction orthogonal to the X-direction, the two dots forming proximate dots do not become superimposed even though the superimposed dots 1004 are separated in the Y-direction, which leads to a change in cover area.

By contrast, the robust pattern 100 described with FIG. 1 satisfies all of the first to third conditions described above. Specifically, referring back to FIG. 1, the first dot pattern 101 and the second dot pattern 102 are formed by grid patterns with different basis vectors (the first condition). The combined dot pattern 100 formed by superimposition of these patterns has superimposed dots 104 and proximate dots 105, and a first dot and a second dot forming each set of proximate dots 105 are located at a distance from each other, the distance being less than the inter-grid distance defined by the basis vectors (the second condition). Further, the combined dot pattern 100 has a plurality of sets of proximate dots with different directions of proximity, such as proximate dots proximate in the X-direction, proximate dots proximate in the Y-direction, and proximate dots proximate in an oblique direction (the third condition).

Thus, the combined dot pattern 100 satisfying the above-described three conditions can offer the effect already described using FIGS. 2 to 7C. Thus, even in a case where a relative displacement occurs between the first and second dot patterns, a change in graininess and density unevenness is not sensed, and an image can be recognized as a high quality image.

Embodiments using a robust pattern having the above-described characteristic are described below in specific terms.

First Embodiment

Figure 11:
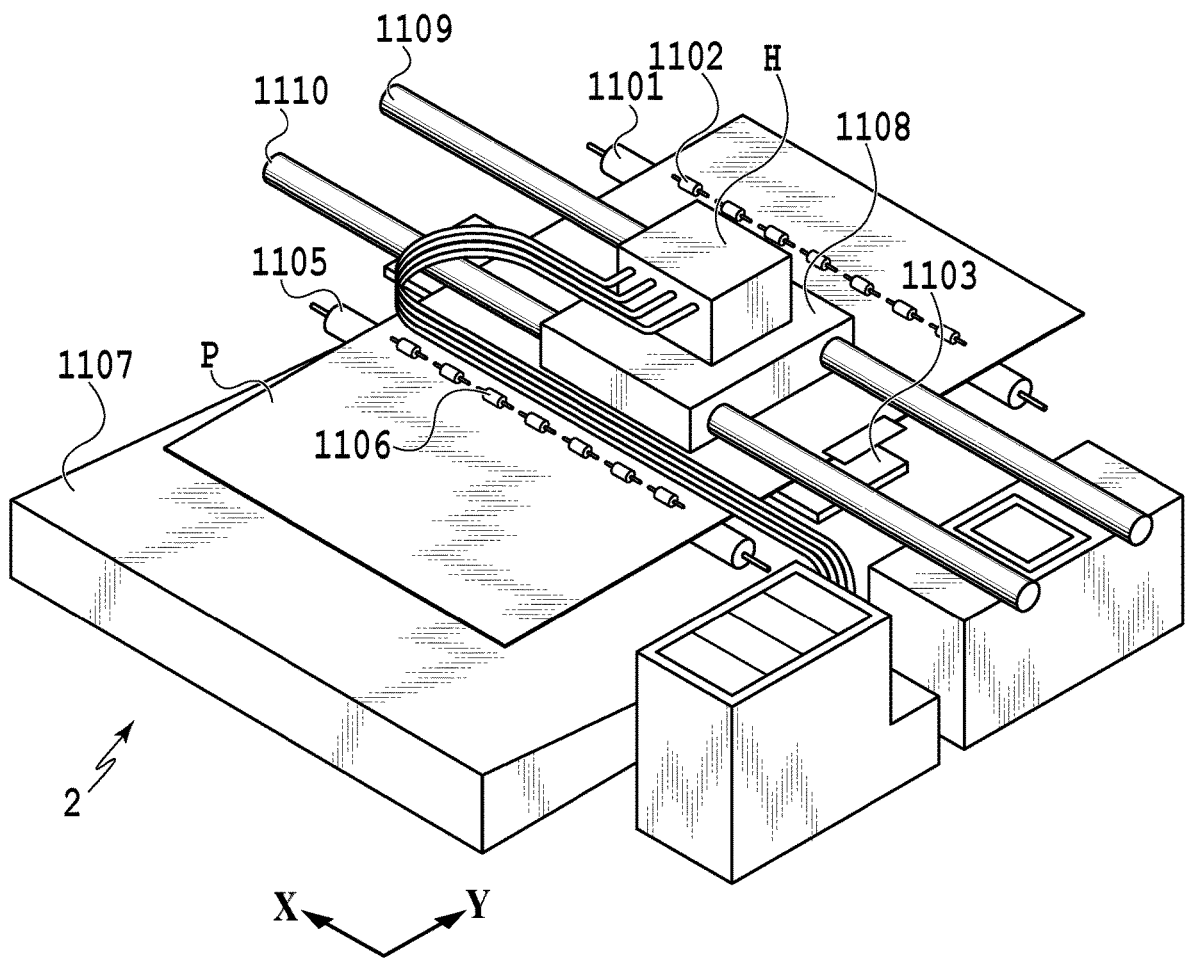
FIG. 11 is a diagram illustrating the configuration of a printing apparatus.

FIG. 11 is a perspective view showing an overview of a printing unit in a serial-type inkjet printing apparatus 2 (hereinafter also referred to simply as a printing apparatus) that can be applied to the present embodiment. As a conveyance roller 1101 situated on a conveyance path rotates, a printing medium P fed to the printing unit is conveyed in the −Y-direction (the sub scanning direction) by nip portions formed by the conveyance roller 1101 and pinch rollers 1102 that follow and get driven by the conveyance roller 1101.

A platen 1103 is provided at a print position facing a surface where nozzles of an inkjet print head H are formed (a nozzle surface), and keeps the distance between the front surface of the printing medium P and the nozzle surface of the print head H constant by supporting the back surface of the printing medium P from below.

As a discharge roller 1105 rotates, an area of the printing medium P printed on the platen 1103 is conveyed in the −Y-direction while being nipped by the discharge roller 1105 and spurs 1106 that follow and get driven by the discharge roller 1105, and is discharged to a paper receiving tray 1107.

The print head H is detachably mounted to a carriage 1108, in an attitude such that its nozzle surface faces the platen 1103 or the printing medium P. The carriage 1108 is caused to move reciprocally in the X-direction, which is the main scanning direction, along two guide rails 1109 and 1110 by drive force from a carriage motor (not shown), and the print head H, while moving, executes an ejection operation according to ejection signals.

The ±X-direction in which the carriage 1108 moves intersects with the −Y-direction in which a printing medium is conveyed, and is called a main scanning direction. By contrast, the −Y-direction in which a printing medium is conveyed is called a sub scanning direction. The main scanning of the carriage 1108 and the print head H (movement with ejection) and the conveyance of the printing medium P (sub scanning) are alternately repeated, thereby forming an image on the printing medium P step by step.

Figure 12:
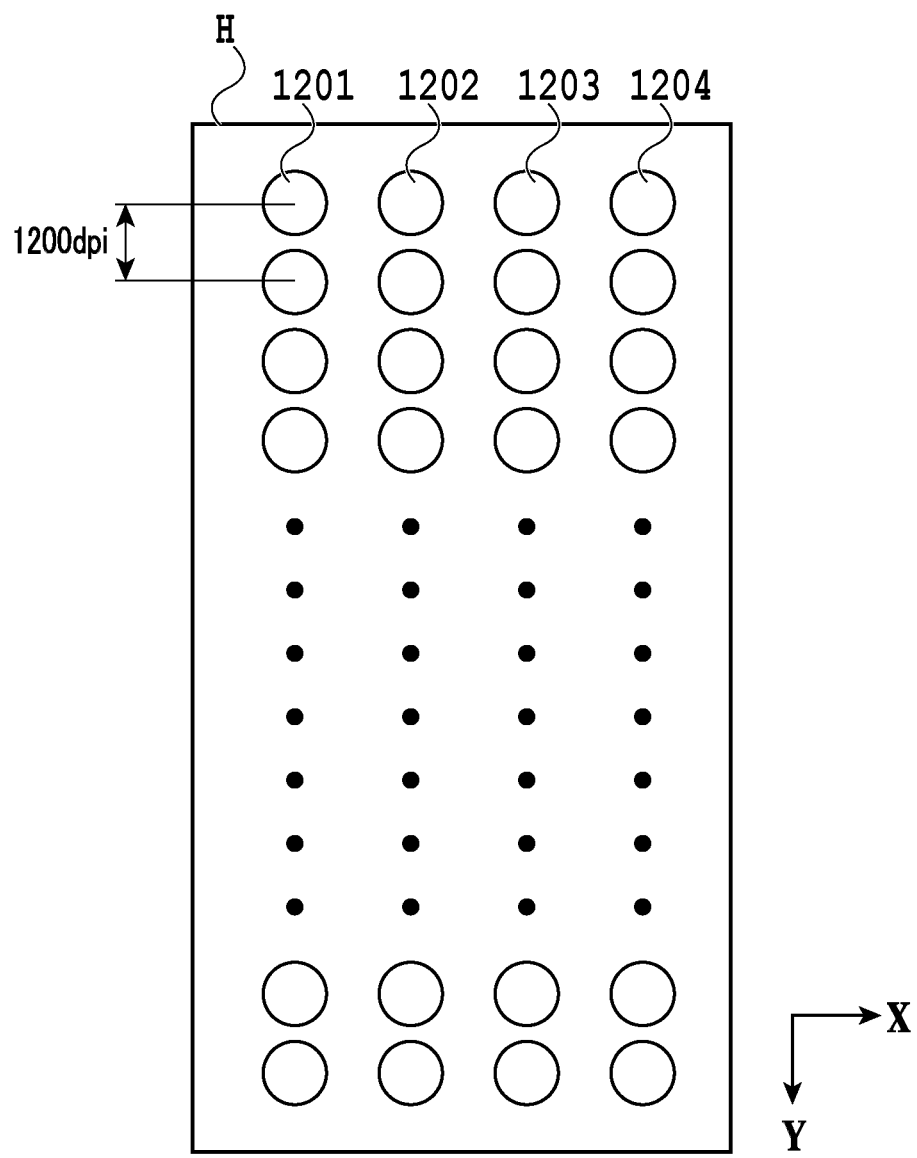
FIG. 12 is a diagram illustrating a print head.

FIG. 12 is a schematic diagram of the print head H observed from the nozzle surface side. On the nozzle surface, four nozzle arrays 1201 to 1204 are arranged side by side, each nozzle array having 128 nozzles that are arranged in the Y-direction at a pitch of 1200 dpi and that eject the same type of ink. In the present embodiment, the nozzle array 1201 ejects a cyan ink; the nozzle array 1202, a magenta ink; the nozzle array 1203, a yellow ink; the nozzle array 1204, a black ink. Herein, cyan is denoted as C; magenta, M; yellow, Y; black, K.

Figure 13:
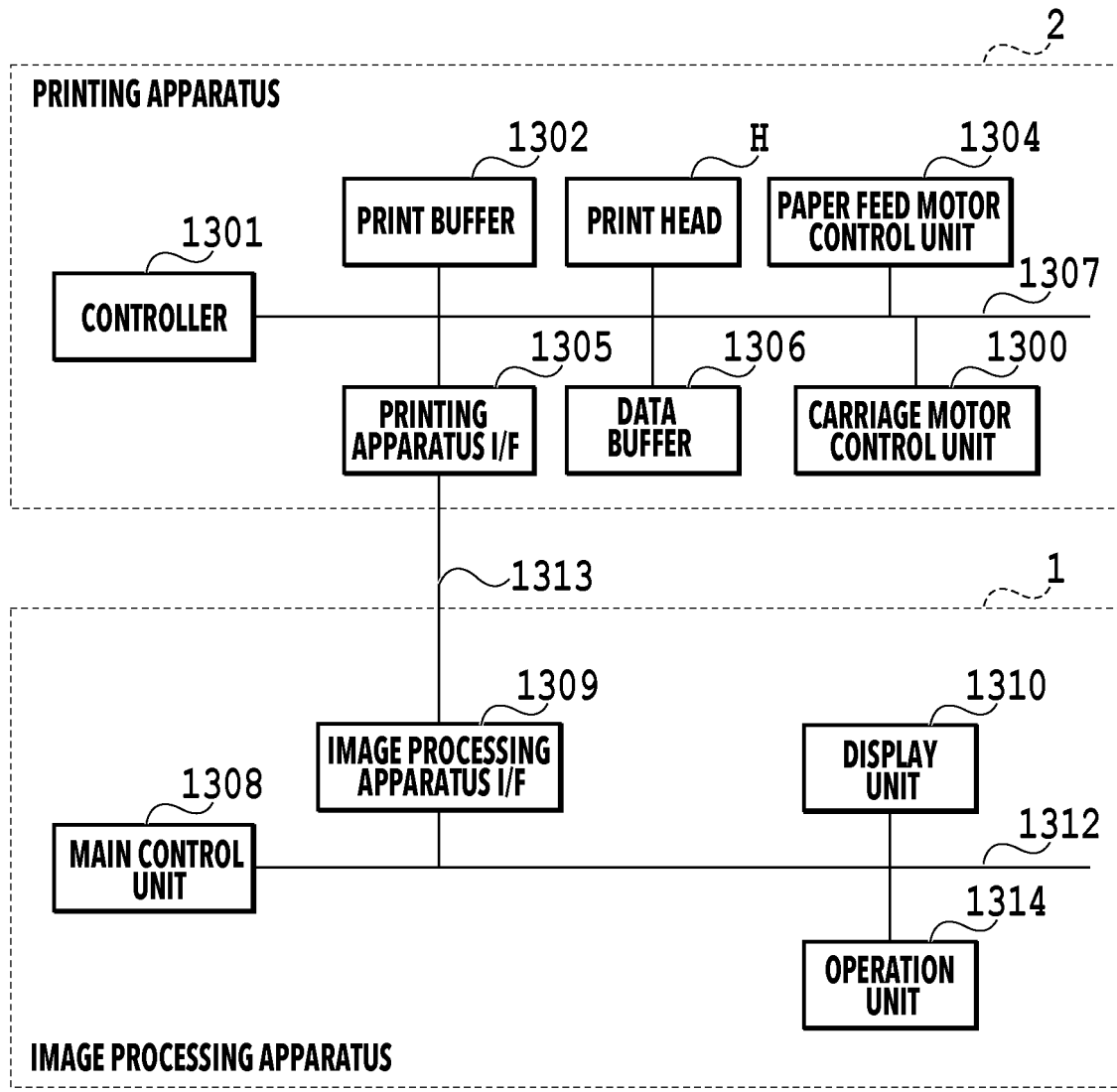
FIG. 13 is a block diagram showing the configuration of a printing system.

FIG. 13 is a block diagram illustrating a configuration related to control of an inkjet printing system that can be applied to the present embodiment. The inkjet printing system of the present embodiment includes the inkjet printing apparatus 2 illustrated in FIG. 11 and an image processing apparatus 1. The image processing apparatus 1 can be, for example, a personal computer (PC).

The image processing apparatus 1 creates image data printable by the printing apparatus 2. In the image processing apparatus 1, a main control unit 1308 is formed by a CPU, a ROM, a RAM, an ASIC, and the like and performs, e.g., image processing for creating an image in the image processing apparatus 1 or printing the created image in the printing apparatus 2. An image processing apparatus I/F 1309 gives and receives data signals to and from the printing apparatus 2. A display unit 1310 presents various kinds of information to a user by, e.g., displaying messages on the screen. For example, a liquid crystal display (LCD) or the like can be used as the display unit 1310. A user operates the image processing apparatus 1 through an operation unit 1314. For example, a keyboard or a mouse can be used as the operation unit 1314. A system bus 1312 connects the main control unit 1308 with each of the function modules. An I/F signal line 1313 connects the image processing apparatus 1 and the printing apparatus 2 to each other. For example, a type usable as the I/F signal line 1313 is one with a Centronics interface.

In the printing apparatus 2, a controller 1301 is formed by a CPU, a ROM, a RAM, and the like and performs overall control of the printing apparatus 2. A print buffer 1302 stores, as raster data, image data before being transferred to the print head H. The inkjet print head H ejects ink from each nozzle according to image data stored in the print buffer 1302.

A paper feed motor control unit 1304 drives a conveyance motor (not shown) and controls conveying, feeding, and discharging of the printing medium P. A carriage motor control unit 1300 drives the carriage motor (not shown) and controls forward and backward scanning of the carriage 1108. A data buffer 1306 temporarily stores image data received from the image processing apparatus 1. A system bus 1307 connects the function modules of the printing apparatus 2.

Figure 14:
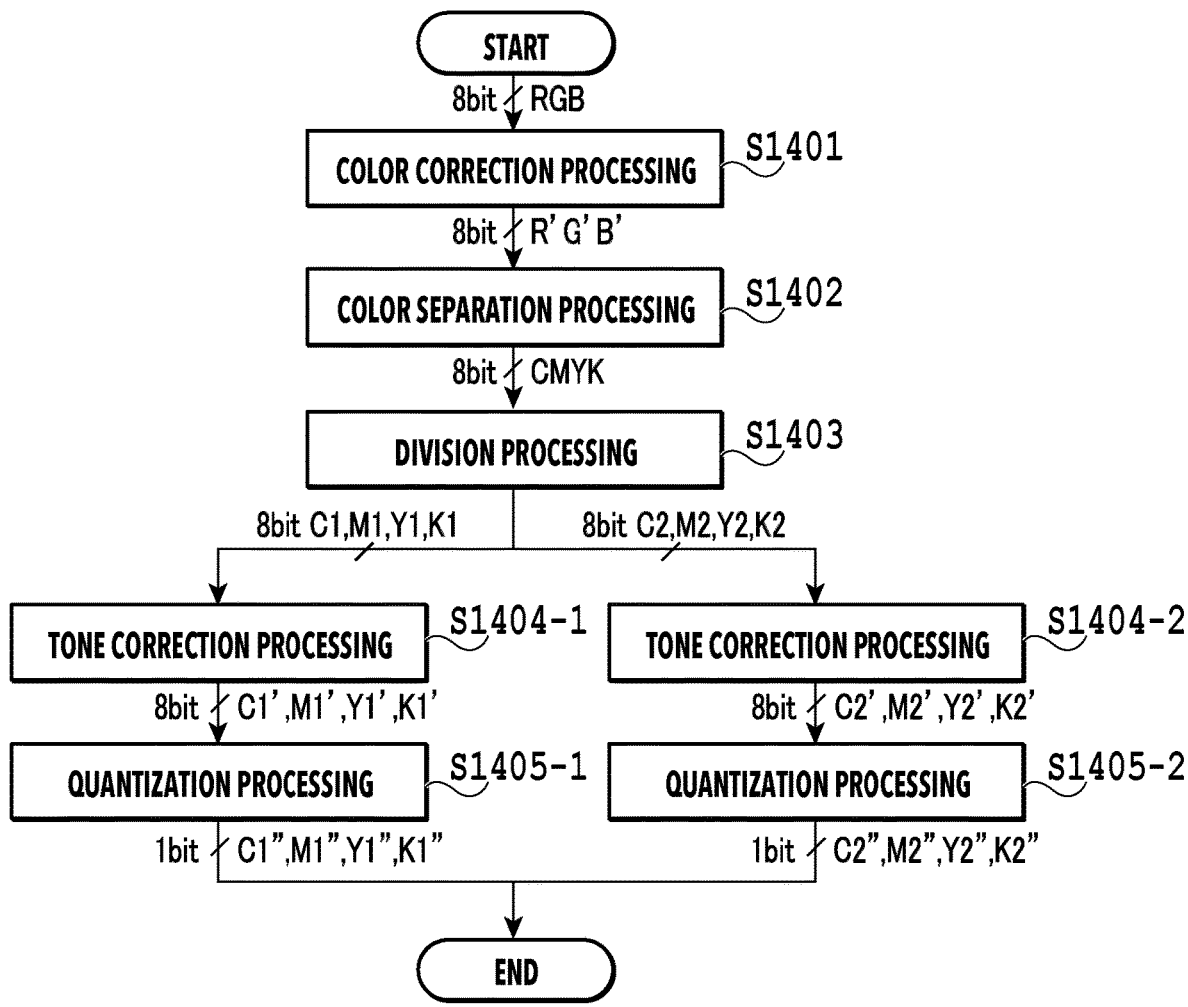
FIG. 14 is a flowchart of image processing in the first embodiment.

FIG. 14 is a flowchart illustrating processing executed by the main control unit 1308 of the image processing apparatus 1 in an event where a given image is printed by the printing apparatus 2. This processing is started by a user inputting a command for printing a given image.

Once this processing is started, first, in Step S1401, the main control unit 1308 performs color correction processing. In the present embodiment, image data created by an application or the like has pixels arranged at 1200 dpi, each pixel having a 8-bit, 256-tone luminance value for each of R (red), G (green), and B (blue). In the color correction processing, the main control unit 1308 converts such RGB data on each pixel to R'G'B' data represented in a color space unique to the printing apparatus 2. Specifically, the conversion may be done by, for example, referring to a lookup table stored in memory in advance. Note that "Step S" is simply written as "S" hereinafter.

In S1402, the main control unit 1308 performs color separation processing on the R'G'B' data. Specifically, the main control unit 1308 refers to a lookup table stored in memory in advance and converts the luminance values R', G', and B' of each pixel into 8-bit, 256-tone density values C, M, Y, and K corresponding to ink colors used by the printing apparatus 2.

In S1403, the main control unit 1308 performs division processing on the 8-bit, 256-tone CMYK data and thereby creates density data C1, M1, Y1, and K1 for a forward scan and density data C2, M2, Y2, and K2 for a backward scan. In this event, the main control unit 1308 may divide a density value of each color indicated by the CMYK data into almost equal halves. In the present embodiment, density data on every color is outputted as two equally divided pieces (K1=K2, C1=C2, M1=M2, Y1=Y2).

After that, the same processing is performed for all the ink colors in parallel. Thus, for brevity, a description is given for only the black data (K1, K2).

In S1404-1 and S1404-2, the main control unit 1308 performs tone correction processing on each of the density values K1 and K2. Tone correction processing is correction performed so that an input density value and an optical density expressed on the printing medium P may have a linear relation. The tone correction processing is usually performed by reference to a one-dimensional lookup table prepared in advance. As a result of the tone correction processing in S1404-1 and S1404-2, the 8-bit, 256-tone density values K1 and K2 are converted to 4097-tone density values K1', K2'.

In S1405-1 and S1405-2, the main control unit 1308 performs predetermined quantization processing on each of the density values K1' and K2' and thereby generates a quantized value K1" for a forward scan and a quantized value K2" for a backward scan. The quantized value K1" is one-bit binary data indicating either to print (1) or not to print (0) a pixel in a forward scan. The quantized value K2" is one-bit binary data indicating either to print (1) or not to print (0) a pixel in a backward scan. The processing thus ends.

The binary data C1", M1", Y1", and K1" for a forward scan and the binary data C2", M2", Y2", K2" for a backward scan created by the image processing apparatus are transmitted to the printing apparatus 2. The controller 1301 of the printing apparatus 2 performs predetermined multi-pass printing according to the binary data thus received.

Although the division processing for dividing data into one for a forward scan and one for a backward scan is performed between the color separation processing and the tone correction processing in the flowchart in FIG. 14, the division processing may be performed before the color separation processing or the color correction processing.

Figure 15:
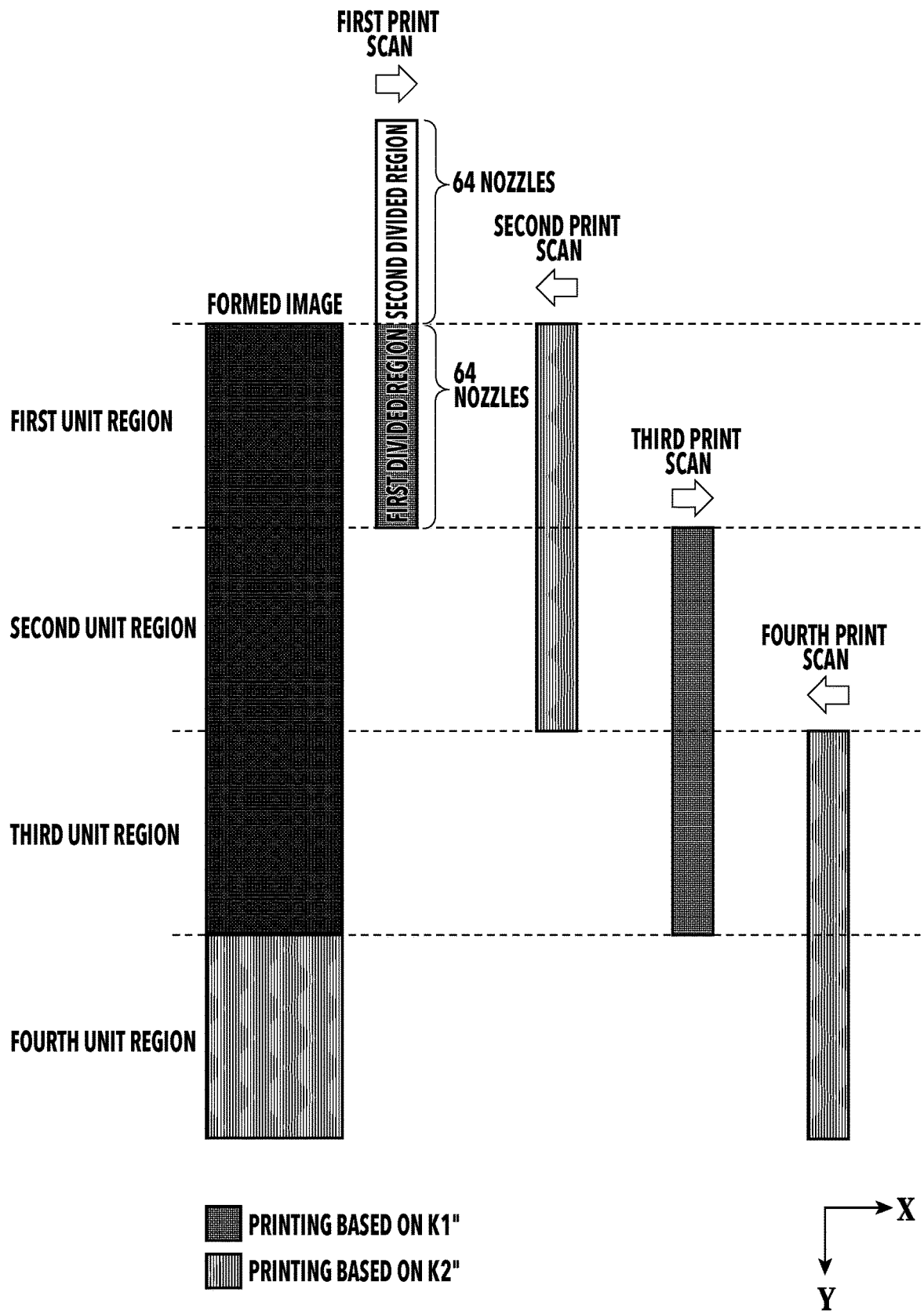
FIG. 15 is a diagram illustrating bidirectional multi-pass printing.

FIG. 15 is a schematic diagram illustrating bidirectional two-pass printing executed in the printing apparatus 2 under the control of the controller 1301. Here, to simplify the description, a printing operation related to the black nozzle array 1204 (see FIG. 12) is described out of the plurality of nozzle arrays arranged on the print head H.

In a case of performing two-pass printing, 128 nozzles included in the nozzle array 1204 are divided into a first divided region and a second divided region.

In the first print scan, the controller 1301 performs an ejection operation according to the binary data K1″ using the first divided region while moving the print head H in the +X-direction, which is the forward direction. After that, the controller 1301 conveys the print medium in the −Y-direction by 64 pixels. For the sake of convenience, FIG. 15 shows the relative positional relation between each divided region and the print medium by moving the nozzle array 1204 in the +Y-direction.

In the second print scan, the controller 1301 performs an ejection operation according to the binary data K2″ using the first divided region and the second divided region while moving the print head H in the backward direction, which is opposite from the direction in the first print scan. After that, the controller 1301 conveys the print medium in the −Y-direction by 64 pixels.

In the third print scan, the controller 1301 performs an ejection operation according to the binary data K 1″ using the first divided region and the second divided region while moving the print head H in the forward direction. After that, the controller 1301 conveys the print medium in the −Y-direction by 64 pixels.

After that, a backward scan like the second print scan and a forward scan like the third print scan are repeated with the 64-pixel conveyance operation being performed in between. As a result, a dot pattern based on the binary data K1″ printed by a forward scan and a dot pattern based on the binary data K2″ printed by a backward scan are printed on each unit region on the print medium in a superimposed manner. In the present embodiment, a dot pattern printed by a forward scan based on the binary data K1″ is called a first dot pattern, and a dot pattern printed by a backward scan based on the binary data K2″ is called a second dot pattern.

Figure 16:
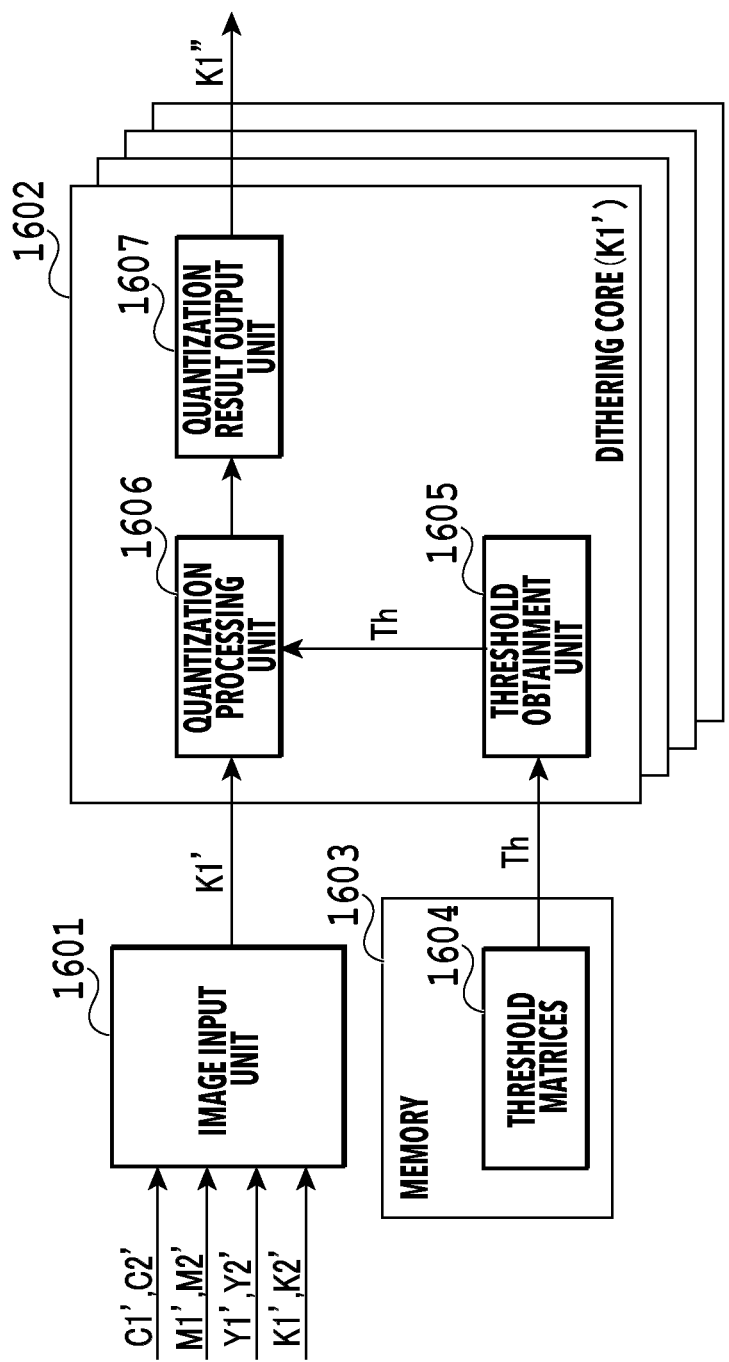
FIG. 16 is a diagram of functional blocks for implementing quantization processing.

FIG. 16 is a functional block diagram for implementing the quantization processing executed in S1405-1 and S1405-2 in FIG. 14. Each block shown in FIG. 16 is implemented by the main control unit 1308 of the image processing apparatus 1 illustrated in FIG. 13.

An image input unit 1601 transmits 4097-tone tone data after the tone correction processing, namely each of C1′, C2′, M1′, M2′, Y1′, Y2′, K1′, and K2′, to a corresponding one of individually prepared dithering cores 1602. Although FIG. 16 shows the configuration of the dithering core 1602 for K1′, similar dithering cores 1602 are also prepared for the other pieces of tone data.

In a memory 1603, a plurality of threshold matrices 1604 corresponding to the respective pieces of tone data C1′, C2′, M1′, M2′, Y1′, Y2′, K1′, and K2′ are stored in advance. The threshold matrices 1604 store thresholds associated with the pixel positions of individual pixels, and can be created using a computer and stored in the memory 1603 in advance.

A threshold obtainment unit 1605 refers to the threshold matrix 1604 corresponding to K1′ and obtains, from the threshold matrix 1604, a threshold Th corresponding to the pixel position of K′ received by the dithering cores 1602. The threshold obtainment unit 1605 then provides the threshold Th to a quantization processing unit 1606. The quantization processing unit 1606 compares the tone value K1′ of the processing target pixel inputted from the image input unit 1601 with the threshold Th provided by the threshold obtainment unit 1605 and determines whether to print (1) or not to print (0) a dot on the processing target pixel. A quantization result output unit 1607 outputs the information indicating to print (1) or not to print (0) determined by the quantization processing unit 1606 as quantized data K1″ on the processing target pixel.

FIGS. 17A and 17B are diagrams showing an example of the threshold matrices stored in the memory 1603. As the threshold matrices, a first threshold matrix 1701 for forward scans and a second threshold matrix 1702 for backward scans are prepared. Although FIGS. 17A and 17B show each threshold matrix with 16 pixels×16 pixels, this is only a magnification of a portion thereof, and each threshold matrix actually includes 64 pixels×64 pixels.

In FIGS. 17A and 17B, each square corresponds to a pixel arranged on the XY plane, and a value shown in the square is a threshold for the corresponding pixel position. In the present embodiment, K1′ and K2′ each have a value from 0 to 4096, and for this reason, each threshold Th is a value from 0 to 4095. Then, in a case where K1′>Th in the processing target pixel, the quantized value K1″ for the processing target pixel is a value indicating to print (K1″=1). By contrast, in a case where K1′<Th, the quantized value K1″ for the processing target pixel is a value indicating not to print (K1″=0). The same is true to the relation between K2′ and K2″.

In the present embodiment, the threshold matrices 1701 and 1702 each having a region of 64 pixels×64 pixels as shown in FIGS. 17A and 17B are prepared and used repeatedly in the X-direction and the Y-direction for forward scans and backward scans, respectively. However, the size of the threshold matrices is not limited to the above. The threshold matrices may be larger or smaller in size.

Figure 18A:
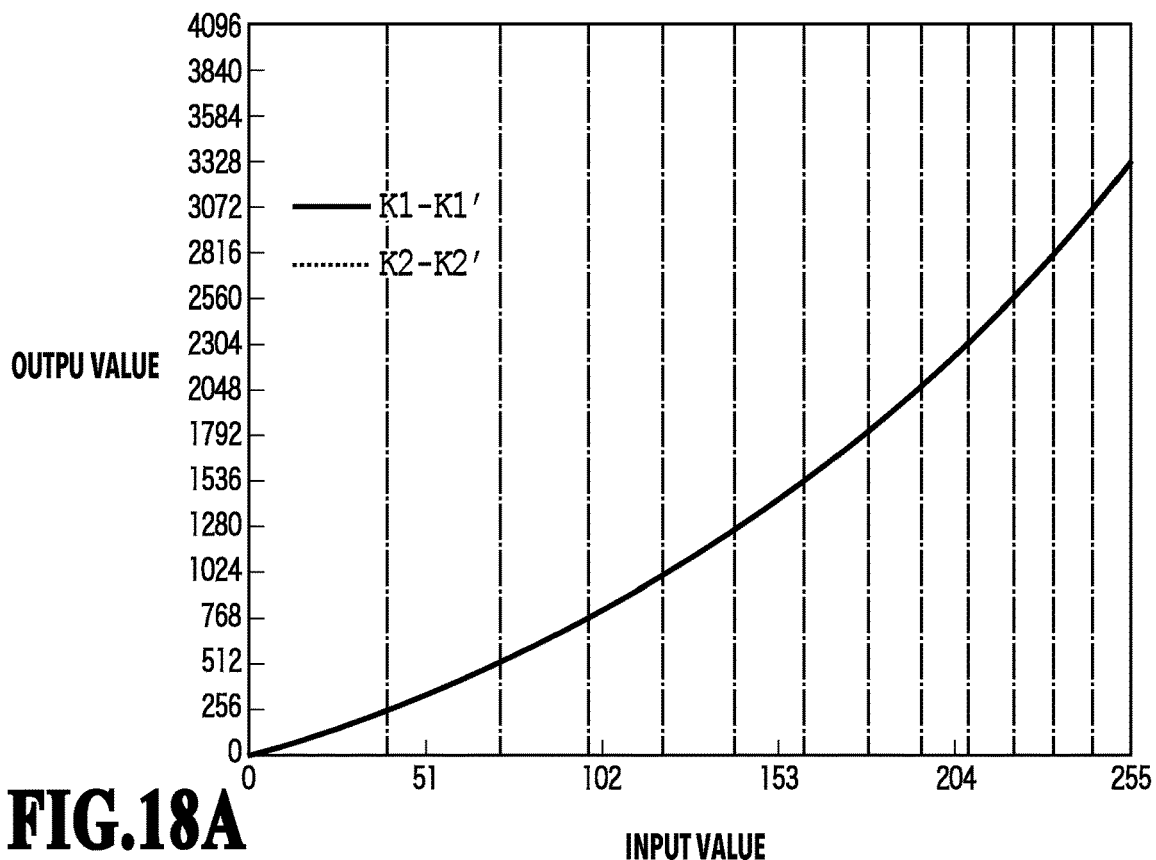
FIGS. 18A and 18B are diagrams showing tone correction processing.
Figure 18B:
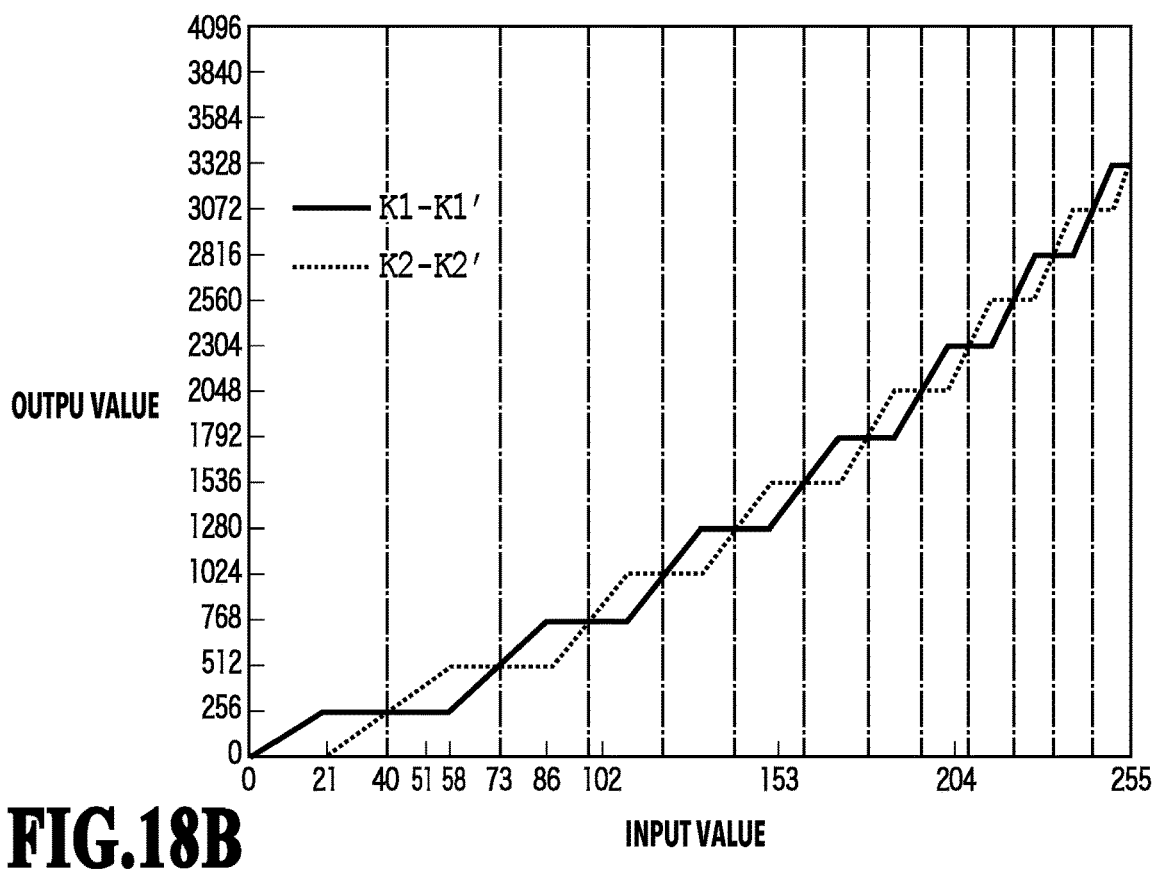

FIGS. 18A and 18B are diagrams showing the tone correction processing in S1401-1 and S1402-2. FIG. 18A shows processing in the prior art, and FIG. 18B shows processing in the present embodiment. In FIGS. 18A and 18B, the solid lines represent tone correction from K1 to K1′, and the dotted lines represent tone correction from K2 to K2′. In FIG. 18A, the tone correction from K1 to K1′ is equal to the tone correction from K2 to K2′, and thus, the solid line and the dotted line coincide with each other. The dot-dash lines running vertically in FIGS. 18A and 18B indicate input values at which the tone correction from K1 to K1′ and the tone correction from K2 to K2′ are equal in FIG. 18B, and at these input values, the output values are the same between the prior art and the present embodiment. In the present embodiment, at the positions of the dot-dash lines, a dot pattern obtained by quantization of K1′ and a dot pattern obtained by quantization of K2′ are grid patterns different from each other. Note that the definition of the "grid pattern" is as described earlier.

Thus, in a comparison between the processing in the prior art and the processing in the present embodiment, tones between the dot-dash lines are different.

Figure 19:
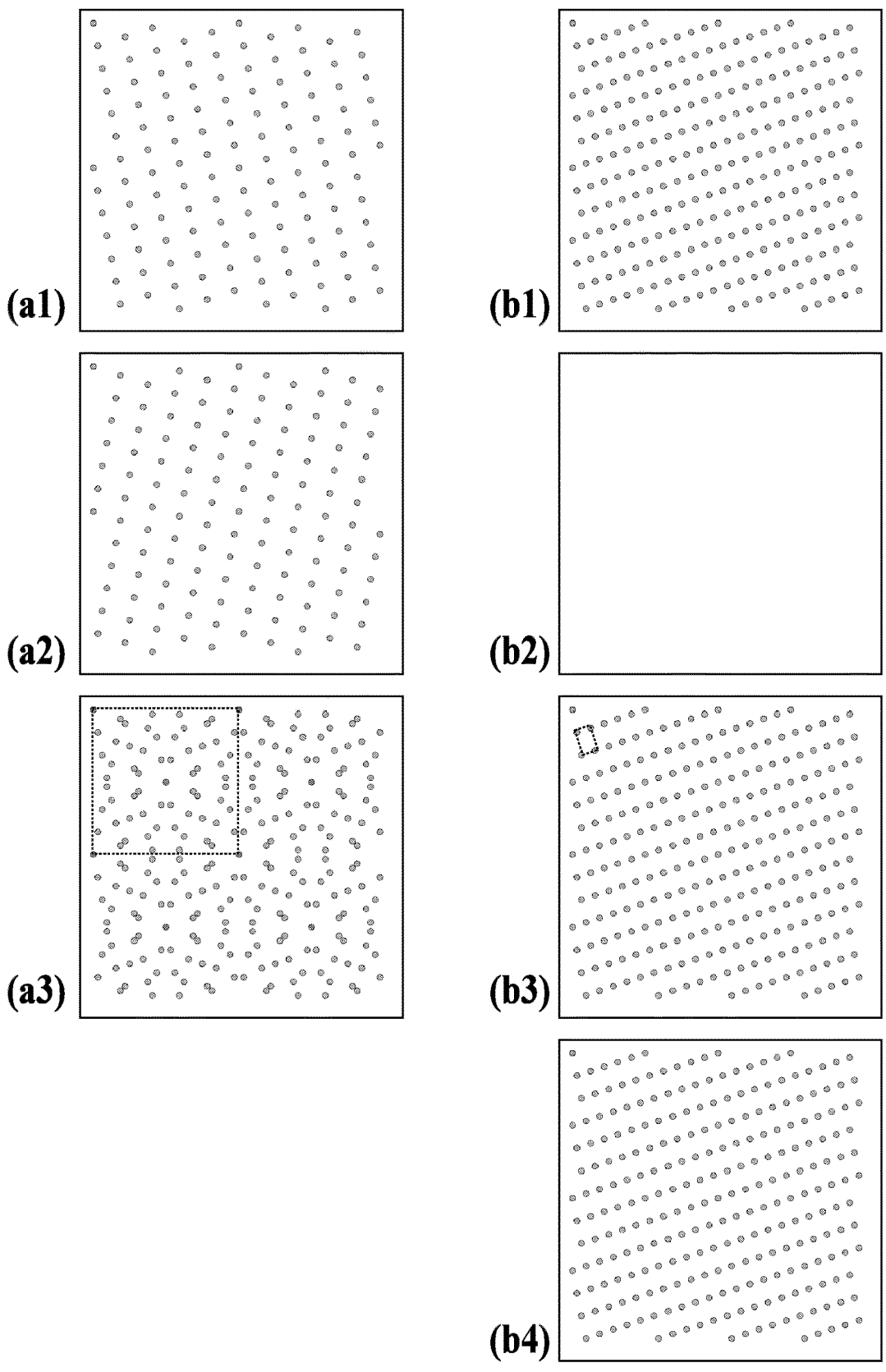
FIG. 19 is diagram showing dot patterns according to quantization processing results.

FIG. 19 shows dot arrangements for a case of an input value K1=K2=21. Hereinafter, an ink ejected from a nozzle of the present embodiment is assumed to have a dot diameter of 30 µm on a print medium. An output value for the input value is, in the prior art, K1'=K2'=128 based on FIG. 18A and is, in the present embodiment, K1'=256 and K2'=0 based on FIG. 18B, and the quantization processing is performed according to the above-described output values. Part (a1) of FIG. 19 is a dot arrangement based on K1" in the prior art, part (a2) of FIG. 19 is a dot arrangement based on K2" in the prior art, and part (a3) of FIG. 19 is a dot arrangement formed on a paper surface by superimposition of the dot arrangement based on K1" in the prior art and the dot arrangement based on K2" in the prior art. Part of (b1) of FIG. 19 is a dot arrangement based on K1" in the present embodiment, part (b2) of FIG. 19 is a dot arrangement based on K2" in the present embodiment (the number of dots is zero), and part (b3) of FIG. 19 is a dot arrangement formed on a paper surface by superimposition of the dot arrangement based on K1" in the present embodiment and the dot arrangement based on K2" in the present embodiment.

The paper surface in part (a3) of FIG. 19 has sparse-dot locations and dense-dot locations, whereas in part (b3) of FIG. 19, the dots are regularly arranged at equal intervals. In this way, the present embodiment can provide an image with less conspicuous graininess than the prior art. Part (b4) of FIG. 19 is a dot arrangement formed on a paper surface by superimposition of the dot arrangements based on K1" and K2" in the present embodiment with the dot arrangement based on K2" being displaced from the dot arrangement based on K1" in the X-direction by 42 µm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 19 and part (b4) of FIG. 19, the displacement between two patterns does not change the dot arrangement. Thus, the present embodiment can provide an image with less conspicuous density unevenness than the prior art.

Figure 20:
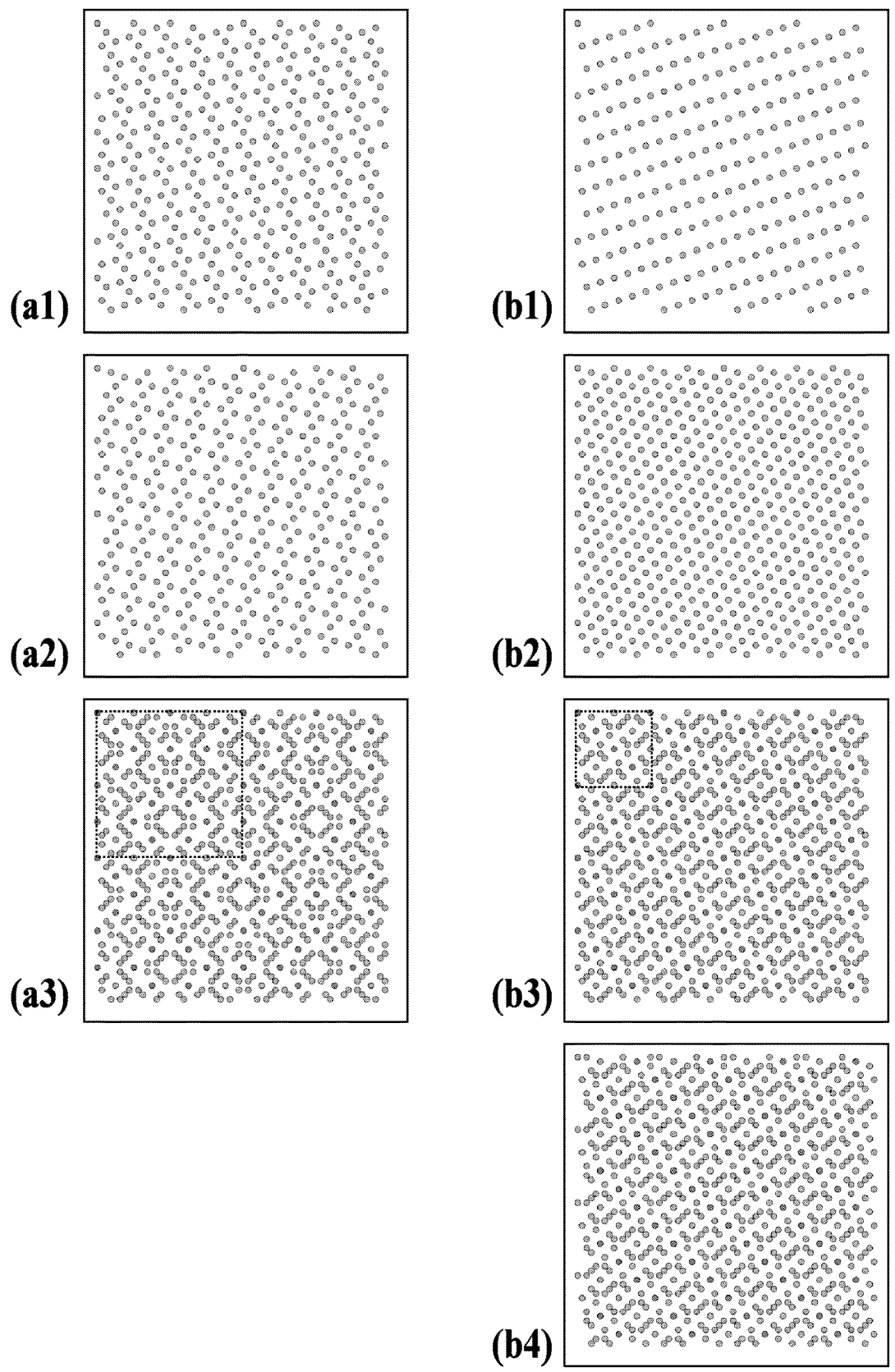
FIG. 20 is diagram showing dot patterns according to quantization processing results.

FIG. 20 shows dot arrangements for a case of an input value K1=K2=58, as a tone different from the example described above. An output value for the input value is, in the prior art, K1'=K2'=384 based on FIG. 18A and is, in the present embodiment, K1'=256 and K2'=512 based on FIG. 18B, and the quantization processing is performed according to the above-described output values. Part (a1) of FIG. 20 is a dot arrangement based on K1" in the prior art, part (a2) of FIG. 20 is a dot arrangement based on K2" in the prior art, and part (a3) of FIG. 20 is a dot arrangement formed on a paper surface by superimposition of the dot arrangement based on K1" in the prior art and the dot arrangement based on K2" in the prior art. Part (b1) of FIG. 20 is a dot arrangement based on K1" in the present embodiment, part (b2) of FIG. 20 is a dot arrangement based on K2" in the present embodiment, and part (b3) of FIG. 20 is a dot arrangement formed on a paper surface by superimposition of the dot arrangement based on K1" in the present embodiment and the dot arrangement based on K2" in the present embodiment. The paper surface in part (a3) of FIG. 20 has many sparse-dot locations and dense-dot locations, whereas part (b3) of FIG. 20 has less sparse-dot locations and dense-dot locations. This is because the dot arrangement in part (b2) of FIG. 20 is more regular and has more dots than the dot arrangement in part (a1) or (a2) of FIG. 20 so as to create as less sparse locations as possible. Thus, the present embodiment can provide an image with less conspicuous graininess than the prior art. Part (b4) of FIG. 20 is a dot arrangement formed on a paper surface by superimposition of the dot arrangements based on K1" and K2" in the present embodiment with the dot arrangement based on K2" being displaced from the dot arrangement based on K1" in the X-direction by 42 µm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 20 and part (b4) of FIG. 20, a change in the dot arrangement is successfully reduced even under the displacement between the two patterns. Thus, the present embodiment can provide an image with less conspicuous density unevenness than the prior art.

Figure 21:
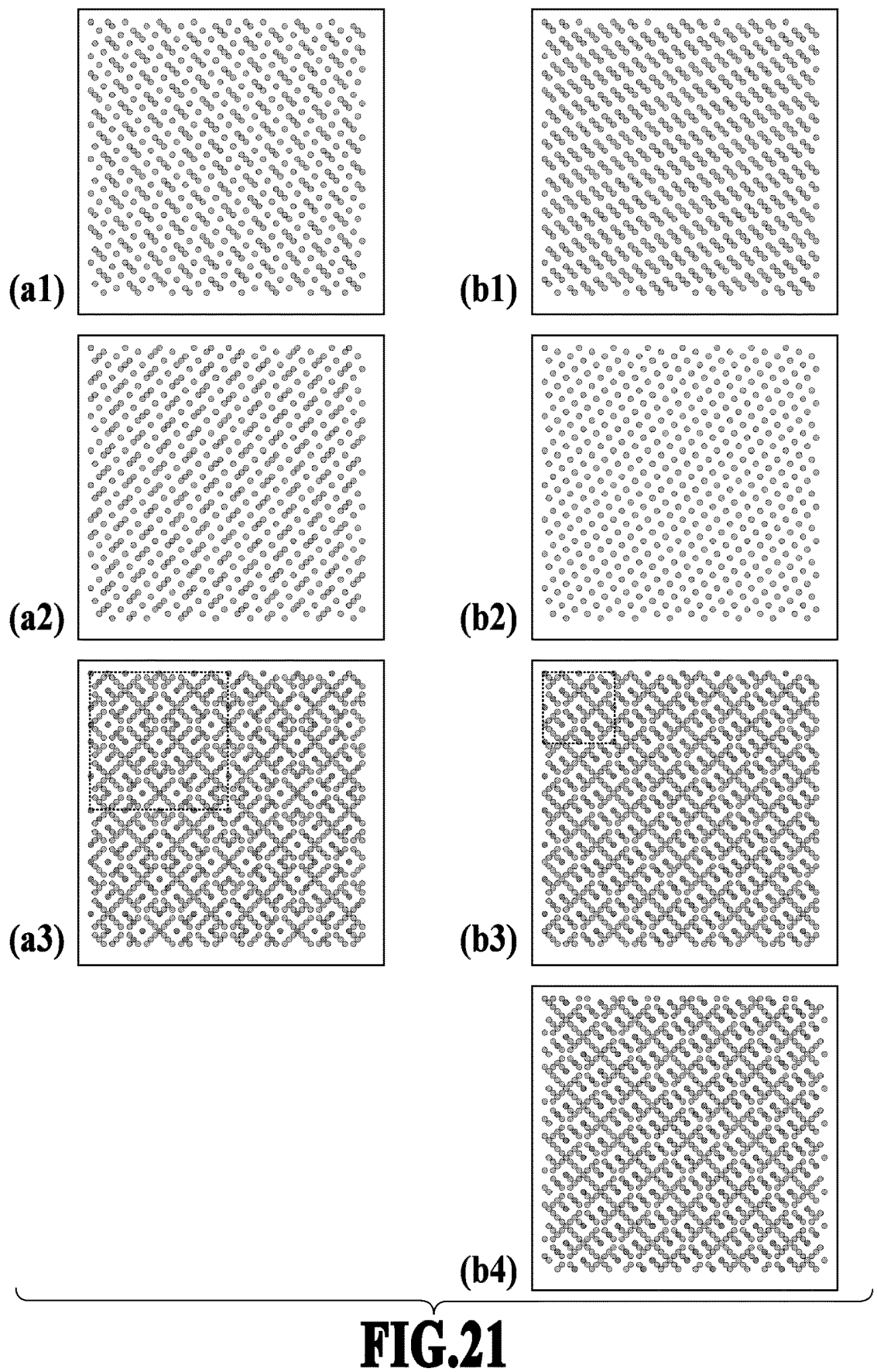
FIG. 21 is diagram showing dot patterns according to quantization processing results.

FIG. 21 shows dot arrangements for a case of an input value K1=K2=86, as a tone different from the example described above. An output value for the input value is, in the prior art, K1'=K2'=640 based on FIG. 18A and is, in the present embodiment, K1'=768 and K2'=512 based on FIG. 18B, and the quantization processing is performed according to the above-described output values. Part (a1) of FIG. 21 is a dot arrangement based on K1" in the prior art, part (a2) of FIG. 21 is a dot arrangement based on K2" in the prior art, and part (a3) of FIG. 21 is a dot arrangement formed on a paper surface by superimposition of the dot arrangement based on K1" in the prior art and the dot arrangement based on K2" in the prior art. Part (b1) of FIG. 21 is a dot arrangement based on K1" in the present embodiment, part (b2) of FIG. 21 is a dot arrangement based on K2" in the present embodiment, and part (b3) of FIG. 21 is a dot arrangement formed on a paper surface by superimposition of the dot arrangement based on K1" in the present embodiment and the dot arrangement based on K2" in the present embodiment. The paper surface in part (a3) of FIG. 21 has many sparse-dot locations and dense-dot locations, whereas part (b3) of FIG. 21 has less sparse-dot locations and dense-dot locations. This is because the dot arrangement in part (b1) of FIG. 21 is more regular and has more dots than the dot arrangement in part (a1) or (a2) of FIG. 21 so as to create as less sparse locations as possible. The present embodiment can thus provide an image with less conspicuous graininess than the prior art. Part (b4) of FIG. 21 is a dot arrangement formed on a paper surface by superimposition of the dot arrangements based on K1" and K2" in the present embodiment with the dot arrangement based on K2" being displaced from the dot arrangement based on K1" in the X-direction by 42 µm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 21 and part (b4) of FIG. 21, a change in the dot arrangement is successfully reduced even under the displacement between the two patterns. The present embodiment can thus provide an image with less conspicuous density unevenness than the prior art. In other words, the present embodiment can mitigate density unevenness like Patent Literature 1 under dot displacement and can offer higher dispersiveness than Patent Literature 1 under no dot displacement.

As shown in FIGS. 18A to 21, a dot pattern based on a certain tone value (a first tone value) and a dot pattern based on a tone value larger than the first tone value (a second tone value) have a relation such that the latter dot pattern encompasses the former dot pattern.

Examples have been presented above where graininess can be reduced by the present embodiment in cases of input values K1=K2=21, 58, and 86. This is because one of two patterns superimposed on a paper surface has more dots in the present embodiment than in the conventional example to form as less sparse locations as possible. Thus, the advantageous effect of the present embodiment is manifested except for a case where the numbers of dots of two patterns superimposed on a paper surface are the same (the tone values indicated by dot-dash lines in FIG. 18B). However, in a case where tone correction processing is performed so that the number of dots is always different between the two patterns for all the input values, more dots appear in one of the patterns in a concentrated manner for all the tones. Dots being concentrated in one of the patterns means increase in ink ejection only in a particular scan direction and is not preferable because it creates new problems such as ink-landing displacement due to the influence of airflow generated by ejection. Thus, it is also important to make a condition such that for a particular tone, the number of dots is the same or close. Optimally, the dot arrangements of the two patterns for such a tone have a smaller and more regular repetition cycle of the dot pattern than its surrounding tones, or in other words, have spatial frequency characteristics that make it unlikely for a human to sense graininess.

Figure 22:
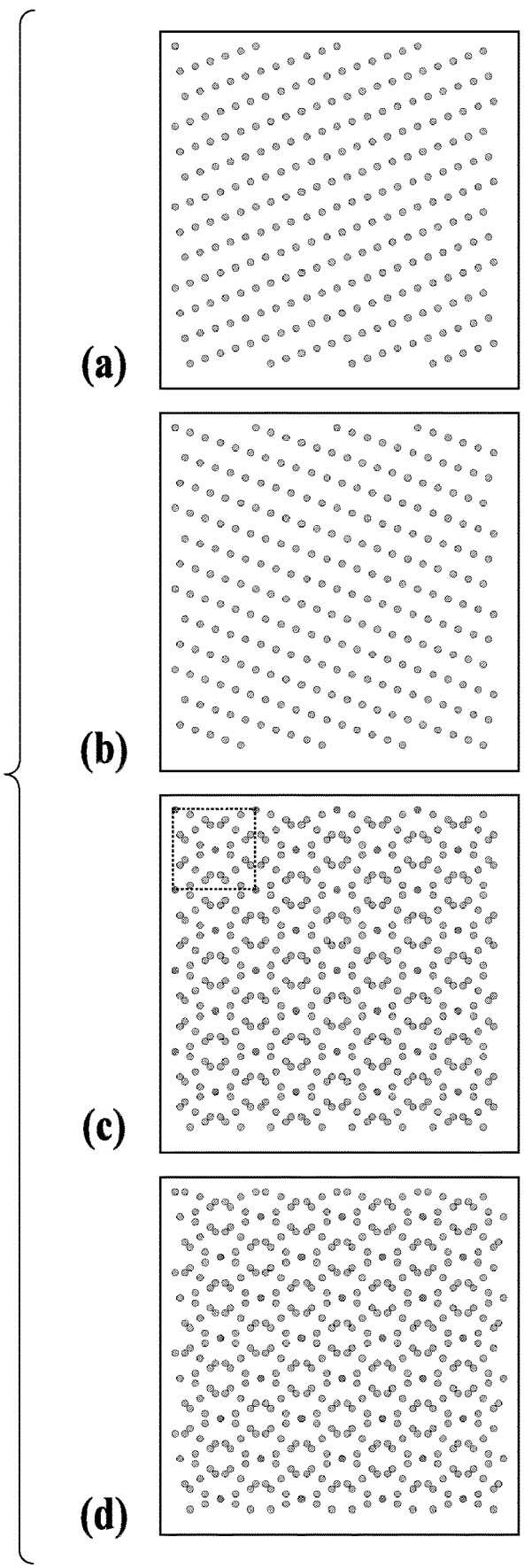
FIG. 22 is diagram showing dot patterns according to quantization processing results.

FIG. 22 shows dot arrangements for a case of an input value K1=K2=40. An output value for the input value is K1'=K2'=256 in both of the prior art and the present embodiment based on FIGS. 18A and 18B, and the quantization processing is performed according to the above-described output values. Part (a) of FIG. 22 is a dot arrangement based on K1", part (b) of FIG. 22 is a dot arrangement based on K2", and part (c) of FIG. 22 is a dot arrangement formed on a paper surface by superimposition of the dot arrangement based on K1" and the dot arrangement based on K2". Part (d) of FIG. 22 is a dot arrangement formed on a paper surface by superimposition of the dot arrangements based on K1" and K2" with the dot arrangement based on K2" being displaced from the dot arrangement based on K1" in the X-direction by 42 μm.

FIG. 23 shows dot arrangements for a case of an input value K1=K2=73, as a tone different from the example described above. An output value for the input value is K1'=K2'=512 in both of the prior art and the present embodiment based on FIGS. 18A and 18B, and the quantization processing is performed according to the above-described output values. Part (a) of FIG. 23 is a dot arrangement based on K1", part (b) of FIG. 23 is a dot arrangement based on K2", and part (c) of FIG. 23 is a dot arrangement formed on a paper surface by superimposition of the dot arrangement based on K1" and the dot arrangement based on K2".

In a comparison between dot arrangements on a paper surface, part (a3) of FIG. 19, part (a3) of FIG. 20, and part (a3) FIG. 21 are the same as part (c) of FIG. 23 in terms of the output values being the same between the two patterns. However, in part (c) of FIG. 22 and part (c) of FIG. 23, a human is less likely to sense graininess because the repetition cycle of the dot arrangement pattern is small in size (shown with a dotted-line frame in each drawing), i.e., the spatial frequency is high. Thus, for a tone with the same or close number of dots between two patterns, a dot arrangement with less conspicuous graininess is preferable.

As thus described, even in a case where there is a displacement of print positions in association with the relative movement between the print head and a printing medium, the present embodiment can provide a high quality image without conspicuous graininess or density unevenness.

In the examples described above, a dot arrangement based on K1" and a dot arrangement according to K2" for a particular input value are both regular dot arrangements. This is because regular dot arrangements are optimal to reduce graininess, but the present embodiment is not limited to such a case. The advantageous effect of the present embodiment can be attained even in a case where tone correction processing or threshold matrices are different from what is described above.

Figure 24:
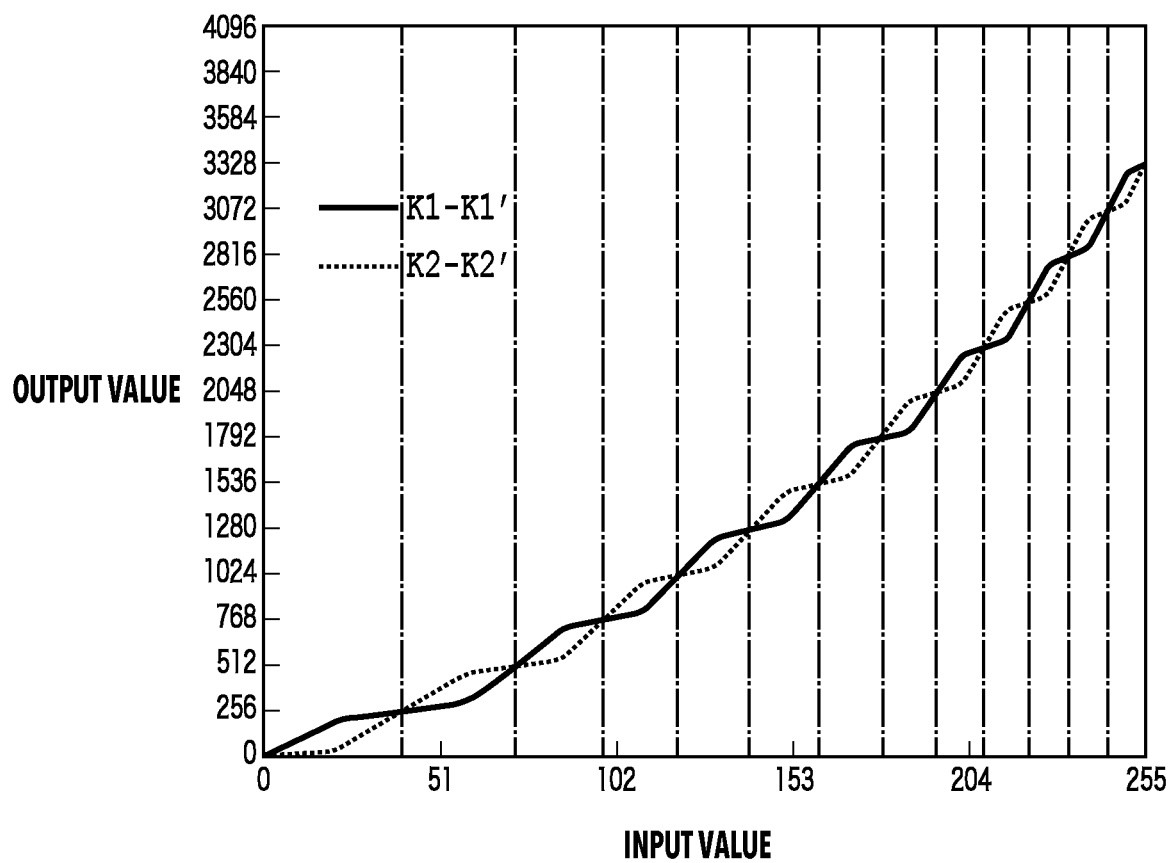
FIG. 24 is a diagram showing tone correction processing.

Next, as a modification of the present embodiment, a case different only in the tone correction processing is shown. FIG. 24 is a diagram showing the tone correction processing in S1404-1 and S1404-2. The dot-dash lines running vertically in FIG. 24 show input values at which the tone correction from K1 to K1' and the tone correction from K2 to K2' equal, and output values for these input values are the same between the prior art and the present embodiment. Thus, compared to the processing in the prior art, the tones between the dot-dash lines are different. In the tone correction from K1 to K1' or the tone correction from K2 to K2' shown in FIG. 18B, there are tones where different input values yield the same output value. In the output tone correction shown in FIG. 24, meanwhile, an output value for an input value increases monotonically, and there are no tones where different input values yield the same output value.

Figure 25:
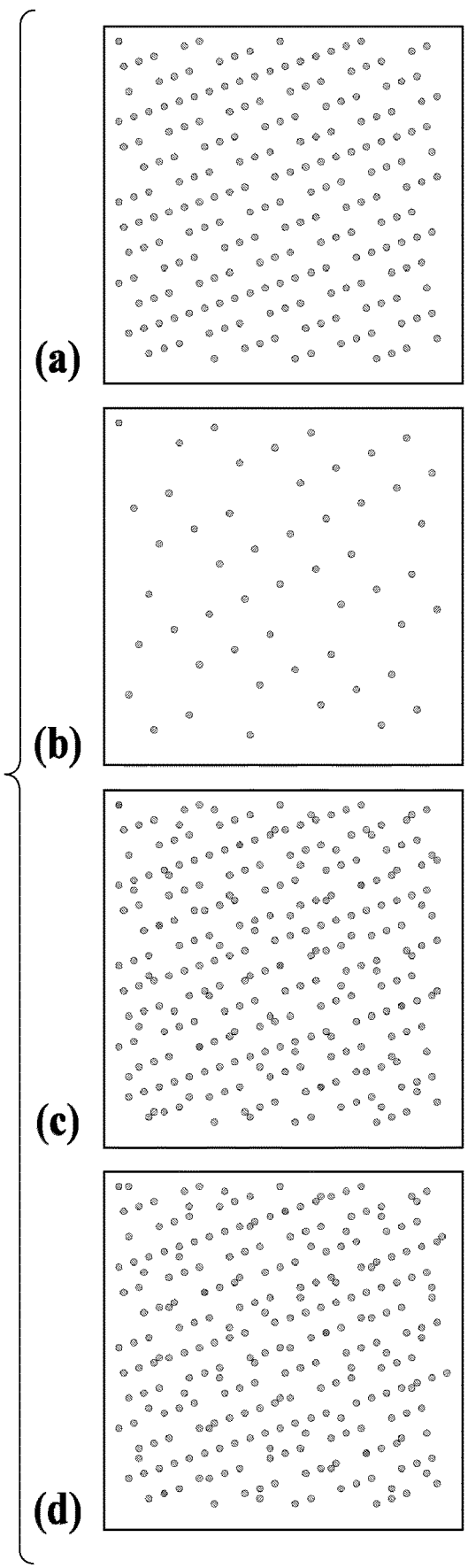
FIG. 25 is diagram showing dot patterns according to quantization processing results.

FIG. 25 shows dot arrangements for a case of an input value K1=K2=21. An output value for the input value is K1'=205 and K2'=51 based on FIG. 24, and the quantization processing is performed according to the above-described output values. part (a) of FIG. 25 is a dot arrangement based on K1", part (b) of FIG. 25 is a dot arrangement based on K2", and part (c) of FIG. 25 is a dot arrangement formed on a paper surface by superimposition of the dot arrangement based on K1" and the dot arrangement based on K2". Part (d) of FIG. 25 is a dot arrangement formed on a paper surface by superimposition of the dot arrangements based on K1" and K2" with the dot arrangement based on K2" being displaced from the dot arrangement based on K1' in the X-direction by 42 μm. As shown in part (c) of FIG. 25 and part (b3) of FIG. 19, the dot arrangement in part (c) of FIG. 25 is less uniform than the dot arrangement in part (b3) of FIG. 19. However, the dot arrangement in part (c) of FIG. 25 still has less sparse locations and dense locations and better graininess than the dot arrangement in part (a3) of FIG. 19, which is the prior art. Also, as can be seen from a comparison between part (c) of FIG. 25 and part (d) of FIG. 25, a change in the dot arrangement is successfully reduced even under the displacement between the two patterns.

Figure 26:
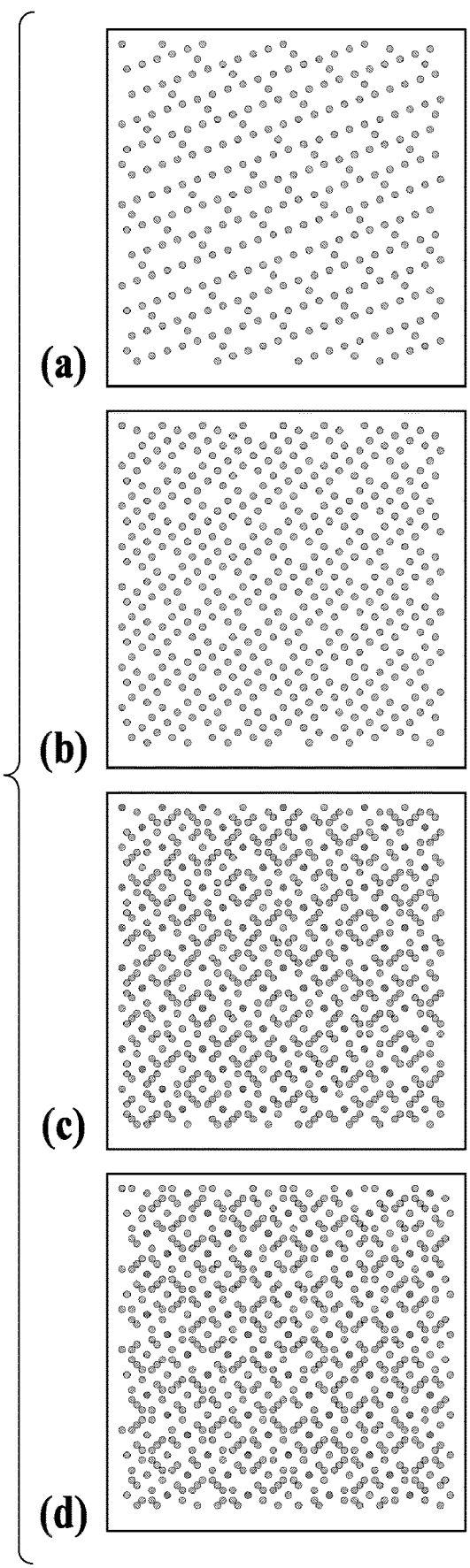
FIG. 26 is diagrams showing dot patterns according to quantization processing results.

FIG. 26 shows dot arrangements for a case of an input value K1=K2=58, as a tone different from the example described above. An output value for the input value is K1'=308 and K2'=460 based on FIG. 24, and the quantization processing is performed according to the above-described output values. Part of (a) of FIG. 26 is a dot arrangement based on K1", part (b) of FIG. 26 is a dot arrangement based on K2", and part (c) of FIG. 26 is a dot arrangement formed on a paper surface by superimposition of the dot arrangement based on K1" and the dot arrangement based on K2". Part (d) of FIG. 26 is a dot arrangement formed on a paper surface by superimposition of the dot arrangements based on K1" and K2" with the dot arrangement based on K2" being displaced from the dot arrangement based on K1" in the X-direction by 42 μm. As shown in part (b) of FIG. 26 and part (b3) of FIG. 20, the dot arrangement in part (b) of FIG. 26 is less uniform than the dot arrangement in part (b3) of FIG. 20. However, the dot arrangement in part (b) of FIG. 26 still has less sparse locations and dense locations and better graininess than the dot arrangement in part (a3) of FIG. 20, which is the prior art. Also, as can be seen from a comparison between part (c) of FIG. 26 and part (d) of FIG. 26, a change in the dot arrangement is successfully reduced even under the displacement between the two patterns.

As thus described, the advantageous effect of the present embodiment can be produced even in a case where there are no tones such that different input values yield the same output value in tone correction processing.

Next, as a modification of the present embodiment, an example case different only in threshold matrices is shown. FIGS. 27A and 27B are diagrams showing, as an example of threshold matrices, a first threshold matrix 2701 for forward scans and a second threshold matrix 2702 for backward scans. Although FIGS. 27A and 27B show the threshold matrices with 16 pixels×16 pixels, this is only a magnification of a portion thereof, and each threshold matrix actually includes 64 pixels×64 pixels. In a case where the threshold matrices in FIGS. 27A and 27B are used, the dot arrangements do not come out as regularly as in a case where the threshold matrices in FIGS. 17A and 17B are used, and for any tone, the dot arrangement has a blue noise property.

Figure 28:
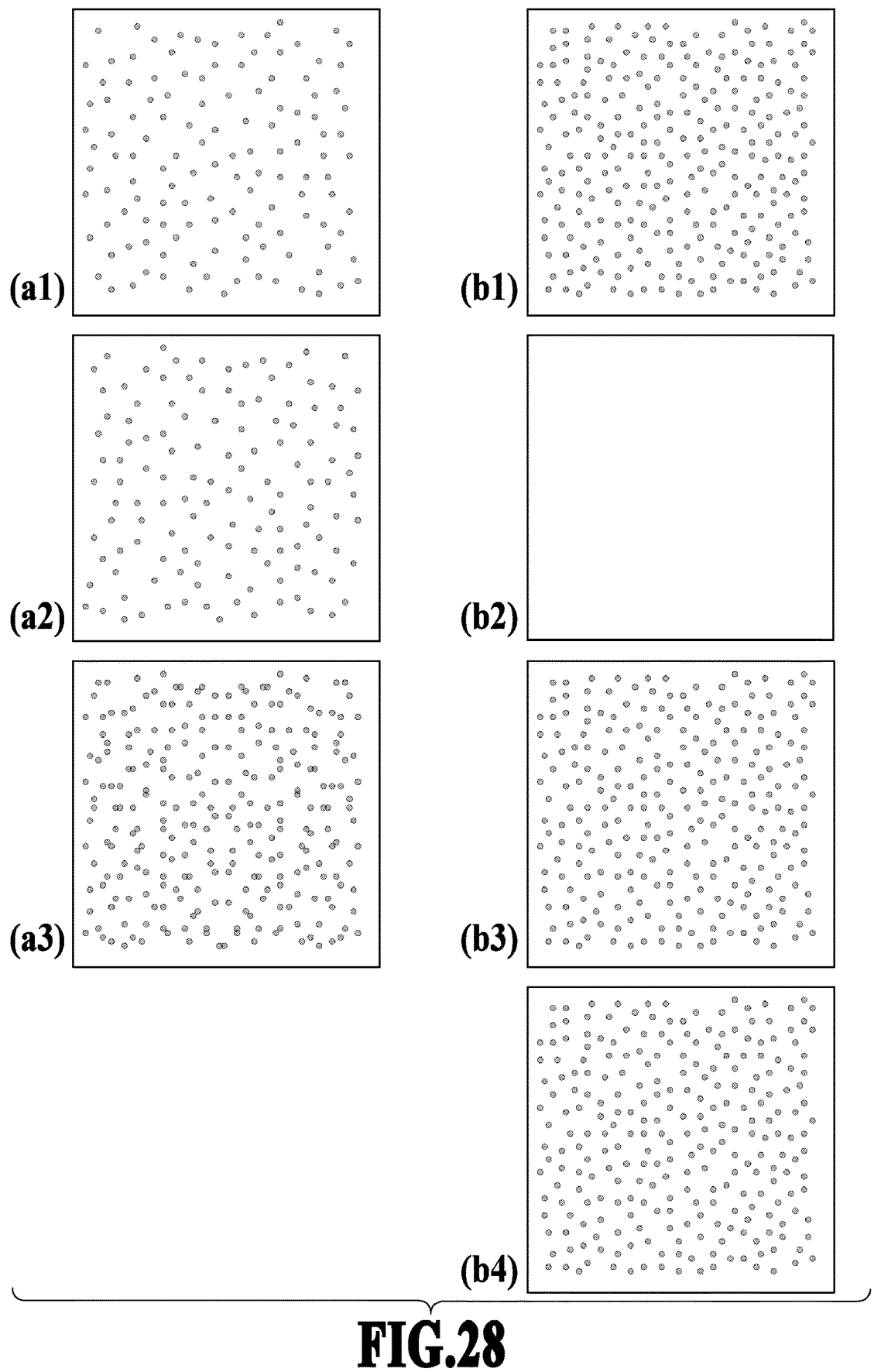
FIG. 28 is diagram showing dot patterns according to quantization processing results.

FIG. 28 shows dot arrangements for a case of an input value K1=K2=21. An output value for the input value is, in the prior art, K1'=K2'=128 based on FIG. 18A and is, in the present embodiment, K1'=256 and K2'=0 based on FIG. 18B, and the quantization processing is performed according to the above-described output values. Part (a1) of FIG. 28 is a dot arrangement based on K1" in the prior art, part (a2) of FIG. 28 is a dot arrangement based on K2" in the prior art, and part (a3) of FIG. 28 is a dot arrangement formed on a paper surface by superimposition of the dot arrangement based on K1" in the prior art and the dot arrangement based on K2" in the prior art. Part (K1) of FIG. 28 is a dot arrangement based on K1" in the present embodiment, part (b2) of FIG. 28 is a dot arrangement based on K2" in the present embodiment, and part (b3) FIG. 28 is a dot arrangement formed on a paper surface by superimposition of the dot arrangement based on K1" in the present embodiment and the dot arrangement based on K2" in the present embodiment.

The paper surface in part (a3) of FIG. 28 has sparse-dot locations and dense-dot locations, whereas in part (b3) of FIG. 28, all the dots are not overlapped and are arranged keeping certain distances from each other. The present embodiment can thus provide an image with less conspicuous graininess than the prior art. Part (b4) of FIG. 28 is a dot arrangement formed on a paper surface by superimposition of the dot arrangements based on K1" and K2" in the present embodiment, with the dot arrangement based on K2" being displaced from the dot arrangement based on K1" in the X-direction by 42 μm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 28 and part (b4) of FIG. 28, the displacement between the two pattens does not change the dot arrangement. As described earlier, the present embodiment can provide an image with less conspicuous density unevenness than the prior art.

Figure 29:
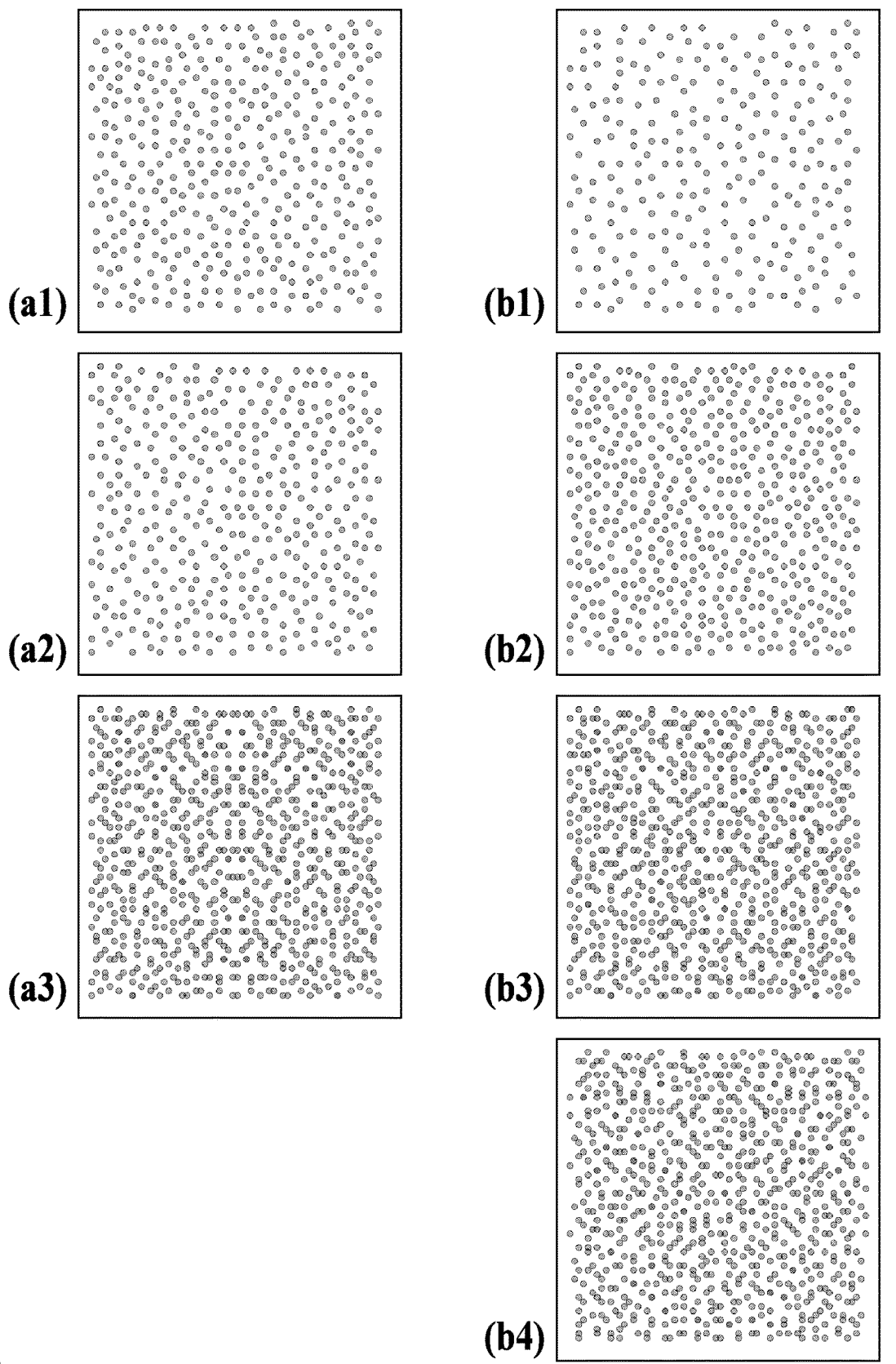
FIG. 29 is diagram showing dot patterns according to quantization processing results.

FIG. 29 shows dot arrangements for a case of an input value K1=K2=58, as a tone different from the example described above. An output value for the input value is, in the prior art, K1'=K2'=384 based on FIG. 18A and is, in the present embodiment, K1'=256 and K2'=512 based on FIG. 18B, and the quantization processing is performed according to the above-described output values. Part (a1) of FIG. 29 is a dot arrangement based on K1" in the prior art, part (a2) of FIG. 29 is a dot arrangement based on K2" in the prior art, and part (a3) of FIG. 29 is a dot arrangement formed on a paper surface by superimposition of the dot arrangement based on K1" in the prior art and the dot arrangement based on K2" in the prior art. Part (b1) of FIG. 29 is a dot arrangement based on K1" in the present embodiment, part (b2) of FIG. 29 is a dot arrangement based on K2" in the present embodiment, and part (b3) of FIG. 29 is a dot arrangement formed on a paper surface by superimposition of the dot arrangement based on K1" in the present embodiment and the dot arrangement based on K2" in the present embodiment. The paper surface in part (a3) of FIG. 29 has sparse-dot locations and dense-dot locations, whereas part (b3) of FIG. 29 has less sparse-dot locations and dense-dot locations. Here, to give a detailed description, FIGS. 30A and 30B show enlarged dot arrangements on a paper surface.

Figure 30A:
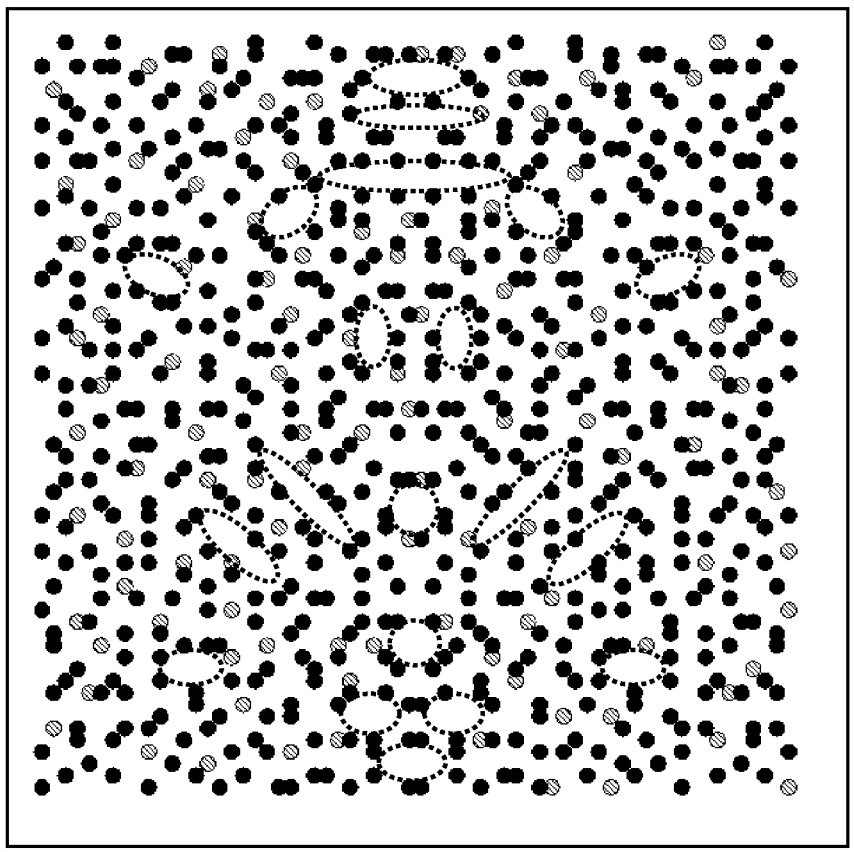
FIGS. 30A and 30B are diagrams illustrating graininess.
Figure 30B:
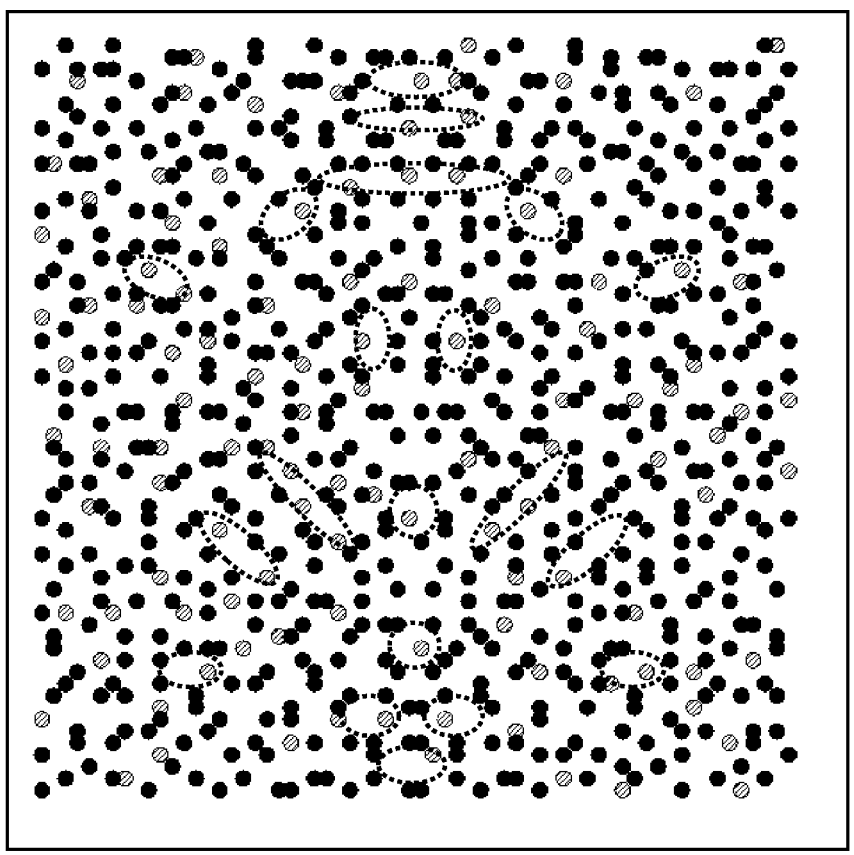

FIG. 30A is an enlarged diagram of part (a3) of FIG. 29, and FIG. 30B is an enlarged diagram of part (b3) of FIG. 29. The black dots in FIGS. 30A and 30B indicate dots commonly present in FIGS. 30A and 30B. FIG. 30A has many sparse regions, and some of such regions are indicated by oval dotted lines. By contrast, FIG. 30B also has non-black dots filling relatively sparse spaces, i.e., the spaces that are empty in FIG. 30A (the spaces indicated by the oval dotted lines). This is because the dot arrangement in part (b2) of FIG. 29 has more dots than the dot arrangement in part (a1) or (a2) of FIG. 29 so as to create as less sparse locations as possible. The present embodiment can thus provide an image with less conspicuous graininess than the prior art. Part (b4) of FIG. 29 is a dot arrangement formed on a paper surface by superimposition of the dot arrangements based on K1" and K2" in the present embodiment with the dot arrangement based on K1" being displaced from the dot arrangement based on K1" in the X-direction by 42 μm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 29 and part (b4) of FIG. 29, the displacement between the patterns does not greatly change the dot arrangement. The present embodiment can thus provide an image with less conspicuous density unevenness than the prior art.

As thus described, the advantageous effect of the present embodiment can be produced even in a case of using threshold matrices which do not produce regular dot arrangements.

Advantageous Effects Etc. of the Present Embodiment

As thus described above, the apparatus of the present embodiment has a first creation unit configured to create, based on a first tone value, a first dot pattern and a second dot pattern printed and superimposed on the first dot pattern. The apparatus further has a second creation unit configured to create, based on a second tone value (>the first tone value), a third dot pattern having an equal or larger number of dots compared to the first dot pattern and a fourth dot pattern printed and superimposed on the third dot pattern and having an equal or larger number of dots compared to the second dot pattern. An increase in the number of dots from the first dot pattern to the third dot pattern is larger or smaller than an increase in the number of dots from the second dot pattern to the fourth dot pattern.

The apparatus of the present embodiment also has a third creation unit configured to create, based on a third tone value (>the second tone value), a fifth dot pattern and a sixth dot pattern printed and superimposed on the fifth dot pattern. An increase in the number of dots from the third dot pattern to the fifth dot pattern is larger or smaller than an increase in the number of dots from the fourth dot pattern to the sixth dot pattern.

The apparatus of the present embodiment also has a fourth creation unit configured to create, based on a fourth tone value (>the third tone value), a seventh dot pattern and an eighth dot pattern printed and superimposed on the seventh dot pattern. An increase in the number of dots from the fifth dot pattern to the seventh dot pattern is larger or smaller than an increase in the number of dots from the sixth dot pattern to the eighth dot pattern.

There are various conceivable examples of the first to fourth tone values described above, such as the first tone=40, the second tone=58, the third tone value=73, and the fourth tone value=86 (see FIG. 18B). Thus, there are a mixture of tones where one pattern has more dots than the other pattern and tones where the one pattern has less dots than the other pattern. As a result, this helps prevent a situation where dots are concentrated in one of the patterns in a case of printing an image containing various input values.

Although the present embodiment shows an example where a tone with a larger number of dots and a tone with a smaller number of dots are alternately repeated for all the tones with an input value of 0 to 255, this is not necessary for all the tones, and such repetition only has to be used for some of the tones.

Even in a case where print positions are displaced in association with the relative movement between the print head and a printing medium, the present embodiment described above can provide a high quality image with less conspicuous graininess and density unevenness.

Although the numbers of dots in the two patterns are controlled by the tone correction processing performed immediately after the division processing in the example described above, the present embodiment is not limited to this. Specifically, the number of dots in the two patterns may be controlled by the tone correction processing or the color separation processing with the division processing being performed more upstream in the image processing flowchart, or the number of dots in the two patterns may be controlled by the quantization processing with the division processing being performed more downstream in the image processing flowchart.

Also, the image processing apparatus 1 does not necessarily have to execute the entire image processing described above, and the printing apparatus 2 may execute a part or entirety of the image processing. Note that for the sake of convenience, an image processing apparatus and a printing apparatus are collectively called as an "information processing apparatus" (or simply an "apparatus)".

Second Embodiment

The present embodiment, like the first embodiment, uses a serial-type inkjet printing apparatus and an inkjet printing system like the ones shown in FIGS. 11 and 13. Thus, descriptions about parts that are the same as those in the first embodiment are omitted below. Note, however, that the present embodiment uses a print head of a configuration different from that of the above embodiment and performs image processing and drive control suited for the print head.

<Nozzle Arrangement>

Figure 31:
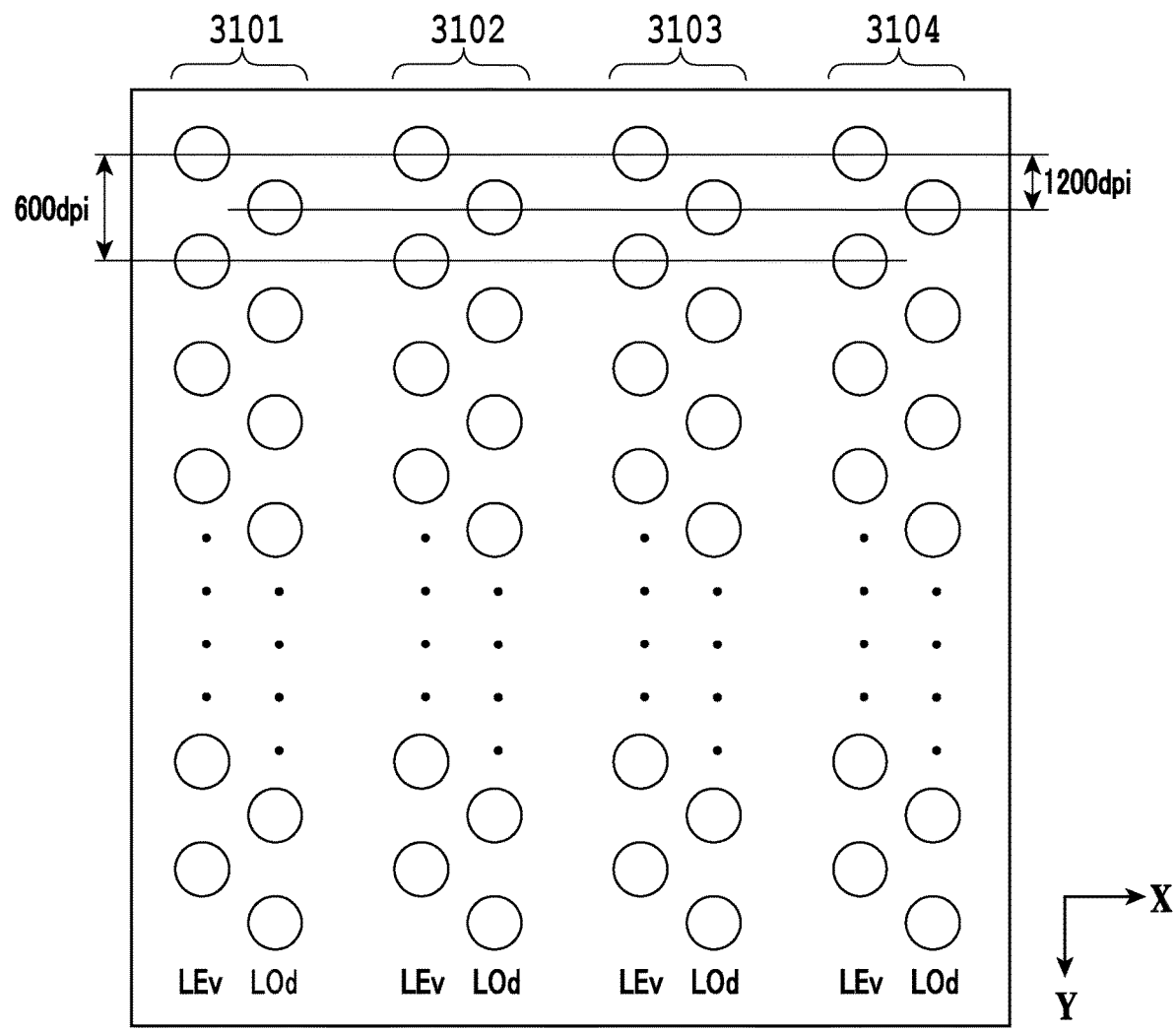
FIG. 31 is a schematic view of a print head used in a second embodiment.

FIG. 31 is a schematic diagram of a print head H used in the present embodiment observed from the nozzle surface side. As shown in FIG. 31, on the nozzle surface, four nozzle arrays are arranged side by side, which are, from the left, a black nozzle array 3101, a cyan nozzle array 3102, a magenta nozzle array 3103, and a yellow nozzle array 3104. For each nozzle array, an LEv array and an LOd array are arranged, in each of which nozzles that eject 5 pl of ink are arranged in the Y-direction at a pitch of 600 dpi. Each of the LEv array and the LOd array has an array of 128 nozzles, and the LEv array is situated while being displaced from the LOd array in the −Y-direction by half the pitch. Printing and scanning using the nozzle arrays thus configured allow dots with a dot diameter of 30 μm to be printed on a printing medium at a print density of 1200 dpi.

<Image Processing>

Figure 32:
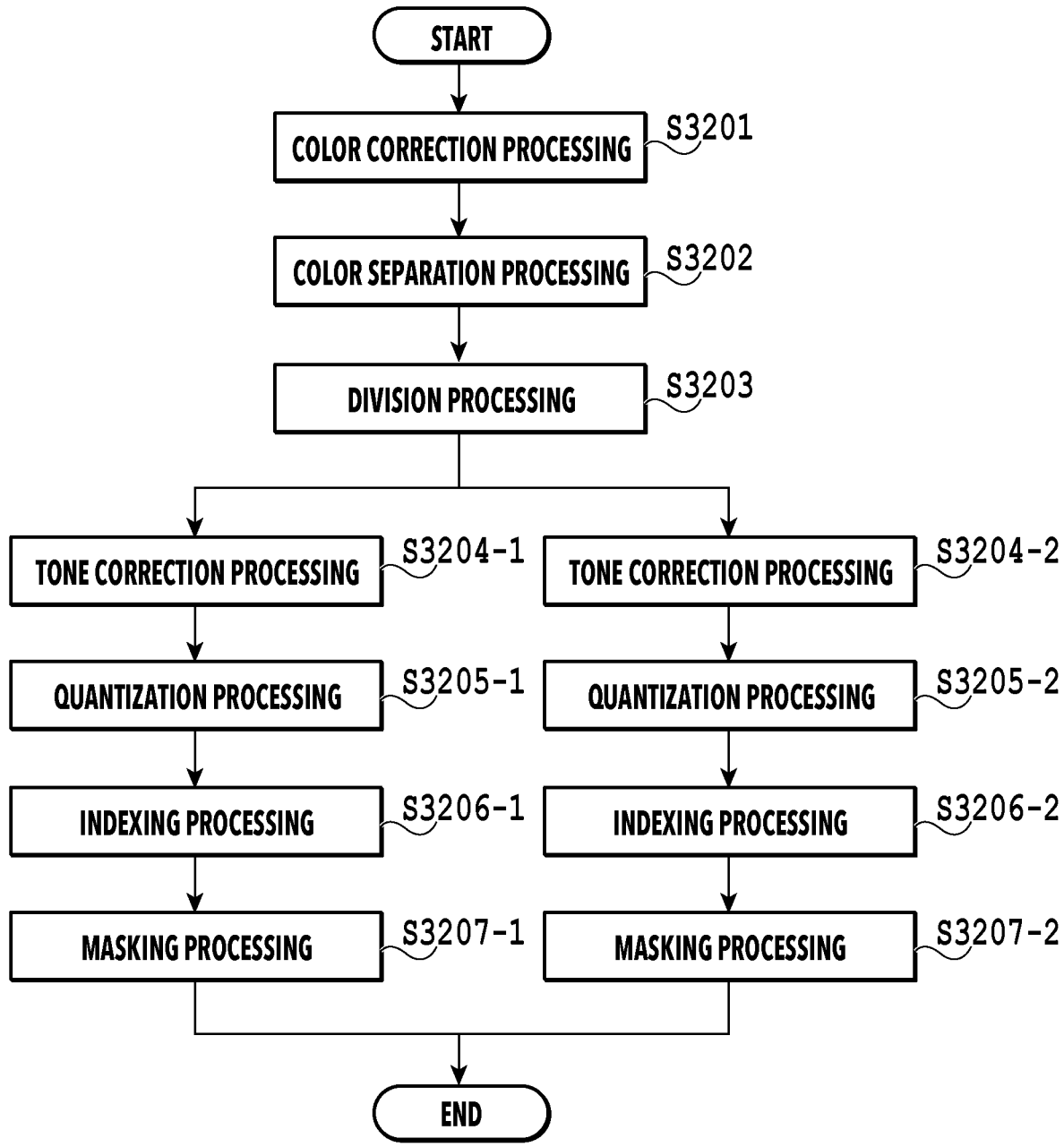
FIG. 32 is a flowchart of image processing in the second embodiment.

FIG. 32 is a flowchart illustrating processing executed by the of the main control unit 1308 of the image processing apparatus 1 in an event where a given image is printed by the printing apparatus 2 of the present embodiment. The processing performed in S3201 to S3205 is the same as the processing in S1401 to S1405 of the first embodiment described with FIG. 14, and parts that are the same as those in the first embodiment are not described here. Note, however, that the resolution of image data, which is 1200 dpi in the first embodiment, is 600 dpi in the present embodiment.

In and after S3204-1 and S3204-2, the same processing is performed for each ink color in parallel. Cyan data (C1', C2') is used as an example in the following description.

In S3205-1 and S3205-2, the main control unit 1308 performs predetermined quantization processing on each of multi-value data C1' and C2' and thereby creates quantized data C1" for a forward scan and quantized data C2" for a backward scan. The method of the quantization processing is the same as that in the present embodiment.

In S3206-1 and S3206-2, the main control unit 1308 performs indexing processing. In the indexing processing in the present embodiment, an index pattern prepared in advance is used to convert 600×600 dpi binary data C1" and C2" to 600×1200 dpi binary data C1p and C2p, respectively. Specifically, a region of one pixel in the X-direction and one pixel in the Y-direction is divided to a region of one pixel in the X-direction and two pixels in the Y-direction, and to print (1) or not to print (0) a dot is set for each pixel.

Parts (a) to (e) of FIG. 33 are diagrams showing a dot arrangement pattern and reference index patterns used in the indexing processing. Part (a) of FIG. 33 is a diagram showing a dot arrangement pattern. A one-pixel region of 600×600 dpi is associated with two pixels of 600×1200 dpi. In a case where quantized data C1", C2" on one pixel of 600×600 dpi indicates "0", i.e., not to print a dot, a dot is placed on neither one of the pixels of 600×1200 dpi. Meanwhile, in a case where quantized data C1", C2" on one pixel of 600×600 dpi indicates "1", i.e., to print a dot, there are two possible positions to actually print a dot. In the present embodiment, a pattern A for placing a dot in the upper pixel, i.e., the pixel on the −Y-direction side, and a pattern B for placing a dot in the lower pixel, i.e., the pixel on the +Y-direction side, are prepared. In the dot arrangement pattern of the present embodiment, the upper pixel is printed by the nozzles in the LEv array, and the lower pixel is printed by the nozzles in the LOd array (see FIG. 31).

Part (b) of FIG. 33 is a diagram showing a reference index pattern 3300 for forward scans, and part (d) of FIG. 33 is a diagram showing a reference index pattern 3301 for backward scans. Each square in these reference index pattern corresponds to one pixel region of 600×600 dpi. It is defined in each pixel whether to place a dot using the pattern A or the pattern B in a case where the quantized value of the corresponding pixel is "1".

Parts (c) and (e) of FIG. 33 show binary data which is 600 dpi in the X-direction and 1200 dpi in the Y-direction obtained by indexing processing performed according to the reference index patterns 3300 and 3301 in a case where the quantized values of the pixels are all "1". Specifically, part (c) of FIG. 33 is binary data for a forward scan according to the reference index pattern 3300, and part (e) of FIG. 33 is binary data for a backward scan according to the reference index pattern 3301. The binary data in part (c) of FIG. 33 and the binary data in part (e) of FIG. 33 are transmitted to the printing apparatus 2. The controller 1301 of the printing apparatus 2 performs predetermined printing control according to the binary data received.

In S3207-1 and S3207-2, the main control unit 1308 performs masking processing. Dots printed by one scan are limited by logical ANDS performed between the binary data after the indexing processing and a mask pattern of 600× 1200 dpi prepared in advance.

Figure 34:
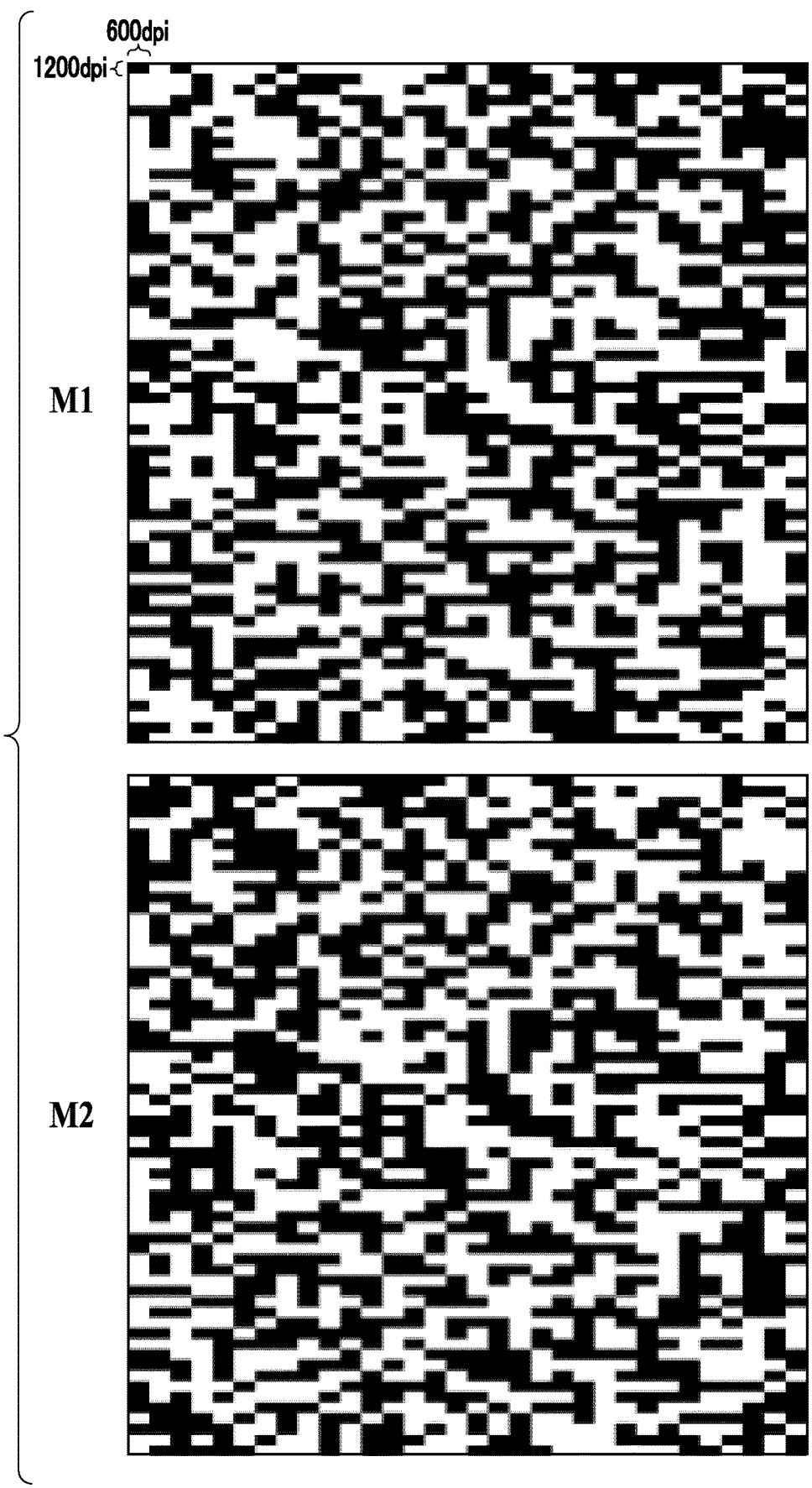
FIG. 34 is a diagram showing mask patterns.

FIG. 34 shows mask patterns used in the present embodiment. Each mask pattern is formed by 32 pixels×64 pixels in the unit of 600 dpi×1200 dpi and is used repeatedly in the X-direction and the Y-direction. A black pixel indicates "1 (to permit printing)", and a white pixel indicates "0 (not to permit printing)". Only a pixel for which the quantized data and the mask pattern are both "1" is print data "1," and ink is ejected therefor. Mask patterns include mask patterns M1 and M2 which complement each other. In the present embodiment, the same mask patterns M1 and M2 are used for the binary data C1p for a forward scan and the binary data C2p for a backward scan. However, the mask patterns are not limited to the above, and the mask size and the pattern of the mask patterns may be different, or different patterns may be prepared for each nozzle array or for forward and backward scans.

<Time-Division Drive Control>

In the inkjet print head H of the present embodiment, film boiling is caused in ink by application of a voltage pulse to an electrothermal conversion element (heater) provided for each individual nozzle, and the ink is ejected by the growing energy of a bubble thus generated. In this event, a large amount of power source is needed to apply voltage pulses to a plurality of heaters at the same time, and for this reason, a conventionally-known time-division driving method is used.

Figures 35A, 35B:
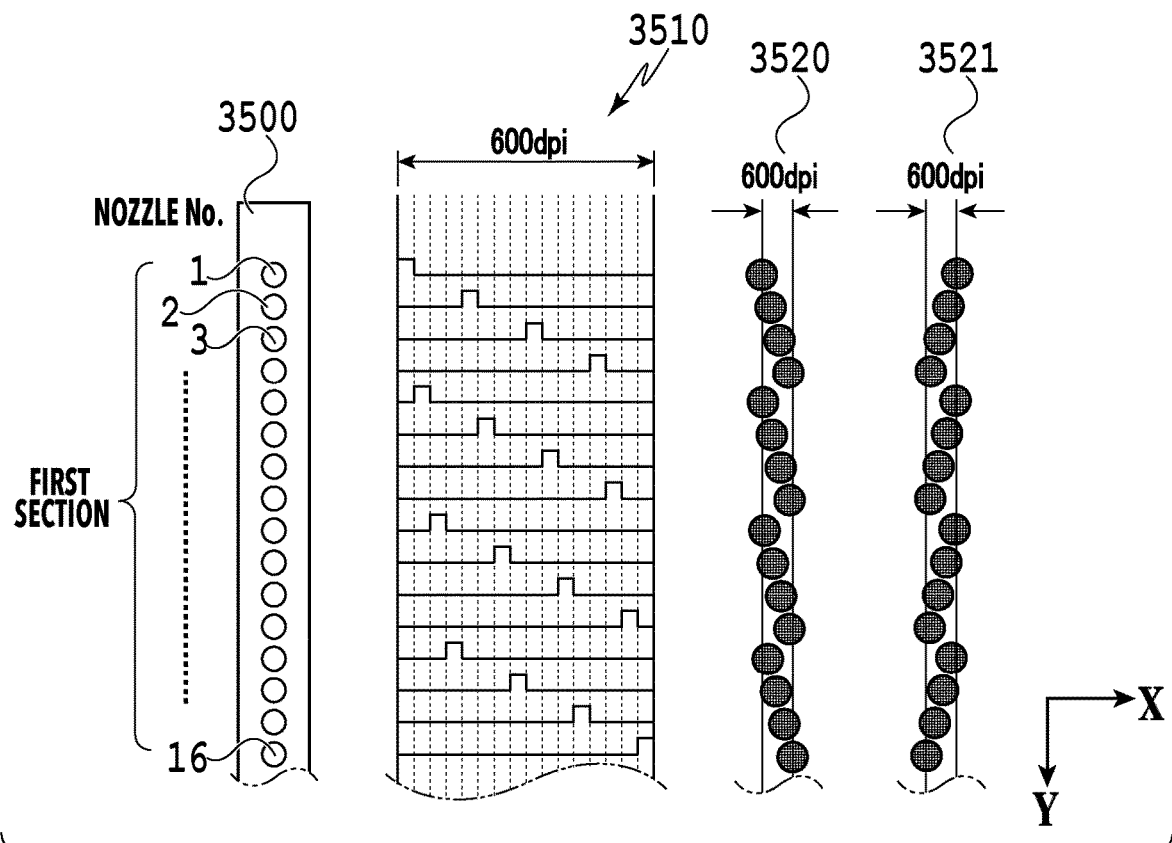
FIGS. 35A and 35B are diagrams illustrating a time division driving method.

FIGS. 35A and 35B are diagrams illustrating the time-division driving method. In the time-division driving of the present embodiment, 128 nozzles arranged in a single nozzle array are divided into 16 blocks, and a timing to apply a voltage pulse to a heater is shifted on a block by block basis.

FIG. 35A is a diagram showing block numbers and the order of driving the blocks. FIG. 35A shows that the nozzles included in block 1 are driven at the first timing, the nozzles included in block 2 are driven at the fifth timing, and the nozzles included in block 16 are driven at the 16th timing. Each of the 16 blocks is driven at one of the 1st to 16th timings obtained by dividing a period of time corresponding to one pixel at 600 dpi into 16 sections.

FIG. 35B is a diagram showing nozzles arranged in a nozzle array 3500, a timing chart for driving the individual nozzles, and how dots are printed. The nozzles arranged in the Y-direction are allocated to the blocks in such a manner that the first nozzle in the −Y-direction side is allocated to block 1, the second nozzle to block 2, and so on, and the 16th nozzle is allocated to block 16. Also, the 17th to 32nd nozzles are allocated again to block 1, block 2, . . . , and block 16, respectively. Thus, block 1 includes 1st, 17th, . . . , and 113th nozzles, block 2 includes 2nd, 17th, . . . , and 114th nozzles, and block 16 includes 16th, 32nd, . . . , and 128th nozzles.

A timing chart 3510 shows timings to drive the respective nozzles according to the table in FIG. 35A. Although only timings to drive the 1st to 16th nozzles are shown here, the timing chart 3510 is repeated for and after the 17th nozzle. In FIG. 35B, the horizontal axis represents time, and the vertical axis represents voltage applied to the heaters. According to FIGS. 35B, among the 16 sections of the period of time corresponding to one pixel of 600 dpi, the nozzles are driven in the order of the 1st, 5th, 9th, and 13th nozzles, and the 16th nozzle is driven lastly.

By moving the carriage 1108 (see FIG. 11) in the +X-direction under such drive control, a dot pattern 3520 is formed on a printing medium. Since ejection is performed with the carriage 1108 moving in the X-direction, dots are placed while being displaced in the X-direction according to the driving order. To be more specific, with a one pixel region of 600 dpi split into 16 zones, dots printed by four nozzles adjacent to each other, such as the first to fourth nozzles, are each located while being displaced from its adjacent one by four zones. For this reason, on a printing medium, oblique lines slanted relative to the X-direction are repeatedly arranged in the Y-direction.

Meanwhile, by moving the carriage 1108 in the −X-direction under such drive control, a dot pattern 3521 is formed on the printing medium. Compared to the dot pattern 3520 for a forward scan, the slanting directions of the oblique lines are inverted in the main scanning direction.

By performing time-division driving as described above, the number of nozzles driven at the same time can be reduced, and consequently, power source capacity can be reduced. Meanwhile, there are variations in dot print positions within one pixel region of 600 dpi, like in the dot patterns 3520 and 3521. Countermeasures against this variation will be described later.

<Printing Operation>

Figure 36:
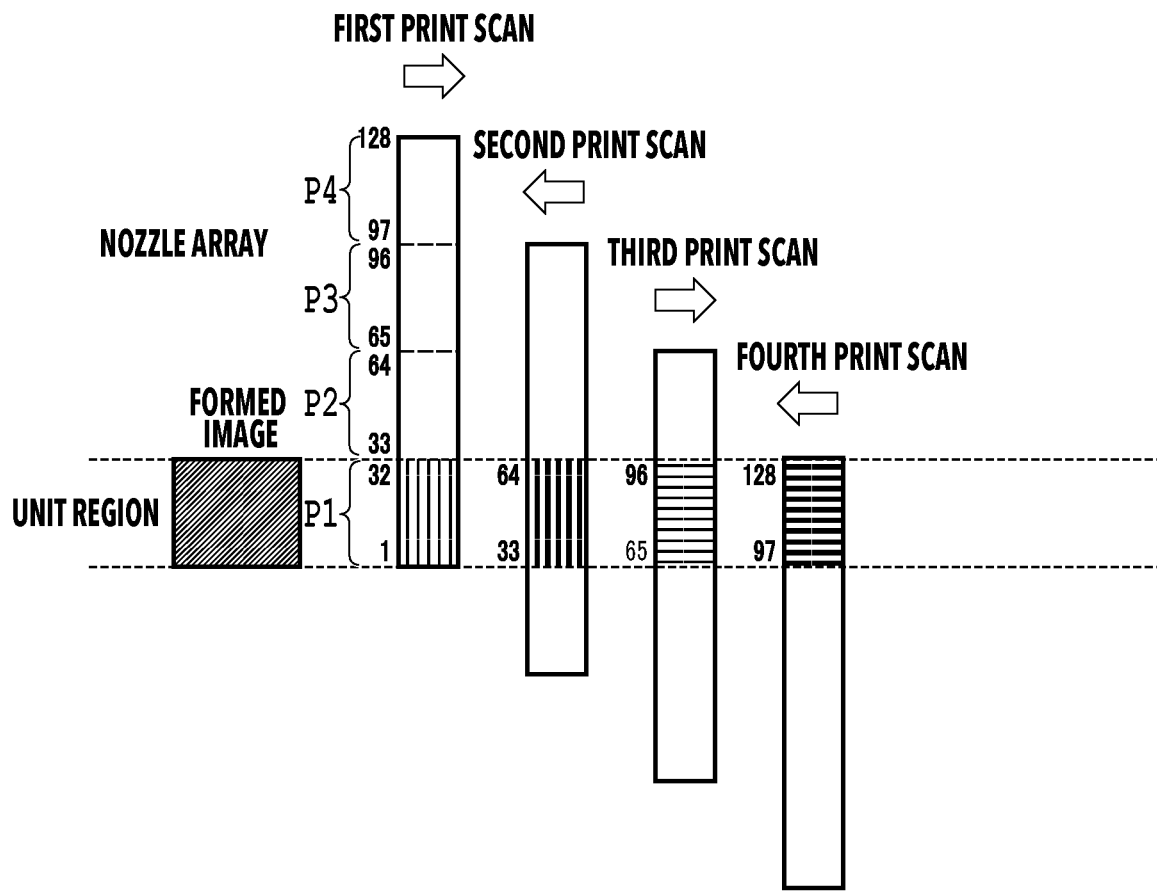
FIG. 36 is a diagram illustrating bidirectional four-pass printing.

FIG. 36 is a schematic diagram illustrating bidirectional four-pass printing executed by the printing apparatus 2 under the control of the controller 1301. Here, to simplify the description, a printing operation related to a cyan nozzle array 3102LEv (see FIG. 31) is described out of the plurality of nozzle arrays arranged on the print head H.

In a case of performing four-pass printing, 128 nozzles included in the nozzle array 3102LEv are divided into nozzles in a first divided region P1 to nozzles in a fourth divided region P4.

In the first print scan, the controller 1301 performs an ejection operation according to the logical AND between the binary data C1p and the mask M1 using the nozzles in the first divided region P1 while moving the print head H in the +X-direction, which is the forward direction. After that, the controller 1301 conveys the print medium in the −Y-direction by 32 pixels. For the sake of convenience, FIG. 36 shows the relative positional relation between each divided region and the print medium by moving the nozzle array 3102LEv in the +Y-direction.

In the second print scan, the controller 1301 performs an ejection operation according to the logical AND between the binary data C2p and the mask M1 using the nozzles in the second divided region P2 while moving the print head H in the −X-direction, which is the backward direction opposite from the direction in the first print scan. After that, the controller 1301 conveys the print medium in the −Y-direction by 32 pixels.

In the third print scan, the controller 1301 performs an ejection operation according to the logical AND between the binary data C1p and the mask M2 using the nozzles in the third divided region P3 while moving the print head H in the +X-direction, which is the forward direction. After that, the controller 1301 conveys the print medium in the −Y-direction by 32 pixels.

In the fourth print scan, the controller 1301 performs an ejection operation according to the logical AND between the binary data C2p and the mask M2 using the nozzles in the fourth divided region P4 while moving the print head H in the −X-direction, which is the backward direction. After that, the controller 1301 conveys the print medium in the −Y-direction by 32 pixels.

Because the masks M1 and M2 have a complementary relation as described earlier, a dot pattern according to the binary data C1p printed by a forward scan and a dot pattern according to the binary data C2p printed by a backward scan are printed and superimposed on each unit region on the printing medium in the end.

<Printing Control Method>

The following describes a control method for achieving a robust pattern on a printing medium by performing four-pass printing using the indexing processing, the masking processing, the configuration of the print head, and the time division driving control described above. A robust pattern is a dot pattern formed by a plurality of dot patterns printed on a predetermined pixel region in a superimposed manner, and refers to a pattern having characteristics such that the dot coverage and graininess in the pixel region do not change greatly even if these plurality of dot patterns are displaced relatively. Note that a coverage refers to the percentage of the area covered by dots in relation to a printing medium.

Parts (a) to (d) of FIG. 37 are diagrams illustrating the driving control using the cyan nozzle array 3102 described with FIG. 31. FIG. 37 shows a state where dots are printed using the LEv array and the LOd array that eject 5 pl of a cyan ink.

Part (a) of FIG. 37 shows a dot pattern for a case of printing dots using the LEv array and the LOd array on each pixel of 600 dpi without performing the time division driving described above. Part (b) of FIG. 37 shows a dot pattern for a case where the print positions of the LOd array are displaced from the print positions of the LEv array by one pixel of 1200 dpi without the time division driving being performed. Displacing the print positions of the LEv array relative to the LOd array in the X-direction by one pixel of 1200 dpi allows formation of a grid pattern having higher dot dispersiveness than that in part (a) of FIG. 37.

Part (c) of FIG. 37 shows a dot pattern for a case where the pattern of part (b) of FIG. 37 is printed by a forward scan with the time division driving being performed. In other words, this dot pattern is a pattern such that the displacement shown in the dot pattern 3520 in FIG. 35B is reflected on the pattern in part (b) of FIG. 37. In this case, although the patterns are grid patterns, the intervals between straight lines connecting the centers of the dots printed by the LOd array and straight lines connecting the centers of the dots printed by the LEv array are not equal, and the dot dispersiveness is low compared to that in part (b) of FIG. 37.

Part (d) of FIG. 37 shows a dot pattern where dots are printed with the print positions of the LOd array being further displaced from the state in part (c) of FIG. 37 in the X-direction by (600 dpi±16×2≈15.9 μm). By such a displacement, the intervals between dots printed by the LEv array and dots printed by the LOd array become equal, achieving a favorable grid pattern.

The amount of displacement (600 dpi±16×2) is equivalent to half the displacement (600 dpi±16×4) in the X-direction between dots adjacent in the Y-direction in the time division driving described in FIG. 35B, i.e., two blocks of the time division driving. Thus, by using the time division driving described above, the present embodiment performs driving control to delay the driving timing of the LOd array by two blocks from the reference position in forward scans.

FIGS. 38A and 38B are schematic diagrams illustrating how the driving timing shifting described above is performed in forward print scans. FIG. 38A shows driving timings for forward scans, and FIG. 38B shows driving times for backward scans. The cyan nozzle array 3102 is disposed on the print head H, as shown in FIG. 31.

In a forward scan, first, at the timing when the LEv array reaches the reference position, the LEv array is driven by the above-described time division driving. After that, the LOd array is not driven at the timing of reaching the reference position, and is driven, by the time division driving, at the timing of reaching a position shifted from the reference position by two blocks (600 dpi±16×2).

In a backward scan, first, the LOd array is not driven at the timing of reaching the reference position, and is driven, by the time division driving, at the timing of reaching a position shifted from the reference position by two blocks (600 dpi±16×2). After that, at the time of reaching the reference position, the LEv array is driven by the time division driving.

By performing the driving control described above, the grid pattern shown in part (d) of FIG. 37 is obtained by a forward scan, and a grid pattern which is an inversion of the grid pattern in part (d) of FIG. 37 in the main scanning direction is obtained in a backward scan. However, in a case where the printing apparatus has a limited capability in its resolution for the displacement, a displacement of at least 1200 dpi is sufficient.

Although the above describes a case of shifting (delaying) the timing for driving the LOd array relative to the LEv array, the dot pattern shown in part (d) of FIG. 37 can be obtained also by hasting the timing for driving the LEv array relative to the LOd array. Also, a nozzle array for which to shift the driving timing may be switched between the LEv array and the LOd array for a forward scan and a backward scan. In the present embodiment, the LOd array is shifted in timing in the +X-direction by 1200 dpi in a forward scan, and the LEv array is shifted in timing in the −X-direction by 1200 dpi in a backward scan.

Using FIG. 37, a driving method for achieving a favorable grid pattern for four nozzles adjacent in the Y-direction (a total of eight nozzles for the LOd array and the LEv array) has been described. However, in the time division driving of the present embodiment, as shown in FIG. 35B, a displacement of 11 blocks occurs every four nozzles. For this reason, in the present embodiment, to resolve such a displacement and obtain a favorable grid pattern in the entire region of the nozzle array, an index pattern and threshold matrices prepared in advance are offset, for every four nozzles, from the optimal arrangement without displacement of driving blocks. This can take care of the displacement.

<Threshold Matrices>

FIGS. 39A and 39B are diagrams showing an example of threshold matrices stored in the memory 1603. As the threshold matrices, a first threshold matrix 3901 for forward scans and a second threshold matrix 3902 for backward scans are prepared. Although the threshold matrices are each shown with 16 pixels×16 pixels in FIGS. 39A and 39B, this is only a magnification of a portion thereof, and each threshold matrix actually includes 32 pixels×32 pixels.

In FIGS. 39A and 39B, each square corresponds to a pixel arranged on the XY plane, and a value shown in the square is a threshold for the corresponding pixel position. In the present embodiment, multi-value data C1' and C2' each have a value from 0 to 1024 unlike the first embodiment, and for this reason, each threshold Th is a value from 0 to 1023. Then, in a case where C1'>Th for a processing target pixel, the quantized value C1" for the processing target pixel indicates to print (C1"=1). By contrast, in a case where C1'<Th for a processing target pixel, the quantized value C1" for the processing target pixel indicates not to print (C1"=0). The same is true to the relation between C2' and C2".

In the present embodiment, the threshold matrices 3901 and 3902 each having a region of 16 pixels×16 pixels as shown in FIGS. 39A and 39B (actually 32 pixels×32 pixels) are prepared and used repeatedly in the X-direction and the Y-direction for forward scans and backward scans, respectively. However, the size of the threshold matrices is not limited to the above. The threshold matrices may be larger or smaller in size.

<Tone Correction Processing>

Figure 40A:
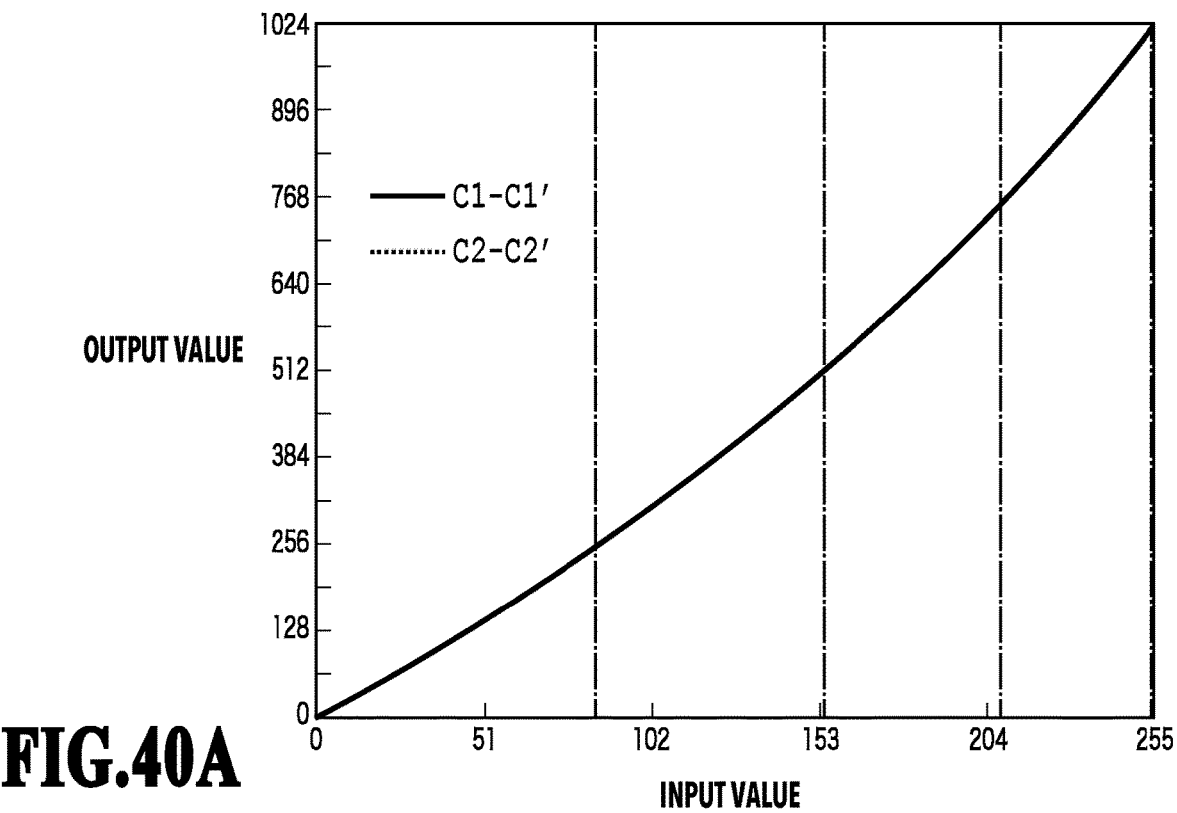
FIGS. 40A and 40B are diagrams showing tone correction processing used in the second embodiment.
Figure 40B:
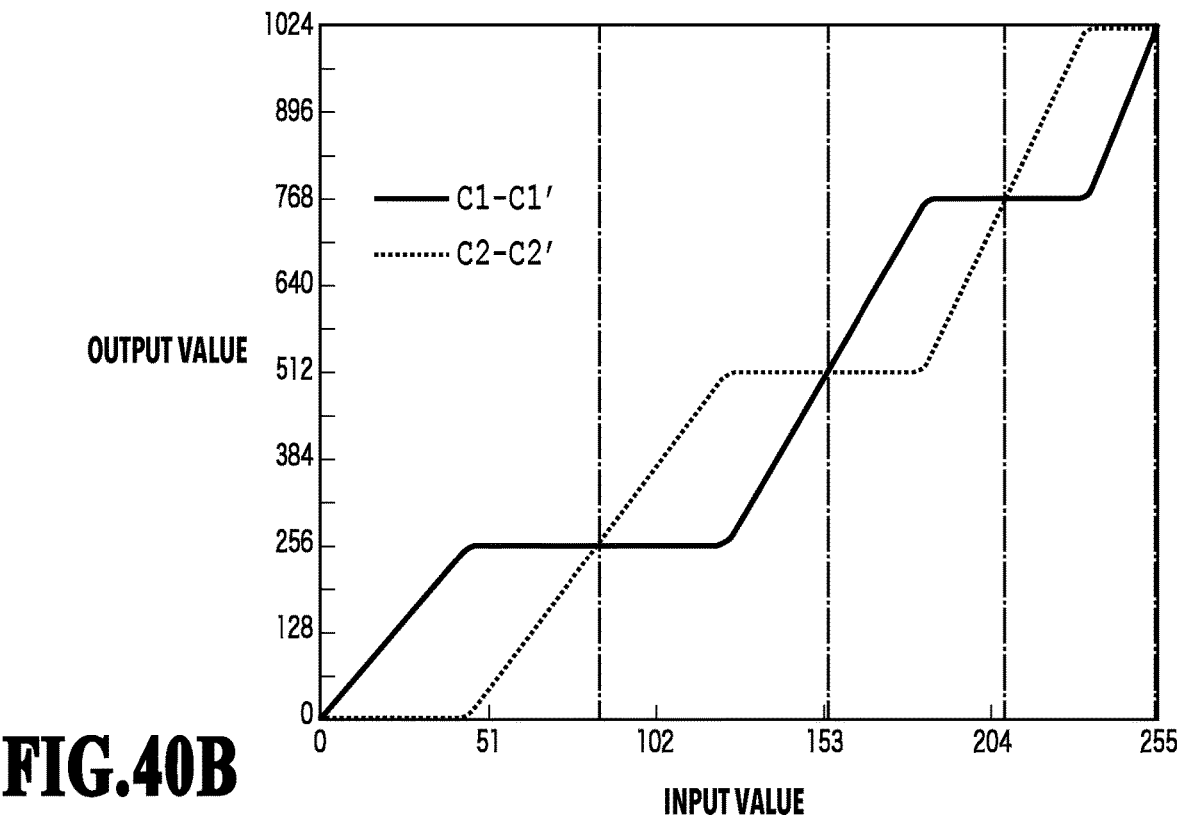

FIGS. 40A and 40B are diagrams illustrating the tone correction processing in S3204-1 and S3204-2 (see FIG. 32). FIG. 40A shows processing in the prior art, and FIG. 40B shows processing in the present embodiment. In FIGS. 40A and 40B, the solid lines indicate tone correction from C1 to C1', and dotted lines indicate tone correction from C2 to C2'. In FIG. 40A, the solid line and the dotted line coincide with each other because the tone correction from C1 to C1' and the tone correction from C2 to C2' are equal. Also, the dot-dash lines running vertically in FIGS. 40A and 40B indicate input values at which the tone correction from C1 to C1' and the tone correction from C2 to C2' are equal in FIG. 40B, and at these input values, the output values are the same between the processing in the prior art and the processing in the present embodiment. Thus, in a comparison between the processing in the prior art and the processing in the present embodiment, tones between the dot-dash lines are different.

Figure 41:
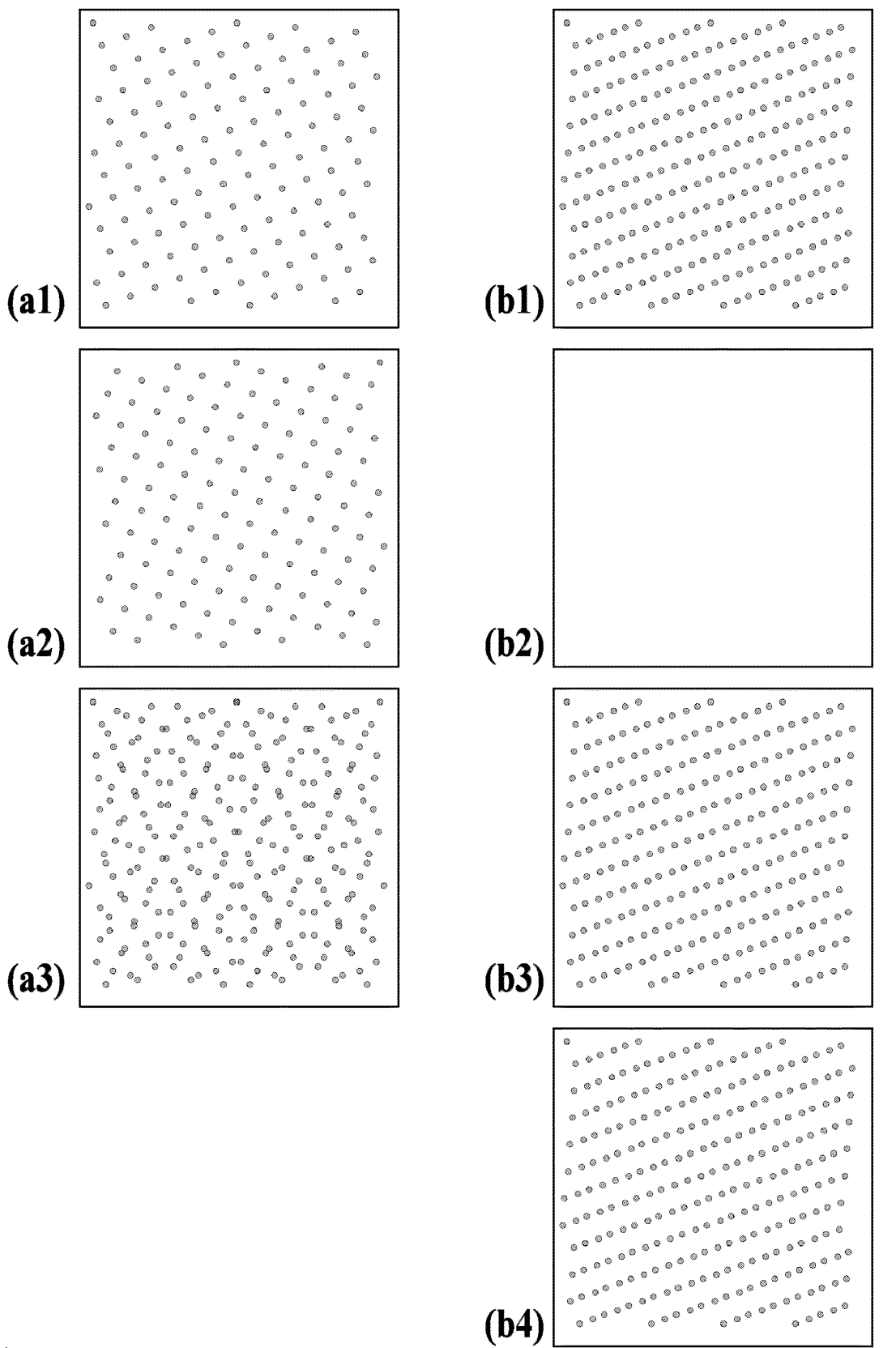
FIG. 41 is diagram showing dot patterns according to quantization processing results in the second embodiment.

FIG. 41 shows dot arrangements for a case of an input value C1=C2=44. Hereinafter, it is assumed that an ink ejected from a nozzle in the present embodiment has a dot diameter of 30 μm on a printing medium. An output value for the input value is, in the prior art, C1'=C2'=128 based on FIG. 40A and is, in the present embodiment, C1'=256 and C2'=0 based on FIG. 40B, and the quantization processing is performed according to the above-described output values. Part (a1) of FIG. 41 is a dot arrangement according to C1p in the prior art, part (a2) of FIG. 41 is a dot arrangement according to C2p in the prior art, and part (a3) of FIG. 41 is a dot arrangement formed on a printing medium by superimposition of the dot arrangement according to C1p in the prior art and the dot arrangement according to C2p in the prior art. Part (b1) of FIG. 41 is a dot arrangement according to C1p in the present embodiment, part (b2) of FIG. 41 is a dot arrangement according to C2p in the present embodiment, and part (b3) of FIG. 41 is a dot arrangement formed on a printing medium by superimposition of the dot arrangement according to C1p in the present embodiment and the dot arrangement according to C2p in the present embodiment.

The paper surface in part (a3) of FIG. 41 has sparse-dot locations and dense-dot locations, whereas in part (b3) of FIG. 41, the dots are regularly arranged at equal intervals. The present embodiment can thus provide an image with less conspicuous graininess than the prior part. Part (b4) of FIG. 41 is a dot arrangement formed on a paper surface by superimposition of the dot arrangements according to C1p and C2p in the present embodiment with the dot arrangement according to C2p being displaced from the dot arrangement according to C1p in the X-direction by 42 μm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 41 and part (b4) of FIG. 41, the displacement between the two patterns does not change the dot arrangement. As thus described, the present embodiment can provide an image with less conspicuous density unevenness than the prior art.

Figure 42:
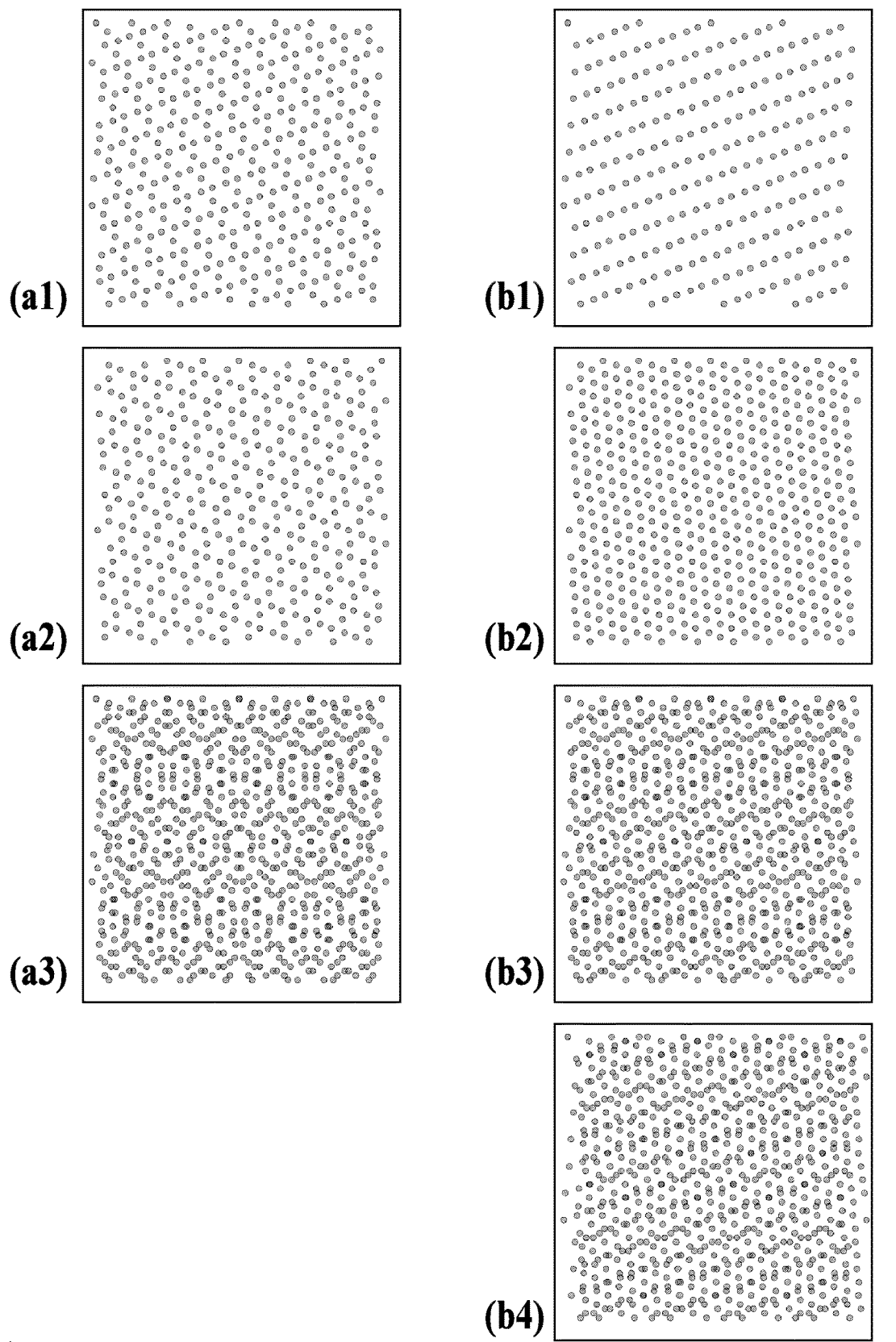
FIG. 42 is diagram showing dot patterns according to quantization processing results in the second embodiment.

FIG. 42 shows dot arrangements for a case of an input value C1=C2=123, as a tone different from the example described above. An output value for the input value is, in the prior art, C1'=C2'=384 based on FIG. 40A and is, in the present embodiment, C1'=256 and C2'=512 based on FIG. 40B, and the quantization processing is performed according to the above-described output values. Part (a1) of FIG. 42 is a dot arrangement according to C1p in the prior art, part (a2) of FIG. 42 is a dot arrangement according to C2p in the prior art, and part (a3) of FIG. 42 is a dot arrangement formed on a printing medium by superimposition of the dot arrangement according to C1p in the prior art and the dot arrangement according to C2p in the prior art. Part (b1) of FIG. 42 is a dot arrangement according to C1p in the present embodiment, part (b2) of FIG. 42 is a dot arrangement according to C2p in the present embodiment, and part (b3) of FIG. 42 is a dot arrangement formed on a printing medium by superimposition of the dot arrangement according to C1p in the present embodiment and the dot arrangement according to C2p in the present embodiment. The paper surface in part (a3) of FIG. 42 has many sparse-dot locations and dense-dot locations, whereas part (b3) of FIG. 42 has less sparse-dot locations and dense-dot locations. This is because the dot arrangement input (b2) of FIG. 42 is more regular and has more dots than the dot arrangement in part (a1) or (a2) of FIG. 42 so as to create as less sparse locations as possible. The present embodiment can thus provide an image with less conspicuous graininess than the prior art. Part (b4) of FIG. 42 is a dot arrangement formed on a paper surface by superimposition of the dot arrangements according to C1p and C2p in the present embodiment with the dot arrangement according to C2p being displaced from the dot arrangement according to C1p in the X-direction by 42 μm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 42 and part (b4) of FIG. 42, a change in the dot arrangement is successfully reduced even under the displacement between the two patterns. The present embodiment can thus provide an image with less conspicuous density unevenness than the prior art.

Figure 43:
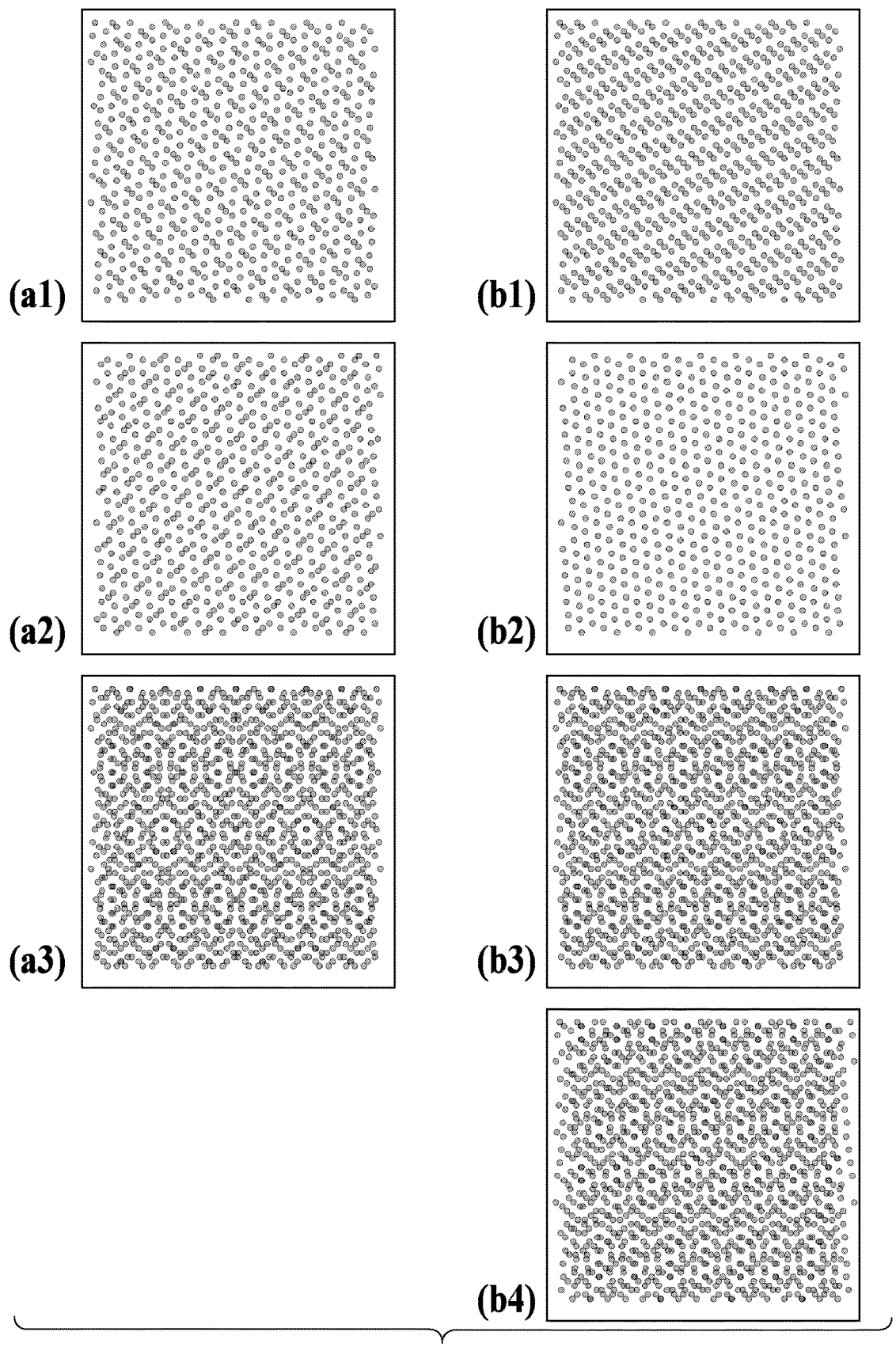
FIG. 43 is diagram showing dot patterns according to quantization processing results in the second embodiment.

FIG. 43 shows dot arrangements for a case of an input value C1=C2=184, as a tone different from the example described above. An output value for the input value is, in the prior art, C1'=C2'=640 based on FIG. 40A and is, in the present embodiment, C1'=768 and C2'=512 based on FIG. 40B, and the quantization processing is performed according to the above-described output values. Part (a1) of FIG. 43 is a dot arrangement according to C1p in the prior art, part (a2) of FIG. 43 is a dot arrangement according to C2p in the prior art, and (a3) of FIG. 43 is a dot arrangement formed on a printing medium by superimposition of the dot arrangement according to C1p in the prior art and the dot arrangement according to C2p in the prior art. Part (b1) of FIG. 43 is a dot arrangement according to C1p in the present embodiment, part (b2) of FIG. 43 is a dot arrangement according to C2p in the present embodiment, and part (b3) of FIG. 43 is a dot arrangement formed on a printing medium by superimposition of the dot arrangement according to C1p in the present embodiment and the dot arrangement according to C2p in the present embodiment. The paper surface in part (a3) of FIG. 43 has many sparse-dot locations and dense-dot locations, whereas part (b3) of FIG. 43 has less sparse-dot locations and dense-dot locations. This is because the dot arrangement in part (b1) of FIG. 43 is more regular and has more dots so as to create as less sparse locations as possible. The present embodiment can thus provide an image with less conspicuous graininess than the prior art. Part (b4) of FIG. 43 is a dot arrangement formed on a paper surface by superimposition of the dot arrangements according to C1p and C2p in the present embodiment with the dot arrangement according to C2p being displaced from the dot arrangement according to C1p in the X-direction by 42 μm. The prior art creates sparse-dot locations and dense-dot locations on a paper surface in advance so that a displacement between two patterns will not cause a great change in the dot arrangement, and this is true to the present embodiment as well. As can be seen from a comparison between part (b3) of FIG. 43 and part (b4) of FIG. 43, a change in the dot arrangement is successfully reduced even under the displacement between the two patterns. The present embodiment can thus provide an image with less conspicuous density unevenness than the prior art.

Advantageous Effects of the Present Embodiment

As thus described, the present embodiment can provide a high quality image without conspicuous graininess or density unevenness even in a case where control for dot arrangement adjustment is preformed after the quantization processing or in a case where printing is done by two or more passes and involves mask processing.

Third Embodiment

The first and second embodiments improve graininess and density unevenness under a relative displacement of print positions between printing by a forward scan and printing by a backward scan. However, the concept of the present disclosure is not limited to such embodiments, and data pieces for two patterns after division processing may be allocated to two arrays.

Figure 44:
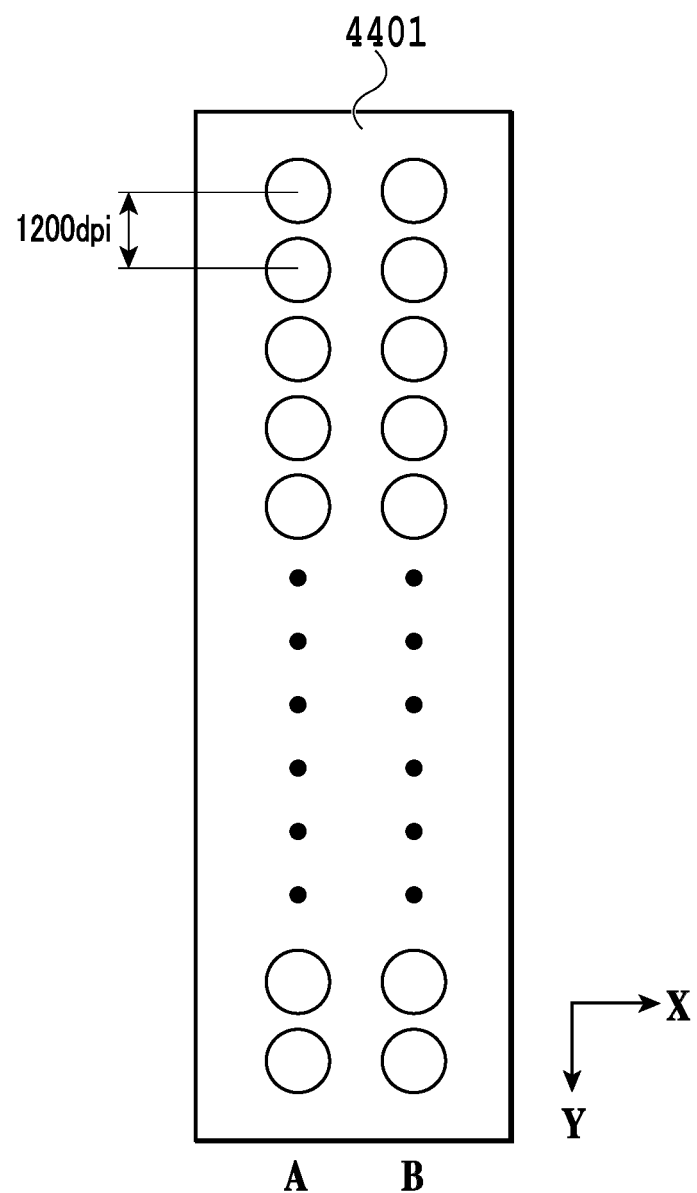
FIG. 44 is a schematic view of a print head used in a third embodiment.

FIG. 44 shows an example of a print head in the present embodiment, where two nozzle arrays (array A and array B) are arranged at a pitch of 1200 dpi, and these nozzle arrays (also called printing element arrays) both eject a K ink. In a case where this print head performs one-pass printing, print data created for a forward scan in the first embodiment is allocated to the array A, and print data created for a backward scan in the first embodiment is allocated to the array B. Then, advantageous effects similar to those of the first embodiment can be obtained against a print position displacement between the array A and the array B that occurs during scanning.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can provide a high quality image without conspicuous graininess or density unevenness even in a case where a print position displacement occurs in association with the relative movement between a print head and a printing medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012106, filed Jan. 28, 2022, which is hereby incorporated by reference herein in its entirety.

What is claimed is:

1. An apparatus for printing a plurality of dot patterns on a printing medium, the dot patterns being formed by substantially same color and substantially same dot diameter, the apparatus comprising:
a first creation unit configured to create, based on a first tone value, a first dot pattern and a second dot pattern printed and superimposed on the first dot pattern; and
a second creation unit configured to create, based on a second tone value larger than the first tone value, a third dot pattern having an equal or larger number of dots compared to the first dot pattern and a fourth dot pattern printed and superimposed on the third dot pattern and having an equal or larger number of dots compared to the second dot pattern, the second creating unit creating the third dot pattern and the fourth dot pattern so that an increase in the number of dots from the first dot pattern to the third dot pattern is larger or smaller than an increase in the number of dots from the second dot pattern to the fourth dot pattern.

2. The apparatus according to claim 1, wherein in at least one of the first dot pattern, the second dot pattern, the third dot pattern, and the fourth dot pattern, from a position of a given dot, a position of another dot is specifiable with integral multiples of two basis vectors.

3. The apparatus according to claim 2, wherein the first dot pattern and the second dot pattern are grid patterns such that from a position of a given dot, a position of another dot is specifiable with integral multiples of two basis vectors and that a combination of the two basis vectors is different between first dot pattern and the second dot pattern,
wherein a combined dot pattern formed by superimposition of given dots included in the first dot pattern and given dots included in the second dot pattern has superimposed dots and proximate dots, the superimposed dots being formed by superimposition of a dot included in the first dot pattern and a dot included in the second dot pattern, the proximate dots being formed by a dot included in the first dot pattern and a dot included in the second dot pattern that are located at a distance from each other, the distance being smaller than an inter-grid distance defined by the basis vectors, and
wherein the proximate dots include a plurality of sets of the proximate dots having different slopes from one another, the slopes each being a straight line connecting a center of the dot in the first dot pattern forming the proximate dots and a center of the dot in the second dot pattern forming the proximate dots.

4. The apparatus according to claim 2, wherein the third dot pattern and the fourth dot pattern are grid patterns such that from a position of a given dot, a position of another dot is specifiable with integral multiples of two basis vectors and that a combination of the two basis vectors is different between the third dot pattern and the fourth dot pattern,
wherein a combined dot pattern formed by superimposition of given dots included in the third dot pattern and given dots included in the fourth dot pattern has superimposed dots and proximate dots, the superimposed dots being formed by superimposition of a dot included in the third dot pattern and a dot included in the fourth dot pattern, the proximate dots being formed by a dot included in the third dot pattern and a dot included in the fourth dot pattern that are located at a distance from each other, the distance being smaller than an inter-grid distance defined by the basis vectors, and
wherein the proximate dots include a plurality of sets of the proximate dots having different slopes from one another, the slopes each being a straight line connecting a center of the dot in the third dot pattern forming the proximate dots and a center of the dot in the fourth dot pattern forming the proximate dots.

5. The apparatus according to claim 1, wherein the first dot pattern and the third dot pattern are equal to each other, or the second dot pattern and the fourth dot pattern are equal to each other.

6. The apparatus according to claim 1, wherein the first dot pattern and the second dot pattern have a substantially same number of dots.

7. The apparatus according to claim 1, wherein the first dot pattern has zero dots, or the second dot pattern has zero dots.

8. The apparatus according to claim 1, wherein at least one of the first dot pattern, the second dot pattern, the third dot pattern, and the fourth dot pattern has a blue noise property.

9. The apparatus according to claim 1, wherein the third dot pattern encompasses the first dot pattern, and
wherein the fourth dot pattern encompasses the second dot pattern.

10. The apparatus according to claim 1, further comprising:
a third creation unit configured to create, based on a third tone value larger than the second tone value, a fifth dot pattern having an equal or larger number of dots compared to the third dot pattern and a sixth dot pattern printed and superimposed on the fifth dot pattern and having an equal or larger number of dots compared to the fourth dot pattern,
wherein in a case where the increase in the number of dots from the first dot pattern to the third dot pattern is larger than the increase in the number of dots from the second dot pattern to the fourth dot pattern, an increase in the number of dots from the third dot pattern to the fifth dot pattern is smaller than an increase in the number of dots from the fourth dot pattern to the sixth dot pattern, and
wherein in a case where the increase in the number of dots from the first dot pattern to the third dot pattern is smaller than the increase in the number of dots from the second dot pattern to the fourth dot pattern, the increase in the number of dots from the third dot pattern to the fifth dot pattern is larger than the increase in the number of dots from the fourth dot pattern to the sixth dot pattern.

11. The apparatus according to claim 10, wherein the first dot pattern and the third dot pattern are equal to each other, or the third dot pattern and the fifth dot pattern are equal to each other.

12. The apparatus according to claim 10, further comprising:
a fourth creation unit configured to create, based on a fourth tone value larger than the third tone value, a seventh dot pattern having an equal or larger number of dots compared to the fifth dot pattern and an eighth dot pattern printed and superimposed on the seventh dot pattern and having an equal or larger number of dots compared to the sixth dot pattern,
wherein the fifth dot pattern and the sixth dot pattern have a substantially same number of dots,
wherein in a case where the increase in the number of dots from the first dot pattern to the third dot pattern is smaller than the increase in the number of dots from the second dot pattern to the fourth dot pattern, an increase in the number of dots from the fifth dot pattern to the seventh dot pattern is larger than an increase in the number of dots from the sixth dot pattern to the eighth dot pattern, and
wherein in a case where the increase in the number of dots from the first dot pattern to the third dot pattern is larger than the increase in the number of dots from the second dot pattern to the fourth dot pattern, the increase in the number of dots from the fifth dot pattern to the seventh dot pattern is smaller than the increase in the number of dots from the sixth dot pattern to the eighth dot pattern.

13. The apparatus according to claim 1, wherein the apparatus is an image processing apparatus or a printing apparatus.

14. The apparatus according to claim 1, wherein the plurality of dot patterns are formed by the same color and the same dot diameter.

15. A method for controlling an apparatus for printing a plurality of dot patterns on a printing medium, the dot patterns being formed by substantially same color and substantially same dot diameter, the method comprising:

creating, based on a first tone value, a first dot pattern and a second dot pattern printed and superimposed on the first dot pattern; and creating, based on a second tone value larger than the first tone value, a third dot pattern having an equal or larger number of dots compared to the first dot pattern and a fourth dot pattern printed and superimposed on the third dot pattern and having an equal or larger number of dots compared to the second dot pattern, so that an increase in the number of dots from the first dot pattern to the third dot pattern is larger or smaller than an increase in the number of dots from the second dot pattern to the fourth dot pattern.

16. A non-transitory computer-readable storage medium storing a program for causing a computer to execute a method for controlling an apparatus for printing a plurality of dot patterns on a printing medium, the dot patterns being formed by substantially same color and substantially same dot diameter, the method comprising:

creating, based on a first tone value, a first dot pattern and a second dot pattern printed and superimposed on the first dot pattern; and creating, based on a second tone value larger than the first tone value, a third dot pattern having an equal or larger number of dots compared to the first dot pattern and a fourth dot pattern printed and superimposed on the third dot pattern and having an equal or larger number of dots compared to the second dot pattern, so that an increase in the number of dots from the first dot pattern to the third dot pattern is larger or smaller than an increase in the number of dots from the second dot pattern to the fourth dot pattern.

17. A printing apparatus comprising:

a print head configured to print a dot pattern while moving relative to a printing medium; and an apparatus for printing a plurality of dot patterns on the printing medium, the dot patterns being formed by substantially same color and substantially same dot diameter, the apparatus including (1) a first creation unit configured to create, based on a first tone value, a first dot pattern printed by the print head moving relative to the printing medium in a forward direction and a second dot pattern printed and superimposed on the first dot pattern and printed by the print head moving relative to the printing medium in a backward direction which is opposite from the forward direction, and (2) a second creation unit configured to create, based on a second tone value larger than the first tone value, a third dot pattern having an equal or larger number of dots compared to the first dot pattern and printed by the print head moving relative to the printing medium in the forward direction and a fourth dot pattern printed and superimposed on the third dot pattern, having an equal or larger number of dots compared to the second dot pattern, and printed by the print head moving relative to the printing medium in the backward direction, the second creation unit creating the third dot pattern and the fourth dot pattern so that an increase in the number of dots from the first dot pattern to the third dot pattern is larger or smaller than an increase in the number of dots from the second dot pattern to the fourth dot pattern, the first dot pattern and the third dot pattern being printed by the print head moving relative to the printing medium in a forward direction, the second dot pattern and the fourth dot pattern being printed by the print head moving relative to the printing medium in a backward direction which is opposite from the forward direction.

18. The printing apparatus according to claim 17, further comprising:

an execution unit configured to execute quantization processing;

an execution unit configured to execute indexing processing on binary data obtained by the quantization processing; and an execution unit configured to execute masking processing of performing a logical AND between binary data obtained by the indexing processing and a predetermined mask pattern.

19. The printing apparatus according to claim 18, wherein a printing element array on the print head is formed by four divided regions, wherein the first to fourth dot patterns are printed on a same region on the printing medium by printing elements belonging the four divided regions, respectively, and wherein the first, second, third, and fourth dot patterns are printed by first, second, third, and fourth print scans, respectively.

20. A printing apparatus comprising:

a print head configured to print a dot pattern while moving relative to a printing medium, the print head having a first printing element array and a second printing element array; and an apparatus for printing a plurality of dot patterns on the printing medium, the dot patterns being formed by substantially same color and substantially same dot diameter, the apparatus including (1) a first creation unit configured to create, based on a first tone value, a first dot pattern printed by the first printing element array and a second dot pattern printed and superimposed on the first dot pattern and printed by the second printing element array, and (2) a second creation unit configured to create, based on a second tone value larger than the first tone value, a third dot pattern having an equal or larger number of dots compared to the first dot pattern and printed by the first printing element array and a fourth dot pattern printed and superimposed on the third dot pattern, having an equal or larger number of dots compared to the second dot pattern, and printed by the second printing element array, the second creation unit creating the third dot pattern and the fourth dot pattern so that an increase in the number of dots from the first dot pattern to the third dot pattern is larger or smaller than an increase in the number of dots from the second dot pattern to the fourth dot pattern.

* * * * *